(12) United States Patent
Song

(10) Patent No.: US 12,391,396 B2
(45) Date of Patent: Aug. 19, 2025

(54) MULTI-LAYER THERMOPLASTIC SPRAY COATING SYSTEM FOR HIGH PERFORMANCE SEALING ON AIRPLANES

(71) Applicant: The Boeing Company, Chicago, IL (US)

(72) Inventor: Weidong Song, Woodinville, WA (US)

(73) Assignee: THE BOEING COMPANY, Arlington, VA (US)

(*) Notice: Subject to any disclaimer, the term of this patent is extended or adjusted under 35 U.S.C. 154(b) by 186 days.

(21) Appl. No.: 18/070,851

(22) Filed: Nov. 29, 2022

(65) Prior Publication Data

US 2023/0092373 A1 Mar. 23, 2023

Related U.S. Application Data

(62) Division of application No. 16/367,671, filed on Mar. 28, 2019, now Pat. No. 11,591,103.

(51) Int. Cl.
| | | |
|---|---|---|
| *B32B 7/02* | (2019.01) | |
| *B05D 1/02* | (2006.01) | |
| *B60K 15/03* | (2006.01) | |
| *B64D 37/06* | (2006.01) | |
| *B32B 7/04* | (2019.01) | |
| *B32B 7/08* | (2019.01) | |

(52) U.S. Cl.
CPC ............ *B64D 37/06* (2013.01); *B05D 1/02* (2013.01); *B60K 15/03* (2013.01); *B32B 7/02* (2013.01); *B32B 7/04* (2013.01); *B32B 7/08* (2013.01); *B60K 2015/03032* (2013.01); *B60K 2015/03447* (2013.01)

(58) Field of Classification Search
CPC .................................... B05D 1/02; B32B 7/02
See application file for complete search history.

(56) References Cited

U.S. PATENT DOCUMENTS

| | | | |
|---|---|---|---|
| 3,755,713 | A | 8/1973 | Paszkowski |
| 5,302,414 | A | 4/1994 | Alkhimov et al. |
| 8,293,378 | B2 | 10/2012 | Owen et al. |
| 8,658,256 | B2 | 2/2014 | Shokri et al. |
| 11,390,773 | B2 | 7/2022 | Song |
| 11,591,103 | B2 * | 2/2023 | Song ............... B64D 37/06 |
| 2002/0168466 | A1 | 11/2002 | Tapphorn et al. |
| 2005/0048218 | A1 | 3/2005 | Weidman |
| 2005/0196543 | A1 | 9/2005 | Morton |
| 2006/0183841 | A1 | 8/2006 | Aneja et al. |
| 2007/0044406 | A1 | 3/2007 | Van Aken et al. |
| 2008/0011444 | A1 | 1/2008 | Clark et al. |
| 2010/0063072 | A1 | 3/2010 | Palle et al. |
| 2010/0224724 | A1 | 9/2010 | Kamino et al. |
| 2012/0138609 | A1 | 6/2012 | Gerken et al. |
| 2014/0055906 | A1 | 2/2014 | Whitlock et al. |
| 2014/0147644 | A1 * | 5/2014 | Crabb ............... B32B 27/36 428/424.4 |
| 2014/0370203 | A1 | 12/2014 | Sailer et al. |
| 2015/0210039 | A1 | 7/2015 | Simmons et al. |
| 2015/0271960 | A1 | 9/2015 | Yoon et al. |
| 2016/0096302 | A1 | 4/2016 | Drexler et al. |
| 2016/0107739 | A1 | 4/2016 | Restuccia et al. |
| 2017/0152601 | A1 | 6/2017 | Cavaille et al. |
| 2017/0217560 | A1 * | 8/2017 | Gideon ............. B64C 1/1492 |
| 2017/0275476 | A1 * | 9/2017 | Sarkis ............... B32B 7/06 |
| 2018/0298154 | A1 | 10/2018 | Lundorf et al. |
| 2019/0085212 | A1 * | 3/2019 | Kandapallil ...... E04F 15/02155 |
| 2020/0149674 | A1 * | 5/2020 | Mehta ............... C09D 183/10 |
| 2020/0385578 | A1 * | 12/2020 | Gu ................... B32B 27/302 |

FOREIGN PATENT DOCUMENTS

| | | |
|---|---|---|
| CN | 1410475 A | 4/2003 |
| CN | 101115791 A | 1/2008 |
| CN | 101309758 A | 11/2008 |
| CN | 103194142 A | 7/2013 |
| CN | 107674559 A | 2/2018 |
| EP | 0988898 A2 | 3/2000 |
| EP | 2733231 A1 | 5/2014 |
| EP | 2585372 B1 | 4/2016 |
| EP | 3150502 A1 | 4/2017 |
| JP | 2001336229 A | 12/2001 |
| WO | 2006076341 A2 | 7/2006 |
| WO | 2008048705 A2 | 4/2008 |
| WO | 2015023353 A1 | 2/2015 |
| WO | 2015119123 A1 | 8/2015 |
| WO | 2016078664 A1 | 5/2016 |
| WO | 2018110488 A1 | 6/2018 |

OTHER PUBLICATIONS

Polymer Database, "Nylon 6", Jun. 7, 2016, pp. 1-2 (Year: 2016).
Polymer Database, "Nylon 11", Jan. 13, 2018, pp. 1-2 (Year: 2018).
Polymer Database, "Unifilled Polyetheretherketone (PEEK)", Jun. 8, 2019, pp. 1-2 (Year: 2019).
Polymer Database, "Polyphenylene Sulfide (PPS)", Feb. 27, 2019, pp. 1-2 (Year: 2019).
Polymer Database, "Nylon 6-6", Mar. 23, 2023, pp. 1-2 (Year: 2023).
Polymer Database, "Nylon 12", Mar. 23, 2023, pp. 1-2 (Year: 2023).

* cited by examiner

*Primary Examiner* — Margaret G Moore
(74) *Attorney, Agent, or Firm* — COATS & BENNETT, PLLC

(57) ABSTRACT

Tunable multi-layer thermoplastic polymer sealants and tunable two-layer conductive thermoplastic polymer sealants, and substrates and assemblies comprising the tunable multi-layer sealants; and edge seals and fillet seals produced comprising such sealants; and substrates, components and objects comprising the tunable edge seals and fillet seals, and methods for making and applying such edge seals and fillet seals are disclosed.

20 Claims, 29 Drawing Sheets

MULTI-LAYER THERMOPLASTIC SPRAY COATING SYSTEM FOR HIGH PERFORMANCE SEALING ON AIRPLANES

RELATED APPLICATIONS

This application is a divisional application of U.S. application Ser. No. 16/367,671 filed Mar. 28, 2019, and now U.S. Pat. No. 11,591,103, which is herein incorporated by reference in its entirety.

TECHNOLOGICAL FIELD

The present disclosure relates generally to the field of coatings and sealants. More specifically the present disclosure relates to the field of coatings and sealants, including conductive coatings and sealants, particularly those coatings and sealants applied to a surface by thermal spraying.

BACKGROUND

In many fields, components on large structures, including those found on vehicles, including aircraft, etc., are typically coated with paints, primers, coatings, etc. that can provide a number of functions to a substrate surface, including, for example, protection from corrosion and other forms of environmental degradation, overcoat or sealant adhesion, abrasion resistance, appearance, etc. Coatings and sealants are often applied to areas of assembled components or sub-assemblies that are difficult to access through traditional coating and sealant application processes. In addition, a significant number, sometimes numbering in the thousands and tens of thousands, of small parts (e.g., fasteners, etc.) and areas requiring sealing (e.g., edge seals and fillet seals, etc.) requiring coatings and/or sealants can occur in assemblies in a large structure (e.g., fuel tanks on aircraft, etc.). Further, many coatings and sealants require lengthy curing protocols, or require applying heat or other added triggering mechanism (e.g. ultraviolet radiation, etc.) to obtain an appropriate degree of curing.

Further, some coatings (e.g. paints and primers, etc.) and sealants are often electrically insulative and can result in an impediment to the dissipation of static and other electrical charges. Certain structures require the need to dissipate electrical charges that build up on a structure's interior and/or exterior surfaces, including static electrical charges, and charges resulting from, for example lightning strikes, etc. The need to consider electrical charge dissipation continues in the aircraft industry, as aircraft manufacture continues to incorporate non-metallic materials. Further, in certain aircraft assemblies, non-metallic materials, such as composites, plastics, etc., that do not dissipate electrical charges predictably across their surfaces may be joined with, or otherwise contact, assemblies and sub-assemblies that comprise metallic materials that do conduct electrical charges. That is, components, assemblies and sub-assemblies that include both composite and metallic materials may be used in the manufacture of, or otherwise incorporated into, larger structures (e.g. aircraft).

Such structures may encounter electromagnetic effects (EMEs) including, for example, and without limitation, lightning strikes. When a structure encounters an EME, the charge delivered to the structure travels throughout any conductive path, and can cause damage to exposed dielectric materials including, for example, composite materials. The electrical damage to composite materials from EMEs can be exacerbated if the edges of the composite material comprise exposed carbon fibers. If the path of charges resulting from an EME encounters varying materials having varying conductivities, damage at or near the material interface can occur. Such interfaces include, without limitation, fasteners/substrate interfaces, and can further include joined interfaces where, for example, seals (e.g., fillet seals, edge seals, etc.) occur.

Carbon fiber reinforced plastic materials (CFRPs) have utility in structures including, without limitation, vehicles including, without limitation, aircraft. CFRPs comprise a fiber material (e.g. carbon fibers, etc.) impregnated with a resin material (e.g. epoxy resin, acrylic resin, etc.) to make so-called prepregs. Prepregs are partially cured layers that can be manufactured into rolls that can yield unrolled sheets for use in composite material manufacture. Prepreg material, or "prepregs" can then be "laid-up" or "stacked" into multi-layered "stacks" that can be shaped on forming mandrels or other tooling, followed by curing or partially curing the shaped material to produce a composite material that, if desired, adopts desired and predetermined shapes and dimensions imparted by the tool, with the composite material having desired weight and strength. Alternately, prepregs may be oriented into a stack that is trimmed and cured to form a solid stack for use as a composite material structure or other type of composite component.

In aircraft manufacture, CFRP parts are often joined to other CFRP parts as well as other metallic parts and non-metallic parts. Problems can occur with respect to predictably dissipating electrical charges when materials, such as CFRPs and various metals (e.g. aluminum, titanium, etc.) that have differing conductivities are joined, fastened, or are otherwise in close proximity to one another. Such interfaces can sustain EME damage in the course of EME events such as, for example, static discharge and/or lightning strikes where electrical current builds up and is not dispersed efficiently due to the presence of materials having differing conductivities/resistivities, as electrical charges move along a pathway. This is especially problematic at component interfaces where two materials are joined or in contact with one another and the materials have varying resistivity values (e.g., where a first substrate/component/part is made from a conductive material and is joined to or positioned proximate to a second substrate/component/part made from a non-conductive material or a material with a significantly different conductivity/resistivity as compared to the first substrate/component/part.

Coatings, especially coatings used in aircraft manufacture, also must be robust enough to possess a plurality of characteristics and may not adequately provide all of the required functions to an equivalent or acceptable degree. For example, conductive coatings for dissipating electrical charges across metallic and non-metallic coatings alike have been tried with varying success. Typically, the known conductive coatings must be loaded with conductive particles to such an extent (sometimes as much as from about 50 to about 70 weight percent), that other required coating characteristics suffer. Further, such heavily loaded conductive coatings can make certain coating application techniques difficult or impossible (e.g., high viscosity coating materials typically cannot be applied using, for example, spray techniques, etc.).

In addition, surface coatings that may be designed to alleviate electrical imbalances across various metallic and/or non-metallic surfaces must often, at least in part, address additional concerns and functions including appearance, adhesion, abrasion resistance, environmental degradation, etc.

Further, inherent coating characteristics (viscosity, etc.,) may make it difficult to apply such coatings to restrictive locations and surfaces using efficient application techniques. For example, an otherwise desirable coating may be too viscous to apply to a surface using sprayers, when an application mode such as spraying could otherwise offer improvements to coating processing in terms of, efficiency, cost savings, etc.

In addition, specialized coatings having a useful range of varying properties may be expensive to prepare, maintain, store, or deploy. Otherwise useful coatings may further have long curing times, for example taking days to cure with or without the presence of elevated curing temperatures or the use of additional triggering processes. Such extended or complex curing regimens further add to the manufacturing time required, as well as increasing cost. In addition, specialized coatings may lack an adequate shelf life or pot life to be useful for very long on-site. It may further be economically impractical for a particular manufacturing facility (in terms of equipment or space requirements) to store and/or inventory coatings that require, for example, maintenance at particular temperatures.

SUMMARY

According to the present disclosure, one aspect discloses a seal, the seal including at least a first thermoplastic polymer layer applied to a substrate, with the first thermoplastic polymer layer adhering to the substrate at an adherence value ranging from about 10 lbs/in to about 30 lbs/in wide area from a 90° peel test according to ASTM D6862-11 (2016) Standard Test Method for 90° Peel Resistance. The sealant further comprises a second thermoplastic polymer layer deposited onto the first thermoplastic polymer layer, with the second thermoplastic polymer layer having a chemical resistance value to volatiles. According to further aspects, the second thermoplastic polymer layer has predetermined characteristics, including a chemical resistivity characteristic of less than about 10% weight gain and less than 10% mechanical property reduction.

According to another aspect, the first thermoplastic polymer layer includes at least one of: a thermoplastic co-polyester, a co-polymer of vinylidene fluoride and hexafluoropropylene, a thermoplastic polyurethane, a thermoplastic vulcanizate, a thermoplastic polyolefin elastomer, a styrene block co-polymer, a fluoroelastomer, and combinations thereof.

According to a further aspect, the second thermoplastic polymer layer deposited onto said first thermoplastic polymer layer comprises at least one of: a polyether ether ketone, a polyether ketone ketone, a polyamide, a polysulfone, a polyphenylsulfone, a polyetheramide, and combinations thereof.

In another aspect, the first thermoplastic polymer layer applied to the substrate comprises a modulus value of less than 1000 MPa having an elongation at break greater than 100%.

In a further aspect, the second thermoplastic polymer layer has modulus value of less than about 4 MPa with an elongation at beak of greater than about 20%.

In another aspect the second thermoplastic polymer layer has a chemical resistance to long term jet fuel exposure measured in terms of incurring less than 10% weight gain.

A further aspect discloses an assembly comprising a first substrate and a second substrate, with the first and second substrates located proximate to one another, and a sealant located on at least one of the first and second substrates. The sealant includes at least a first thermoplastic poly ranging from about 10 lbs/in to about 30 lbs/in wide area from a 90° peel test according to ASTM D6862-11 (2016) Standard Test Method for 90° Peel Resistance.

In a further aspect, the sealant further comprises a second thermoplastic polymer layer deposited onto the first thermoplastic polymer layer, with the second thermoplastic polymer layer having a chemical resistance characteristic and chemical resistance value to environmental volatiles (e.g., jet fuel, etc.), with one chemical resistance value being less than about a 10% weight gain when exposed to an environmental volatile material such as, for example, jet fuel.

Another aspect discloses an assembly including a first substrate and a second substrate, with the first substrate including a first substrate edge and the second substrate including a second substrate edge. The second substrate is located or otherwise oriented proximate to the first substrate to form a substrate interface at a juncture between the first substrate and the second substrate. A spray-deposited polymer sealant is configured to form a multi-layered thermoplastic polymer seal at the substrate interface.

According to a further aspect, a method is disclosed including delivering a spray-deposited multiple-layered thermoplastic polymer sealant to a substrate surface, with the multi-layered thermoplastic polymer sealant comprising at least two layers. The multi-layered thermoplastic polymer sealant is delivered to the substrate surface in at least two layers to form the multiple-layered thermoplastic polymer seal; including a first thermoplastic polymer layer deposited onto the substrate surface, and a second thermoplastic polymer layer deposited onto the first thermoplastic polymer layer, with the first and second thermoplastic polymer layers comprising a thermoplastic polymer that differs from one another.

According to further aspects, the multi-layered thermoplastic polymer seal includes at least one of: a fillet seal located at the substrate interface between the first and second substrates; an edge seal located at one or more of the first substrate edges and/or at one or more of the second substrate edges, and a fastener seal at the interface of a fastener and a substrate surface.

According to a further aspect, the first thermoplastic polymer layer (deposited onto the substrate surface) includes at least one of: a thermoplastic co-polyester, a co-polymer of vinylidene fluoride and hexafluoropropylene, a thermoplastic polyurethane, a thermoplastic vulcanizate, a thermoplastic polyolefin elastomer, a styrene block co-polymer, a fluoroelastomer, and combinations thereof.

In a further aspect, the spray-deposited first thermoplastic polymer layer (deposited onto a substrate surface) includes at least one thermoplastic polymer including at least one of: copolymers including Hytrel® TPC-ET (DuPont®), thermoplastic elastomers, and thermoplastic fluoroelastomers including DAI-EL® T-530 (Daikin®), and combinations thereof.

In another aspect, the spray deposited second thermoplastic polymer layer (deposited onto the first thermoplastic polymer layer) is made from a material including at least one of: thermoplastic polymers including, without limitation, a nylon, a polyetheretherketone, a polyetherketoneketone, a polyamide, a polyphenylsulfide, a polyphenylsulfone, a polysulfone, a polyetheramide, and combinations thereof.

In another aspect, at least one of the first and second thermoplastic polymer sealant materials further includes a conductive material, with the conductive material including at least one of: titanium, nickel alloy, copper, carbon black, graphene powder, carbon nanotubes, and combinations thereof.

Further aspects disclose methods including directing a first thermoplastic polymer from a first thermoplastic polymer feedstock to a first high-velocity sprayer, depositing the first thermoplastic polymer from the high-velocity sprayer onto a substrate surface, and forming a first thermoplastic polymer layer on the substrate surface, with the first thermoplastic polymer layer having an adhesion value ranging from about 10 lbs/in to about 30 lbs/in wide area from a 90° peel test. The method further includes directing a second thermoplastic polymer from a second thermoplastic polymer feedstock to a first or second high-velocity sprayer, depositing the second thermoplastic polymer from the first or second high-velocity sprayer onto the first thermoplastic polymer layer, forming a second thermoplastic polymer layer on the first thermoplastic polymer layer, and forming a two-layer thermoplastic polymer seal, with the second thermoplastic polymer layer having a chemical resistance characteristic of less than about 10% weight gain and less than 10% mechanical property reduction.

In a further aspect, the spray-deposited first thermoplastic polymer layer (deposited onto a substrate surface) includes at least one thermoplastic polymer comprising at least one of: a thermoplastic co-polyester, a copolymer of vinylidene fluoride and hexafluoropropylene, a thermoplastic polyurethane, a thermoplastic vulcanizate, a thermoplastic polyolefin elastomer, a styrene block co-polymer, a fluoroelastomer, and combinations thereof.

In another aspect, the spray-deposited first thermoplastic polymer layer (deposited onto a substrate surface) includes at least one thermoplastic polymer comprising at least one of: copolymers including Hytrel® TPC-ET (DuPont®), thermoplastic elastomers, and thermoplastic fluoroelastomers including DAI-EL® T-530 (Daikin®), and combinations thereof.

In another aspect, the spray deposited second thermoplastic polymer layer (deposited onto the first thermoplastic polymer layer) is made from a material that includes one or more thermoplastic polymers including, without limitation, a nylon, a polyetheretherketone, a polyetherketoneketone, a polyamide, a polyphenylsulfide, a polyphenylsulfone, a polysulfone, polyetheramide, and combinations thereof.

The features, functions and advantages that have been discussed can be achieved independently in various aspects or may be combined in other aspects, further details of which can be seen with reference to the following description and the drawings.

BRIEF DESCRIPTION OF THE DRAWINGS

Figure 1:
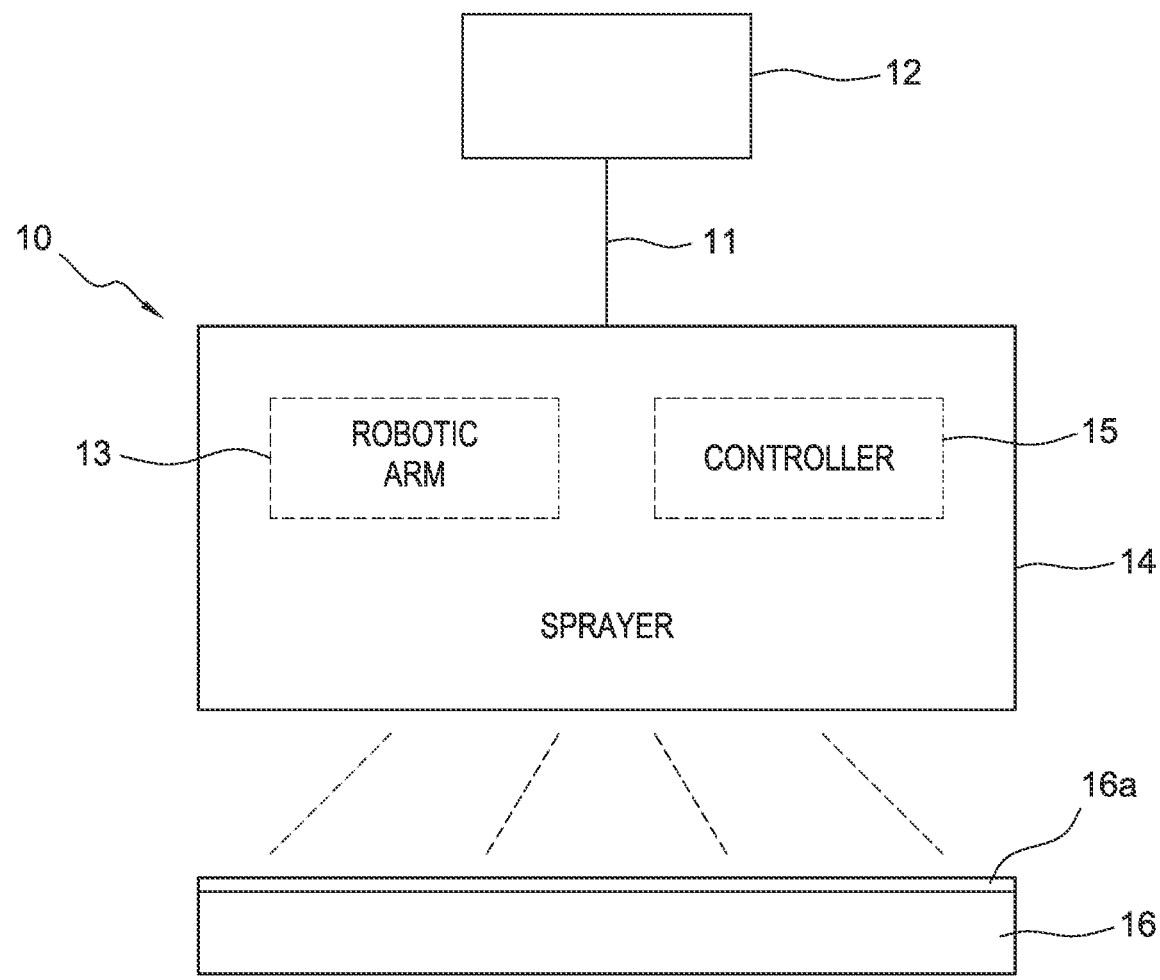
Figure 2A:
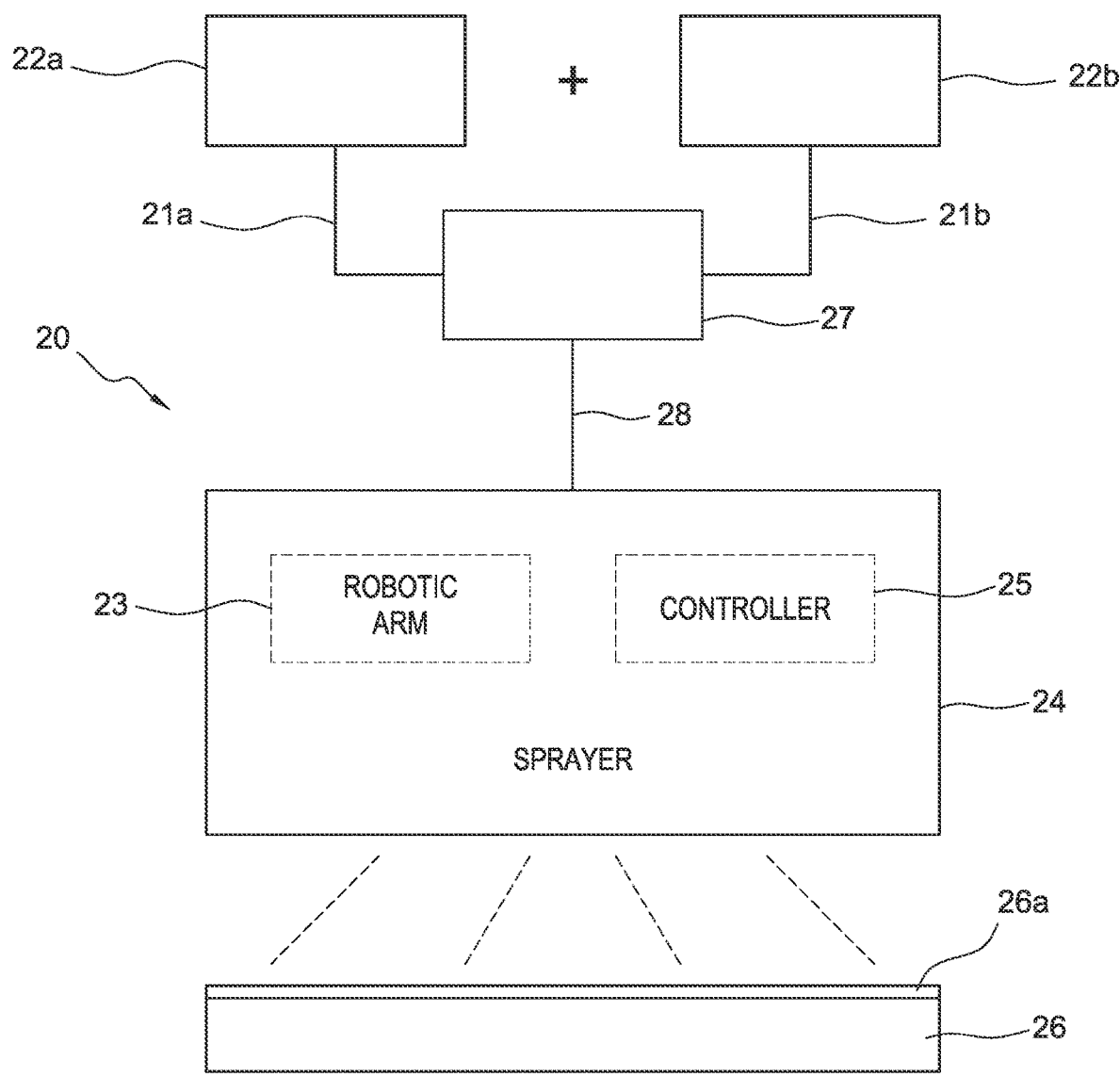
Figure 2B:
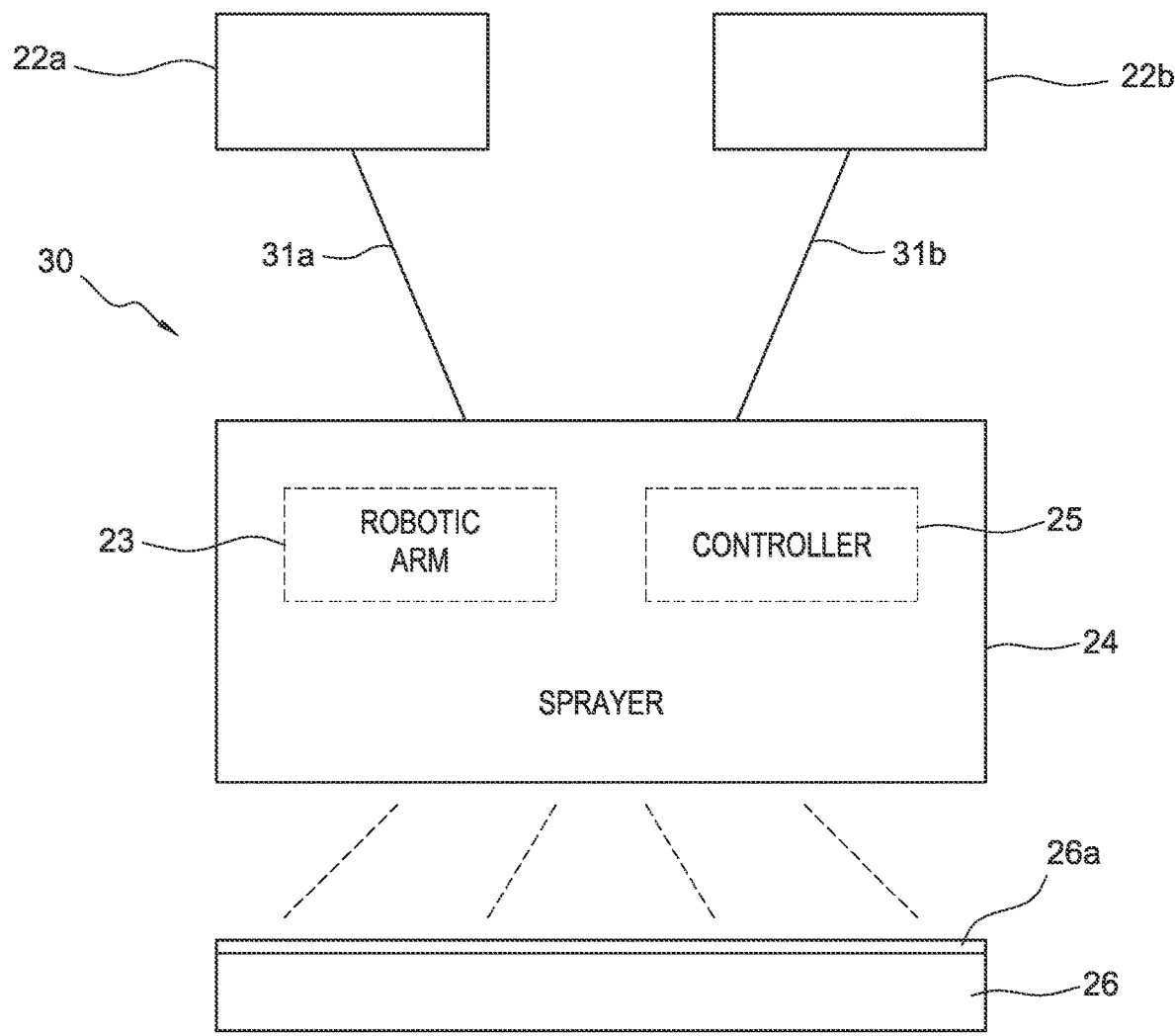
Figure 3A:
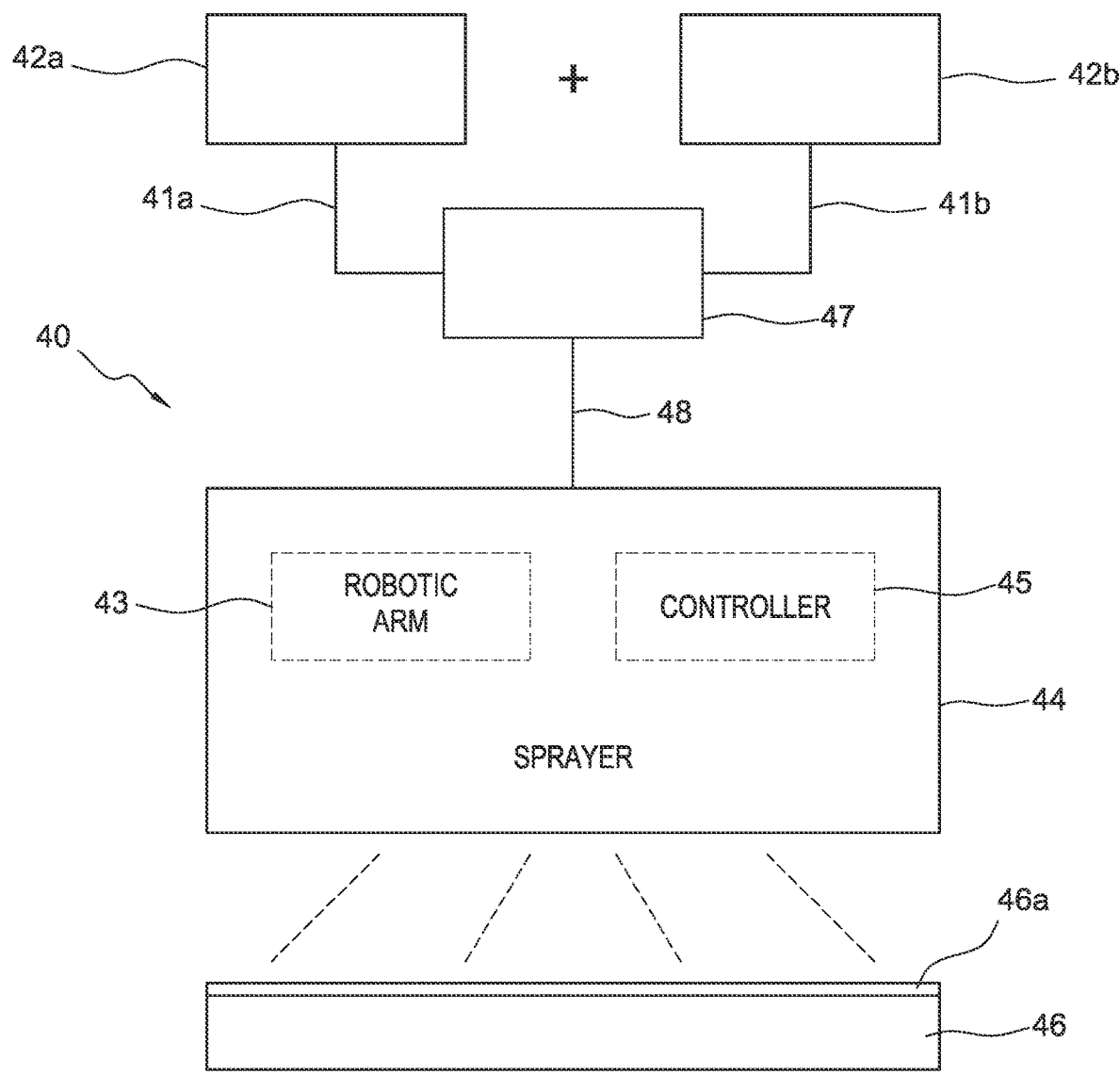
Figure 3B:
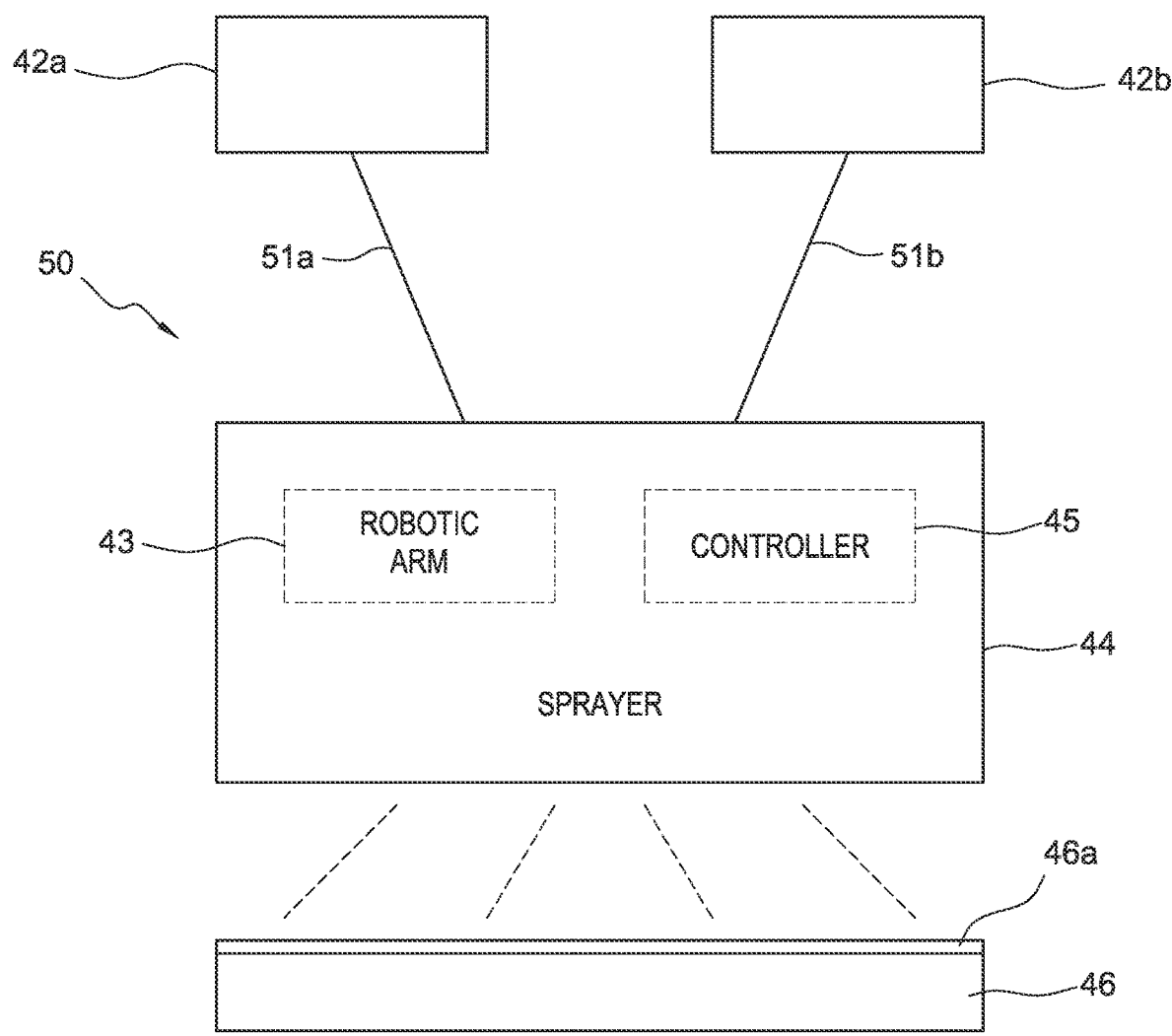
Figure 4A:
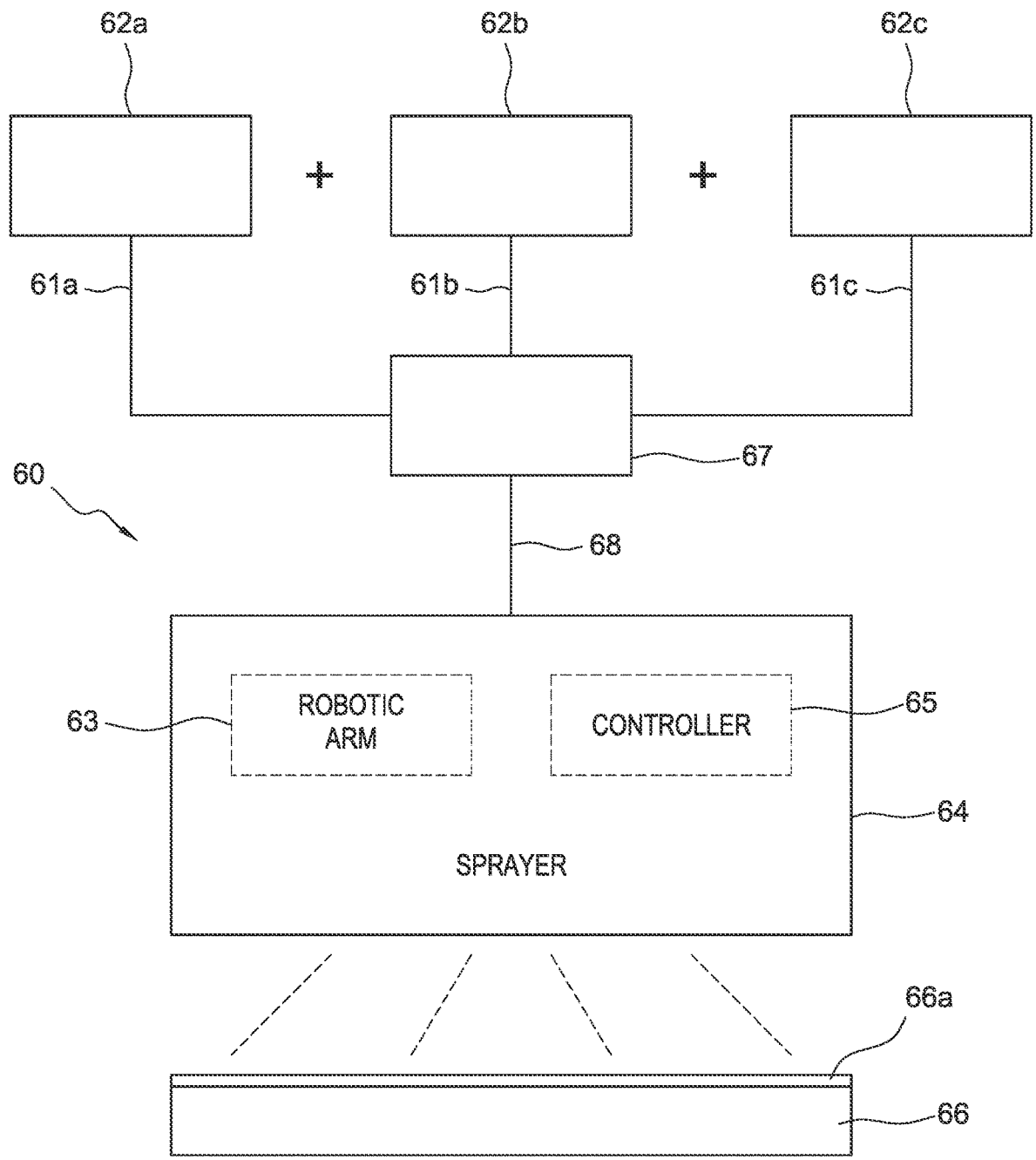
Figure 4B:
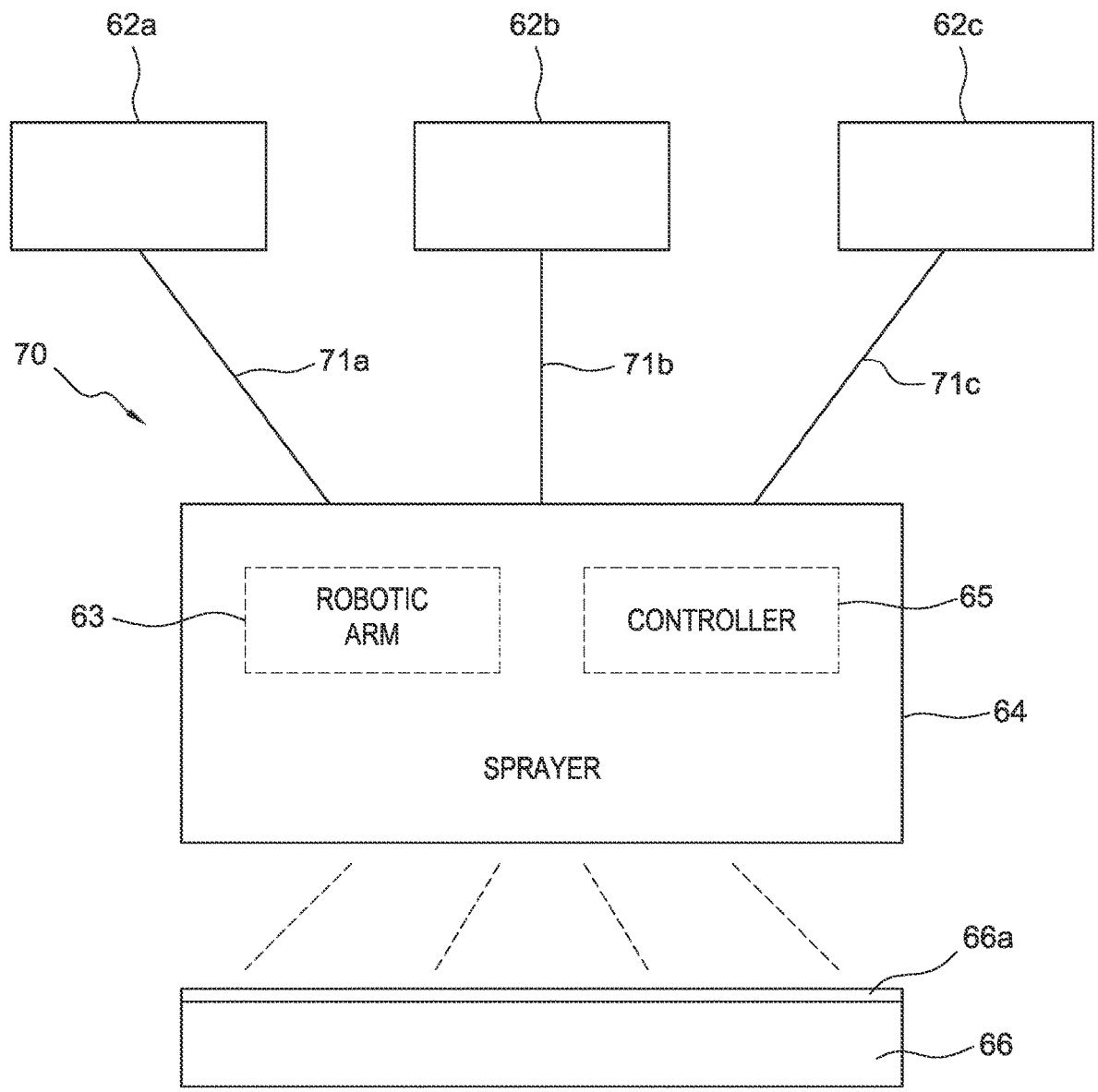
Figure 5:
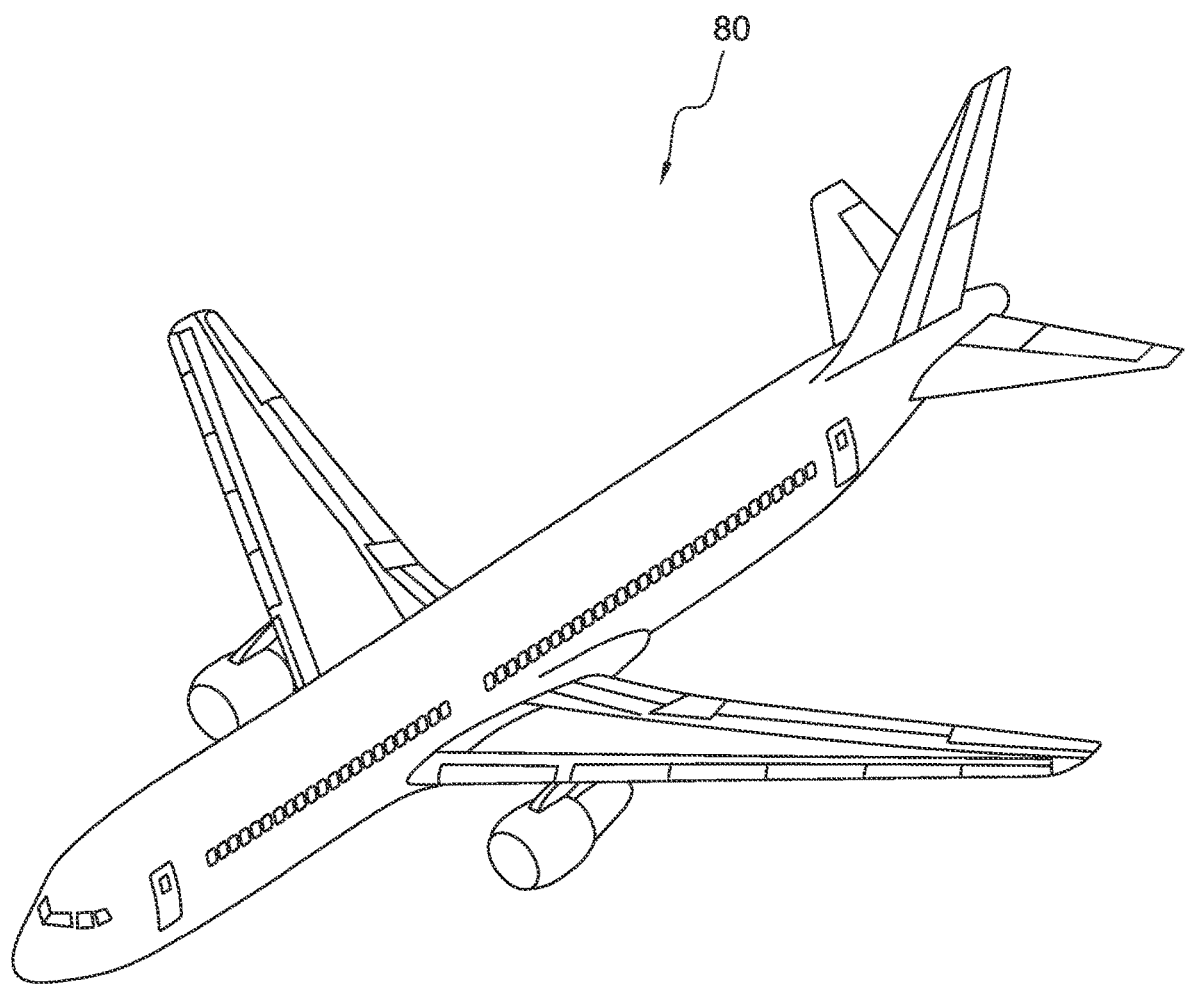
Figure 6A:
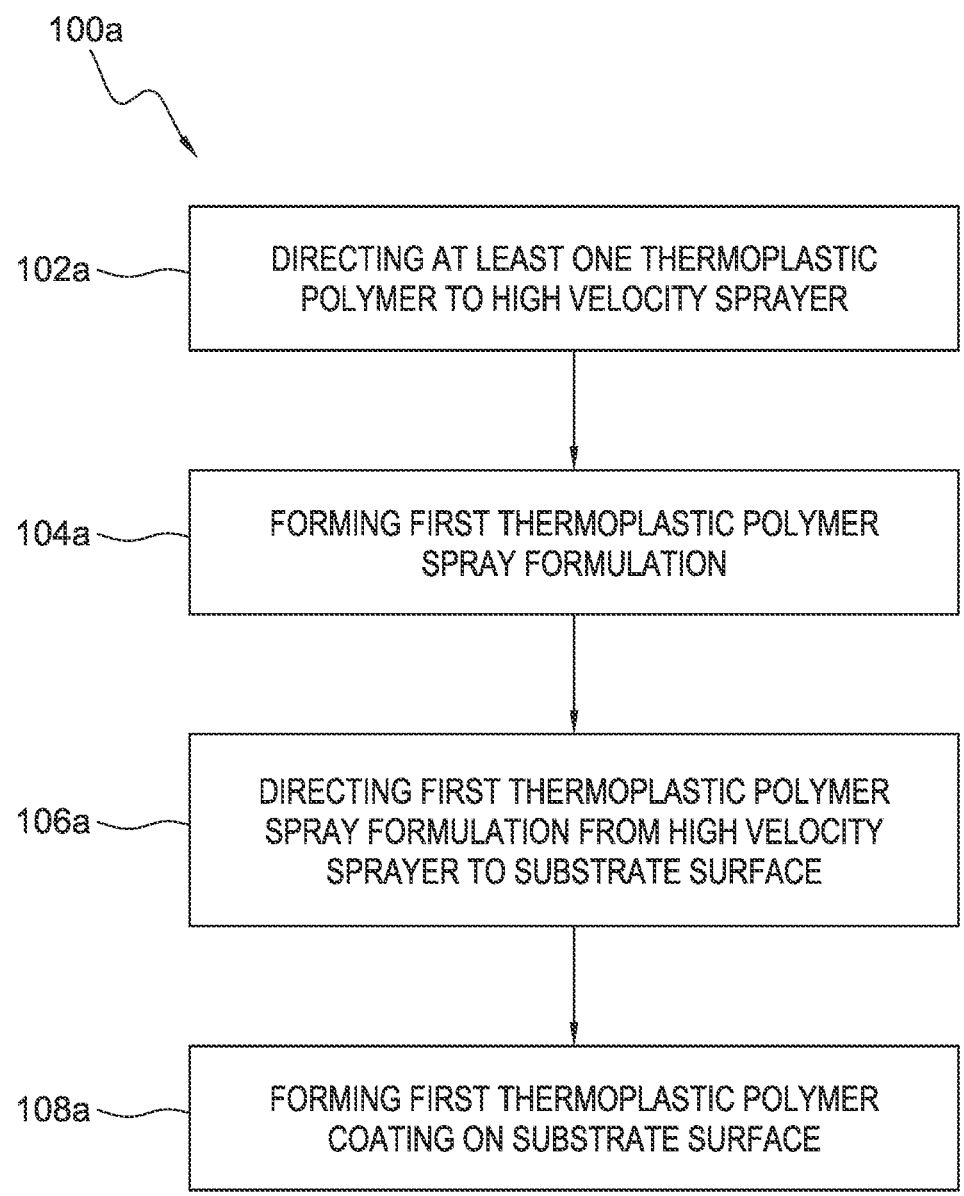
Figure 6B:
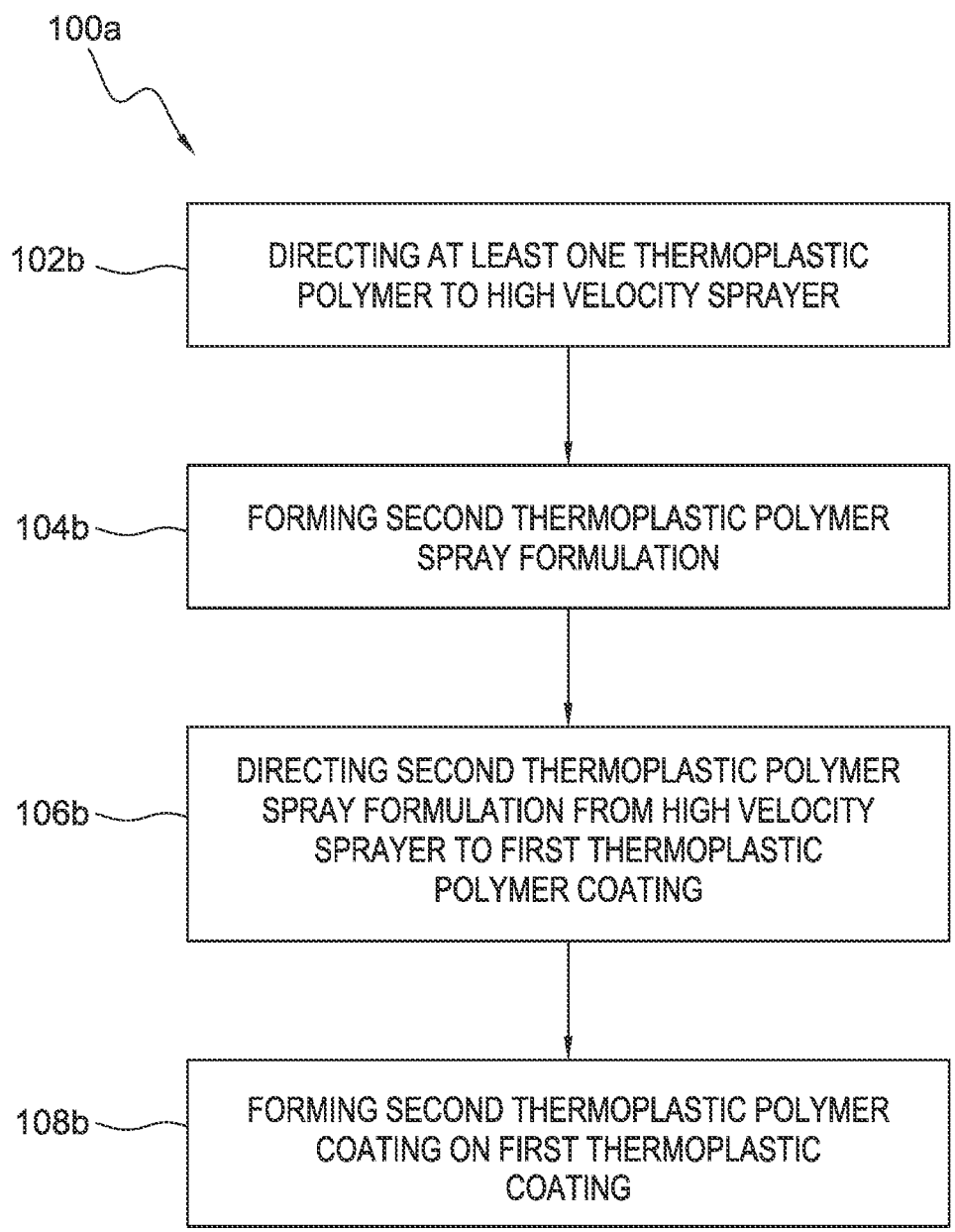
Figure 7A:
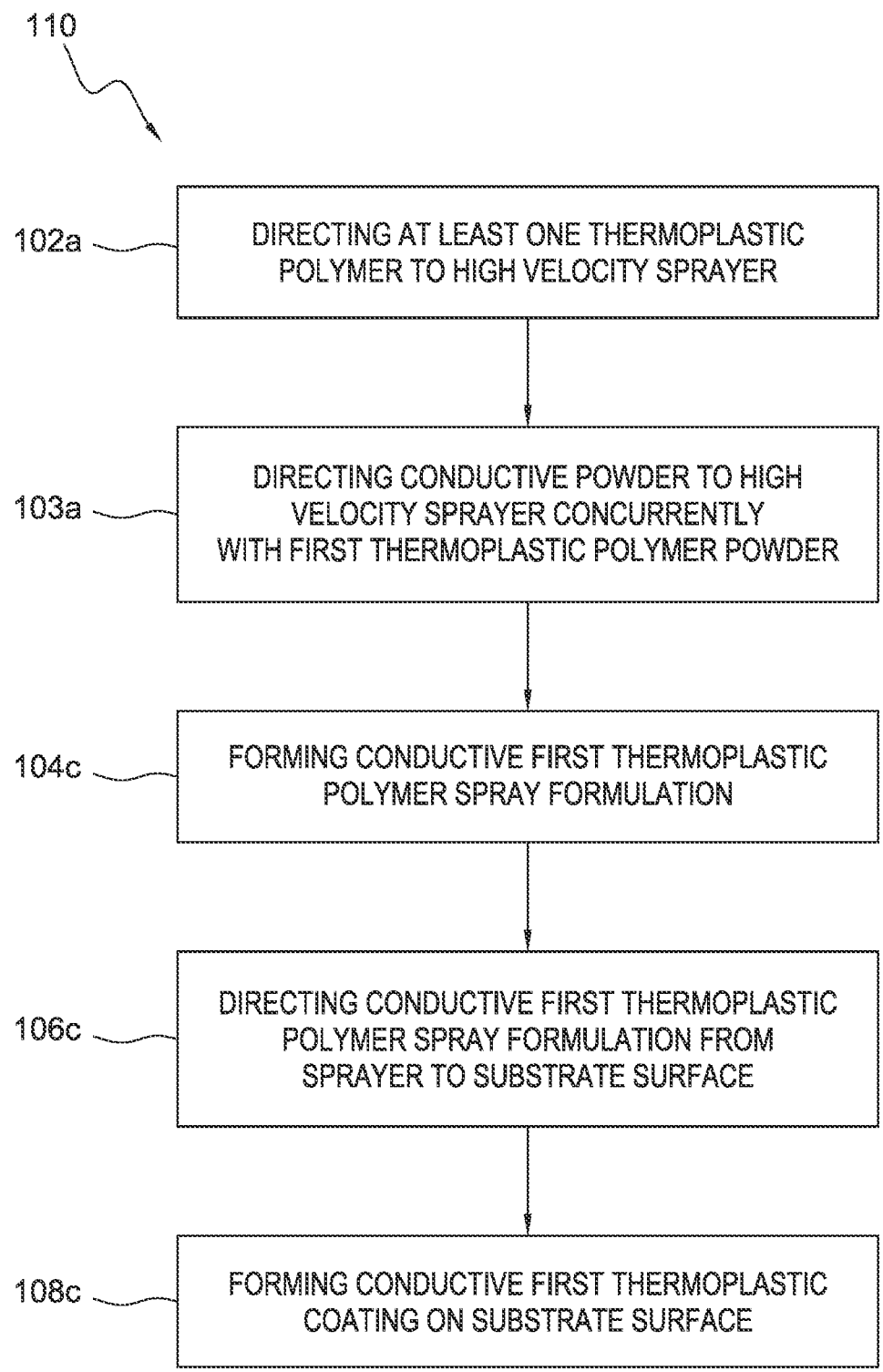
Figure 7B:
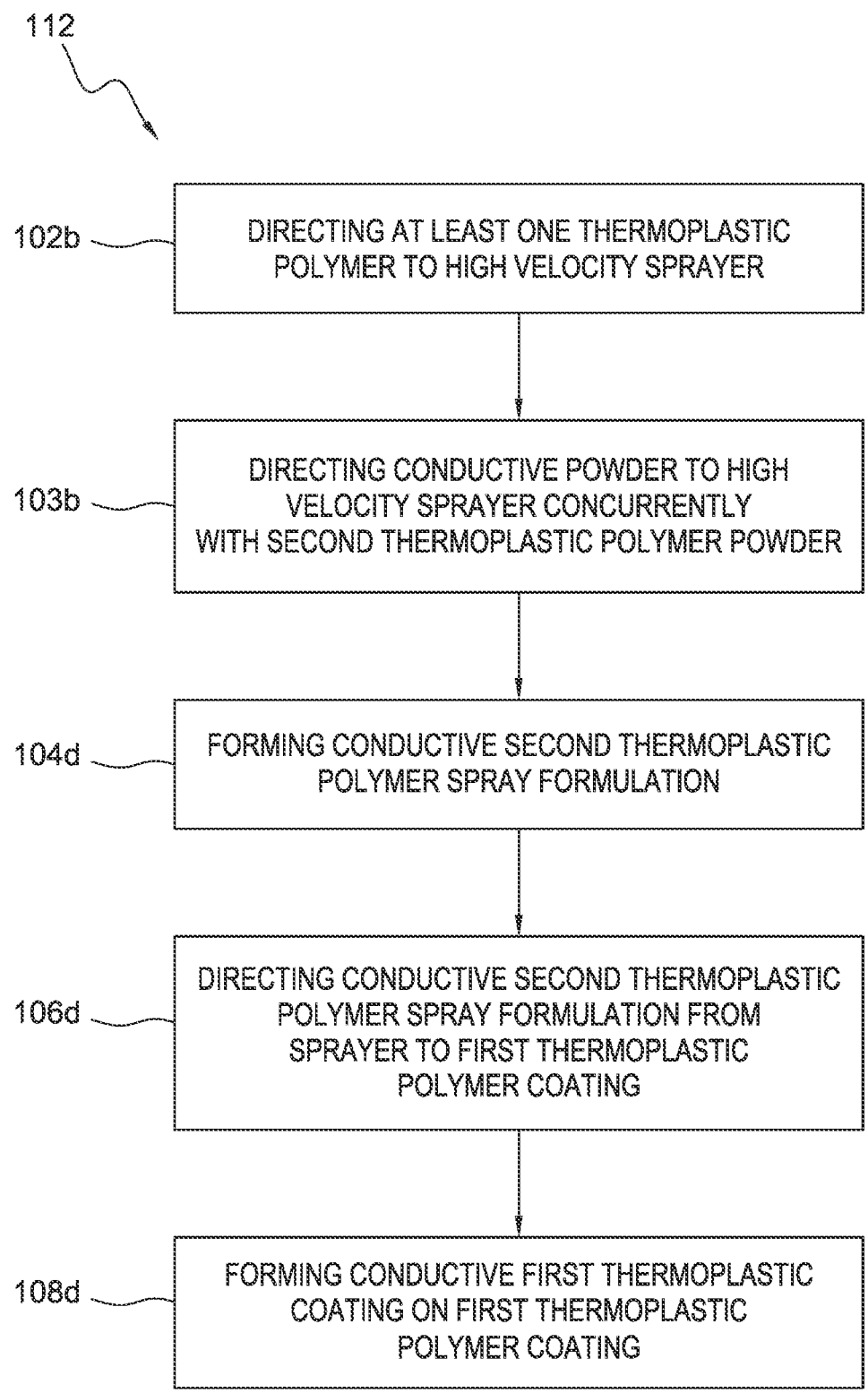
Figure 8A:
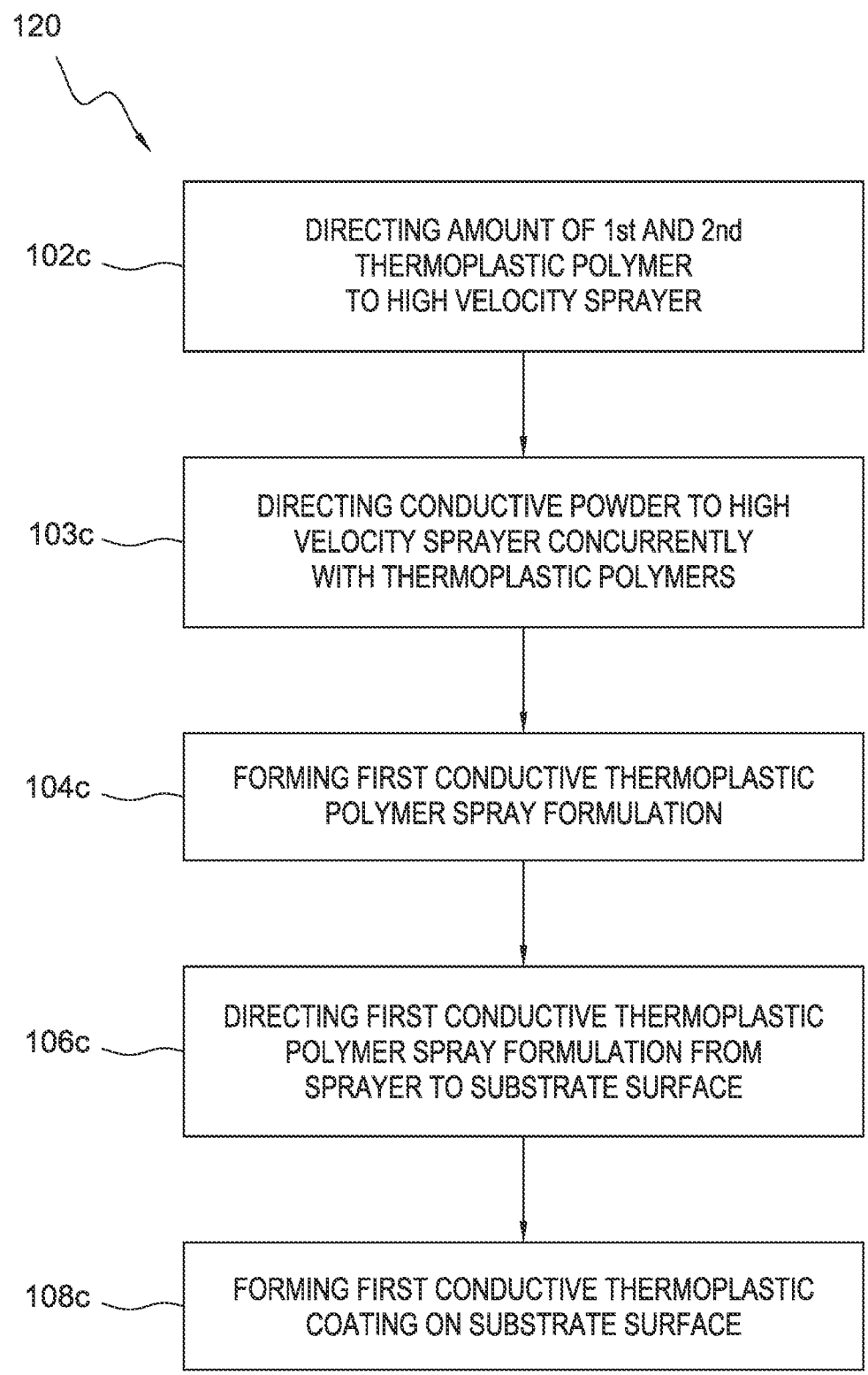
Figure 8B:
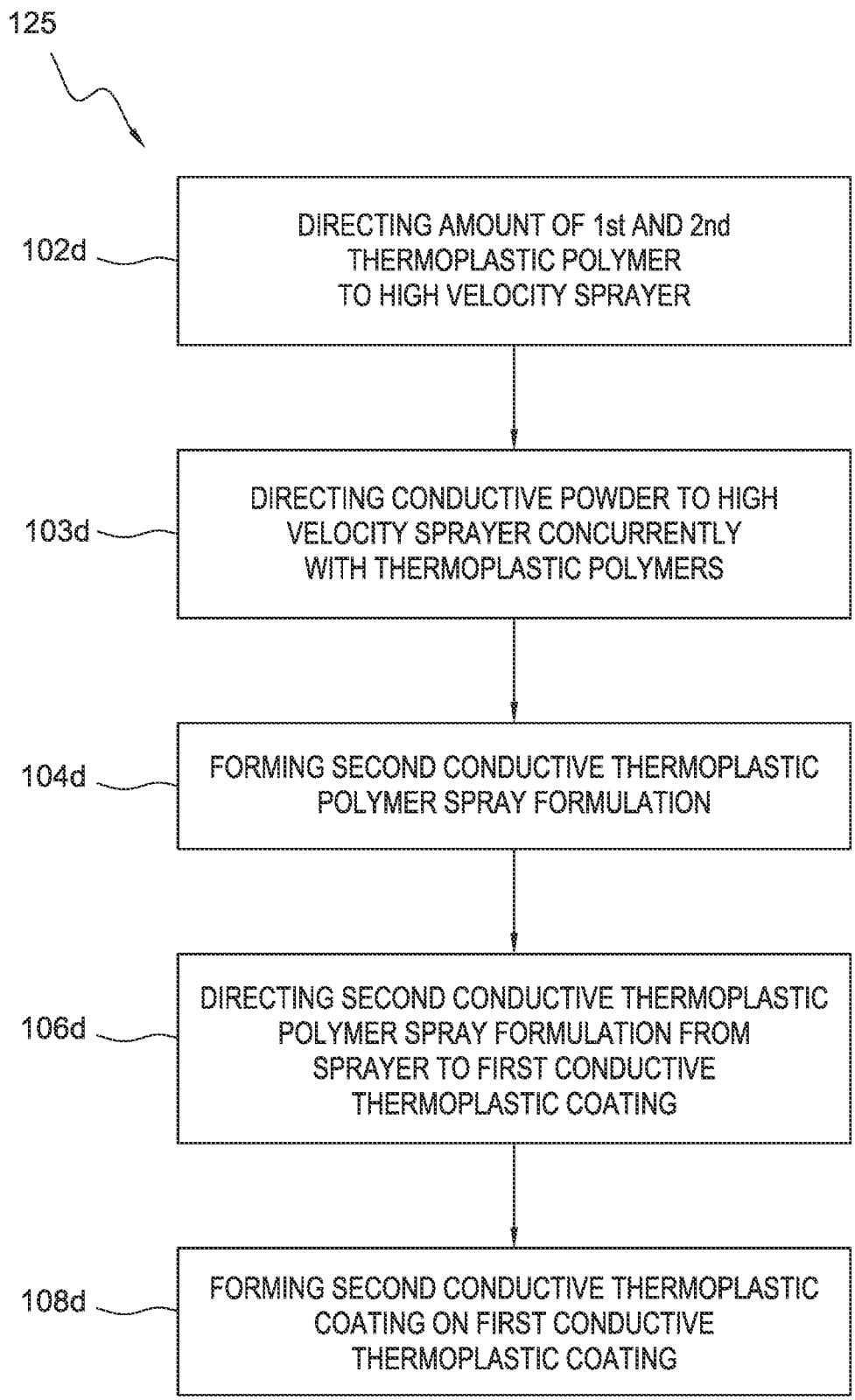
Figure 9:
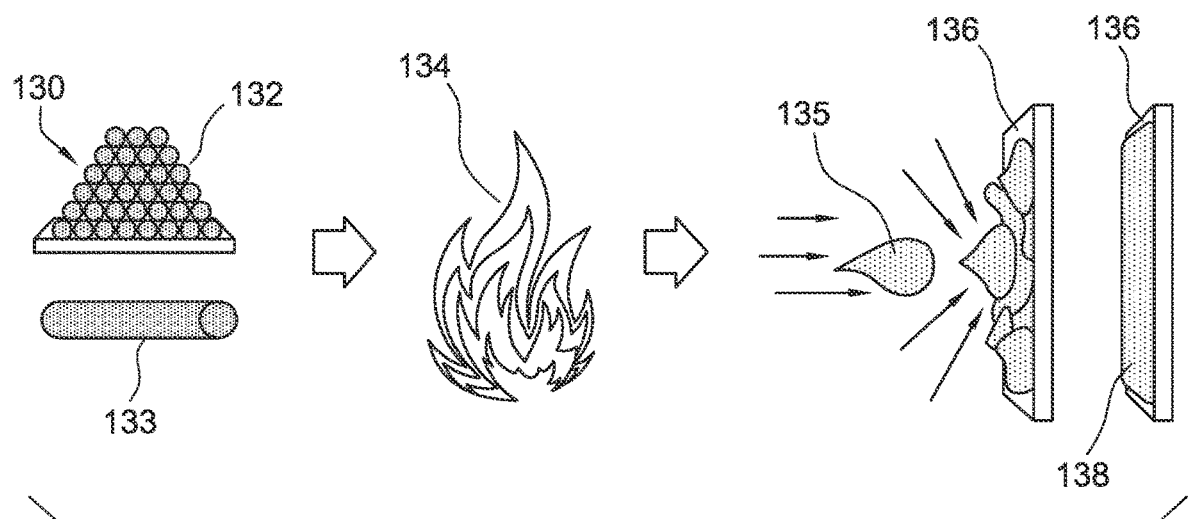
Figure 10:
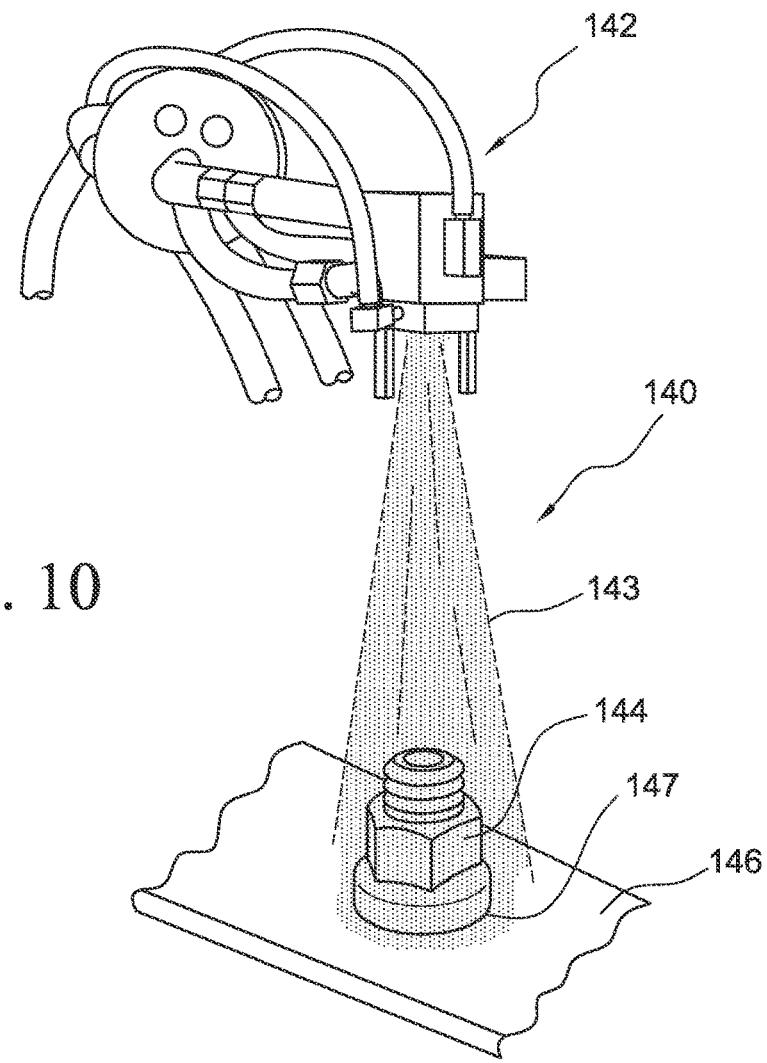
Figure 11:
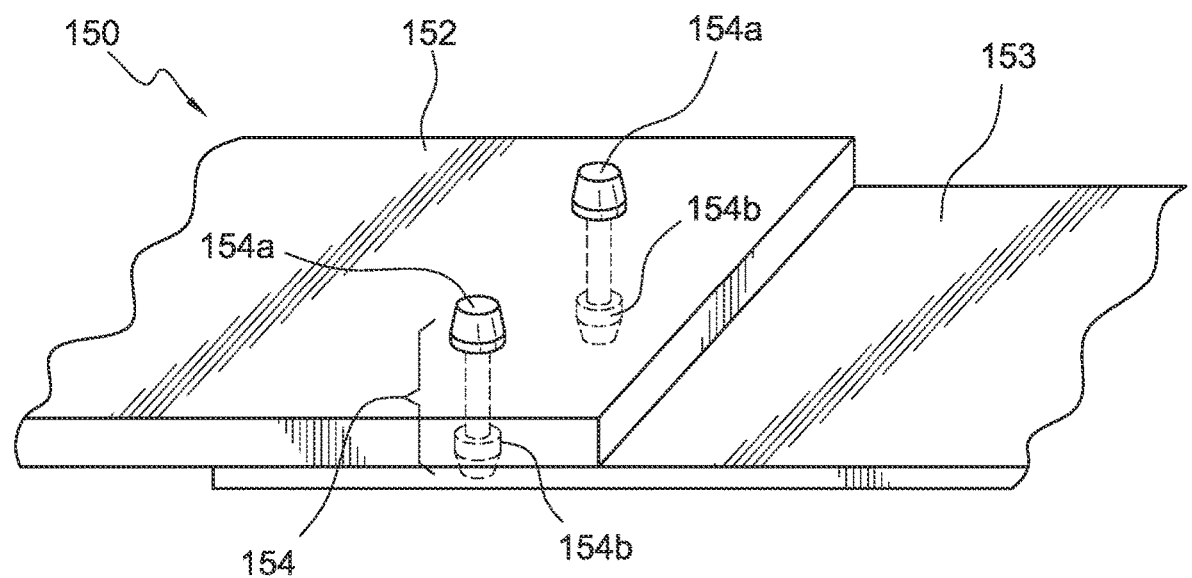
Figure 12:
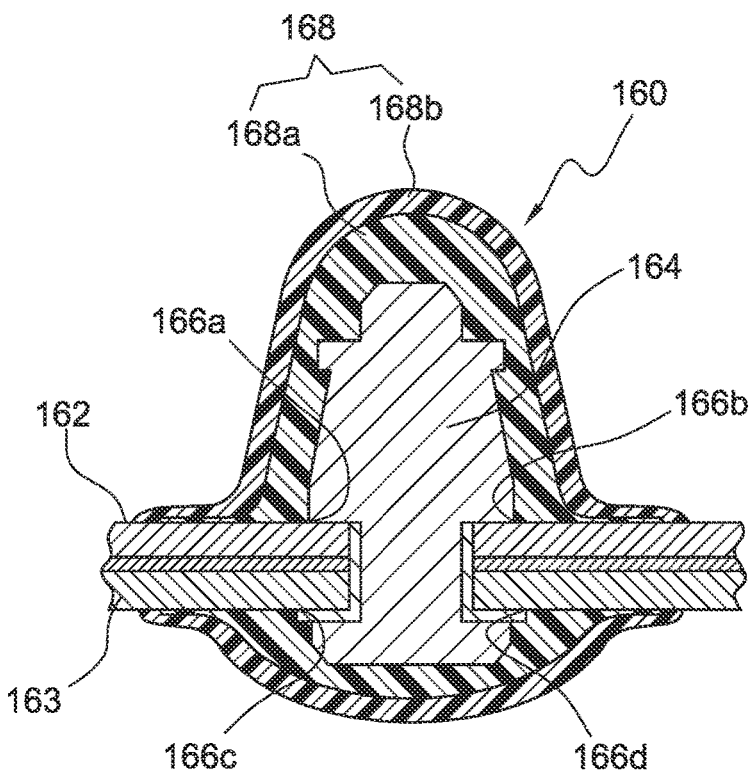
Figure 13:
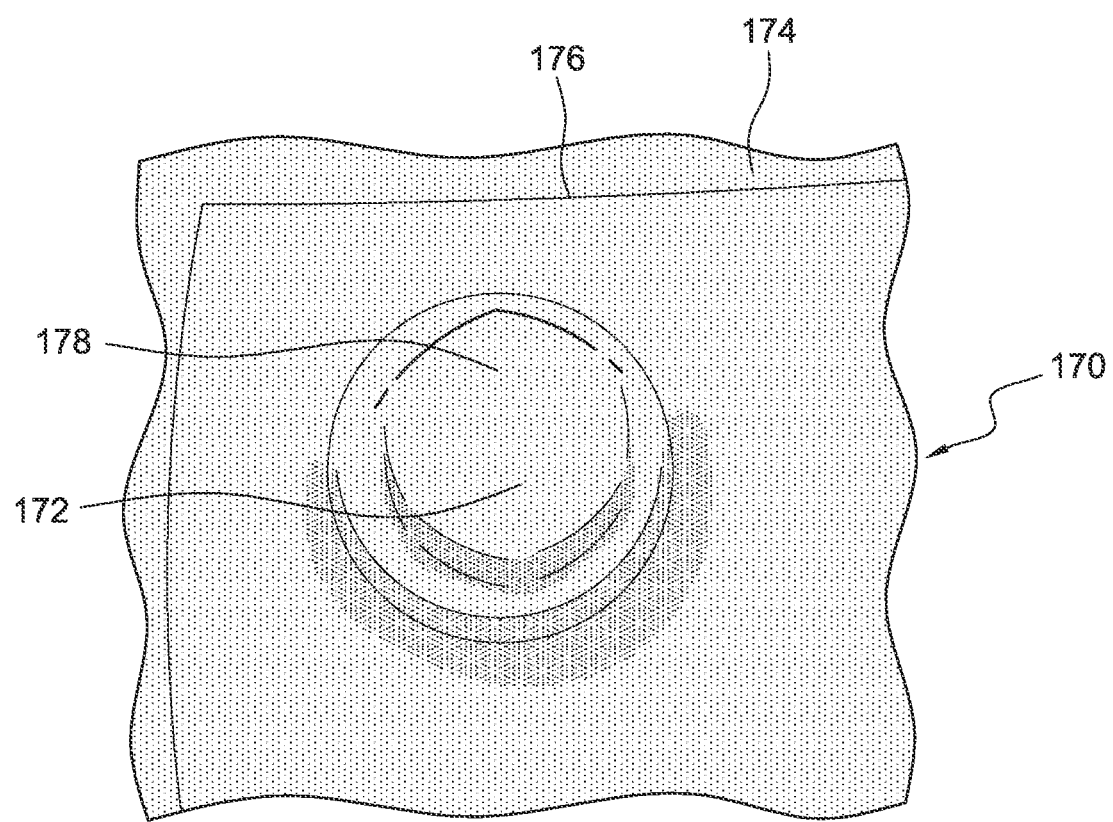
Figure 14A:
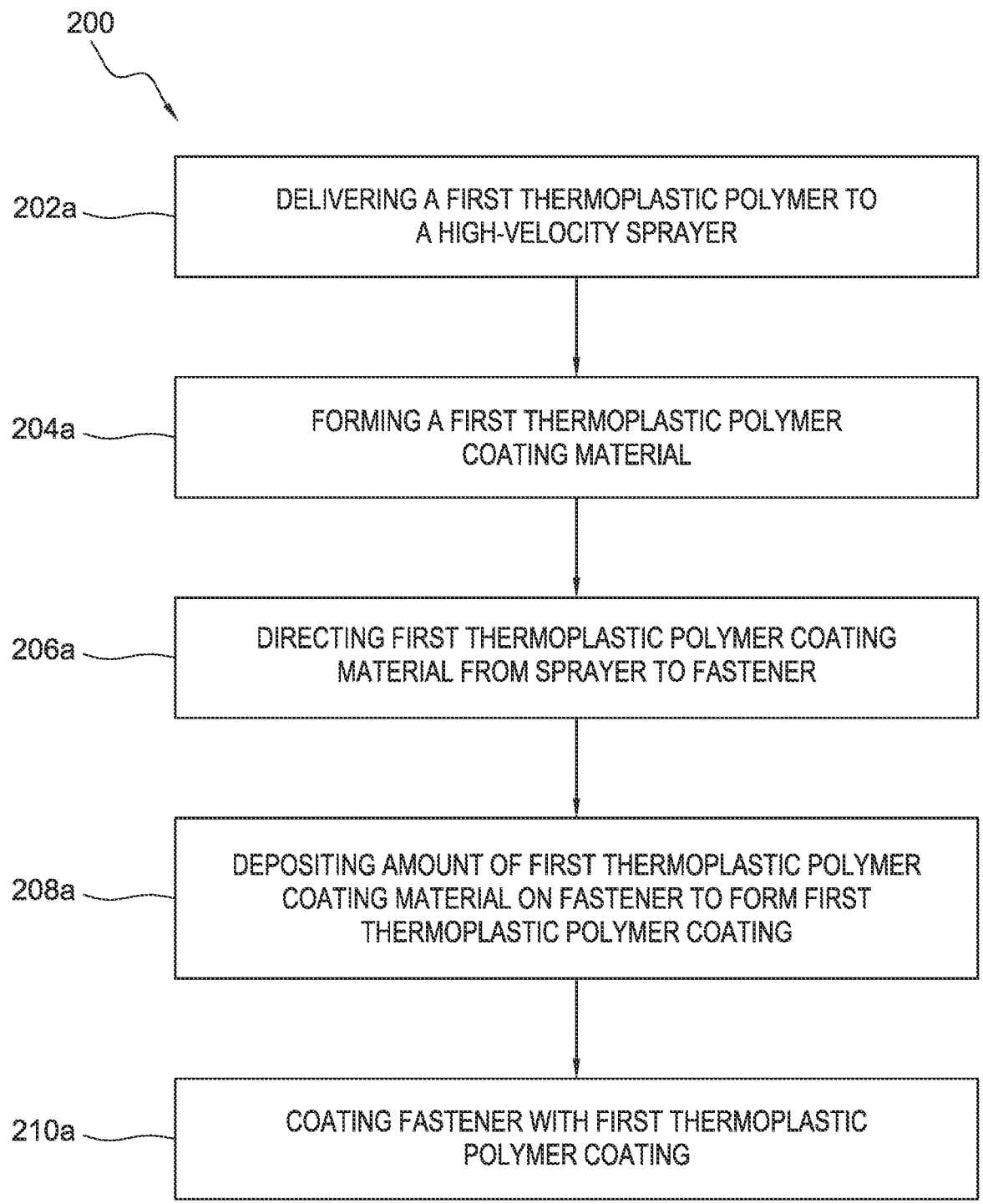
Figure 14B:
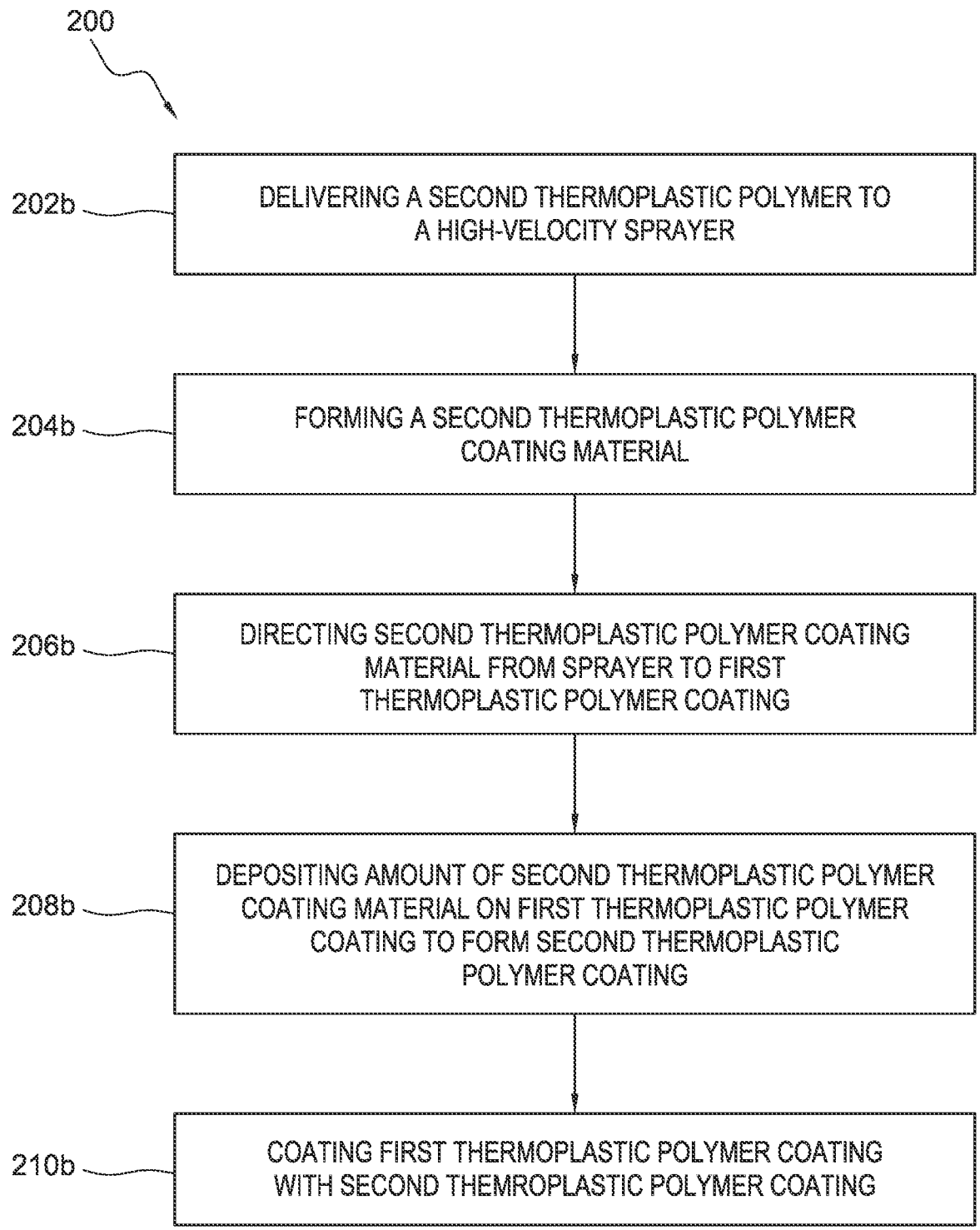
Figure 15A:
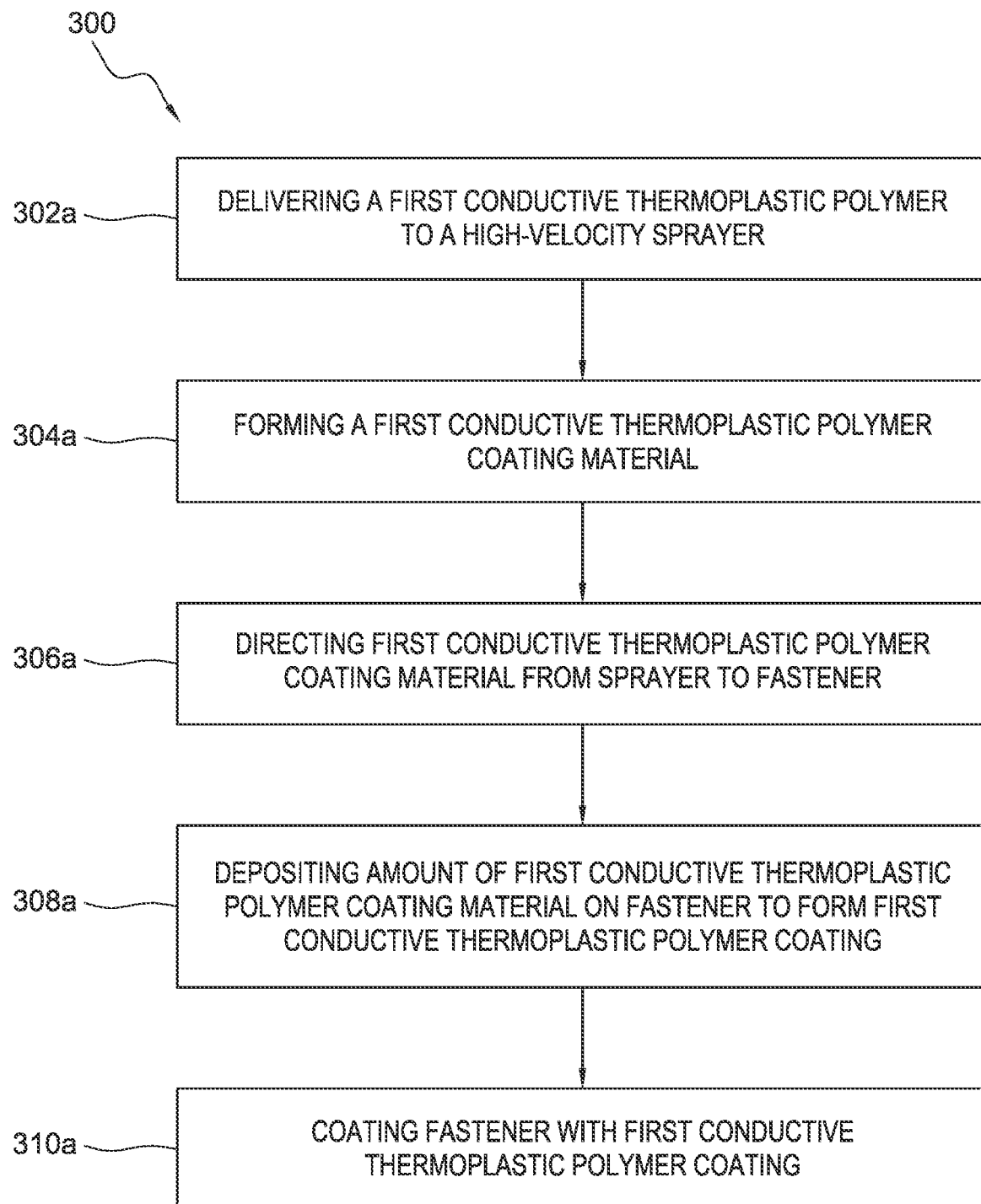
Figure 15B:
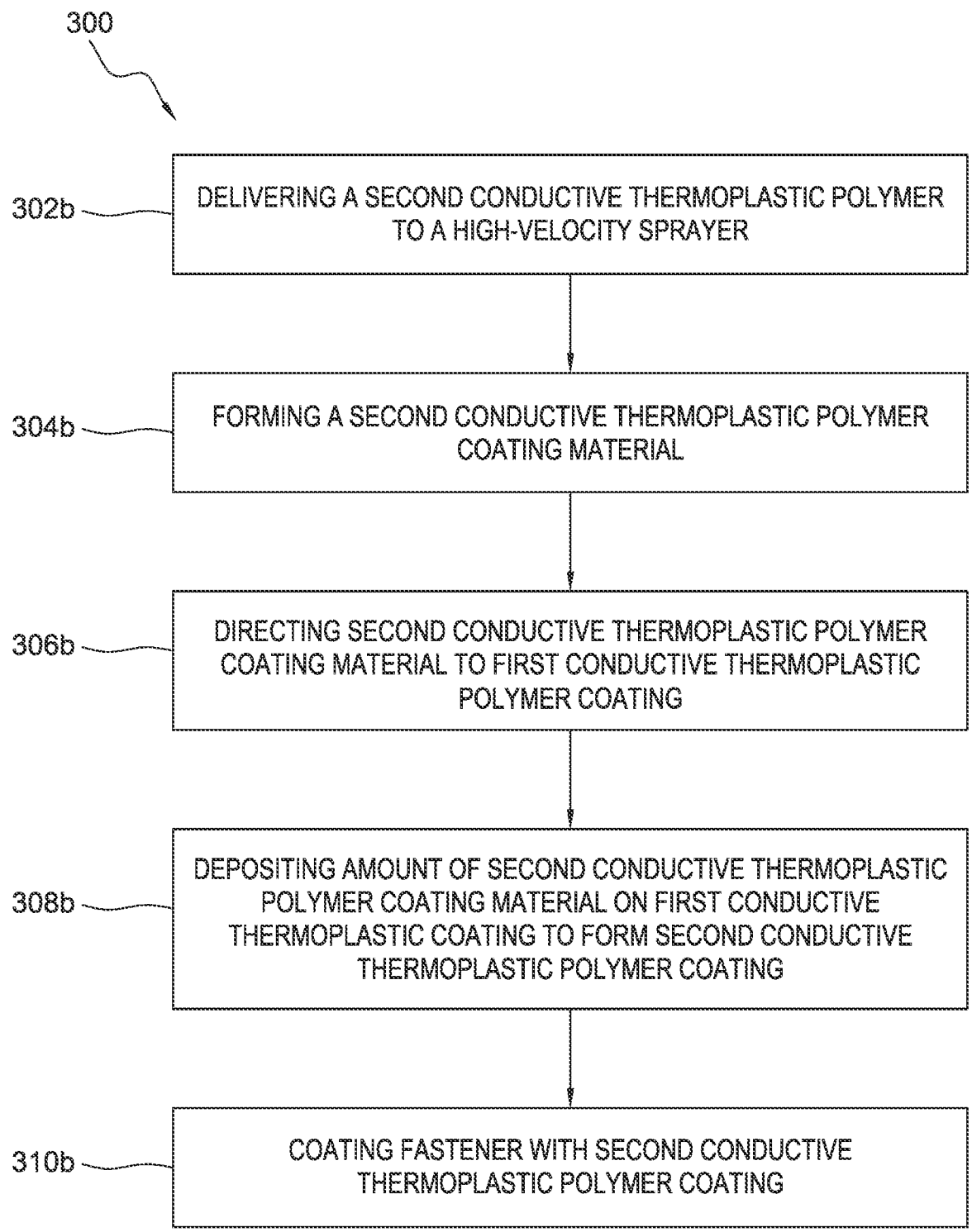
Figure 16A:
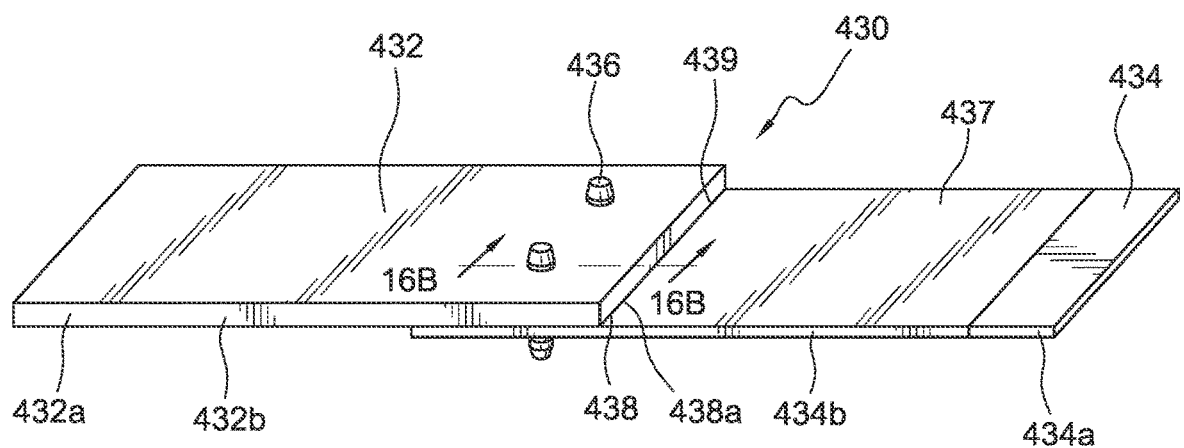
Figure 16B:
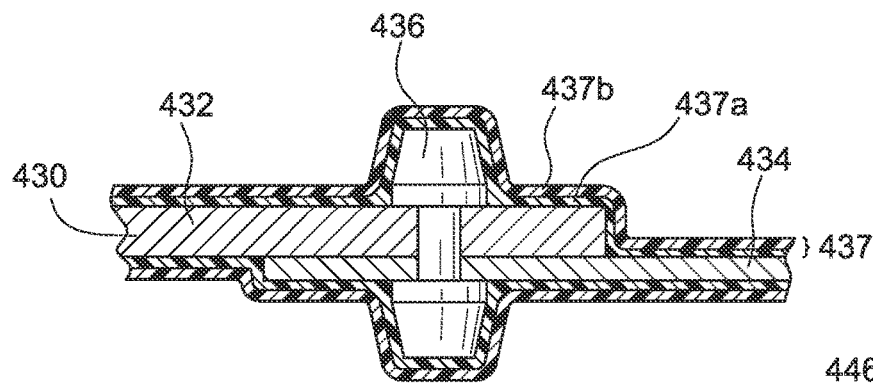
Figure 17:
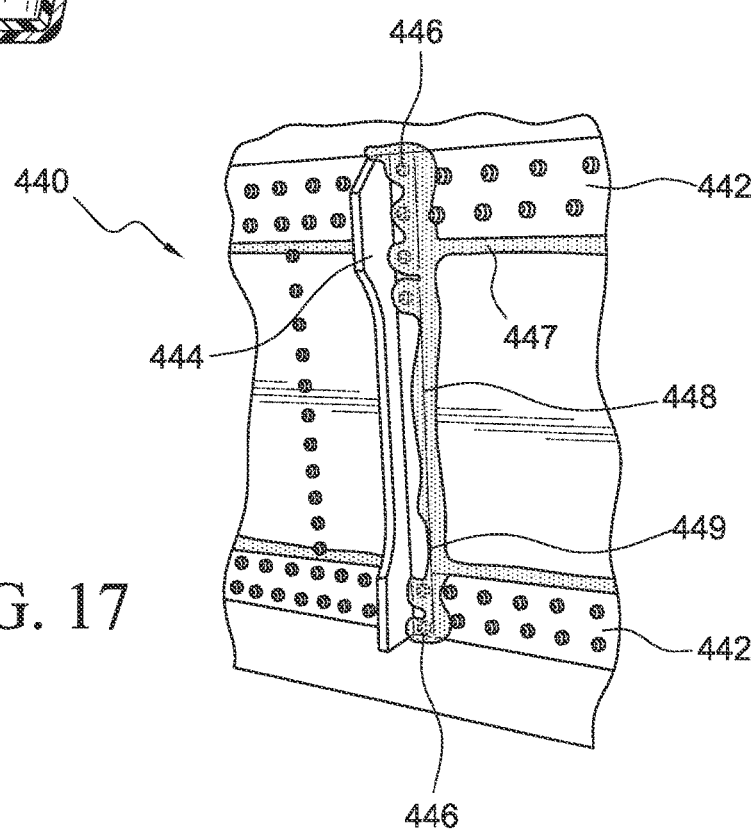
Figure 18:
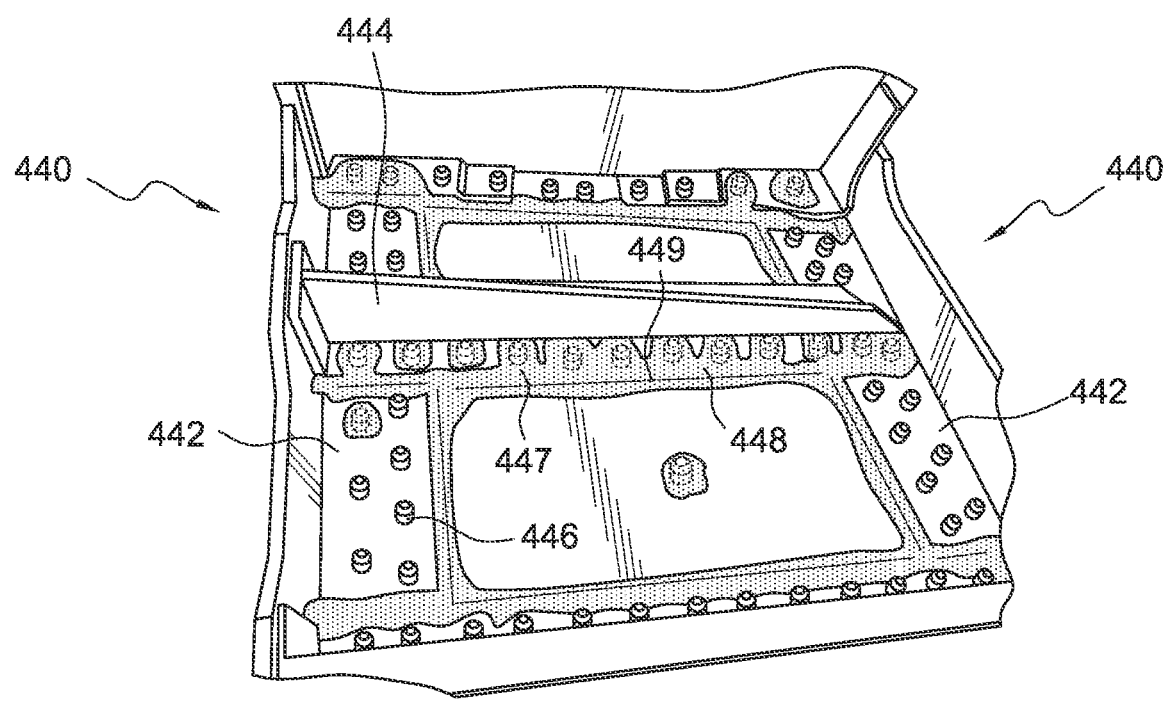
Figure 19:
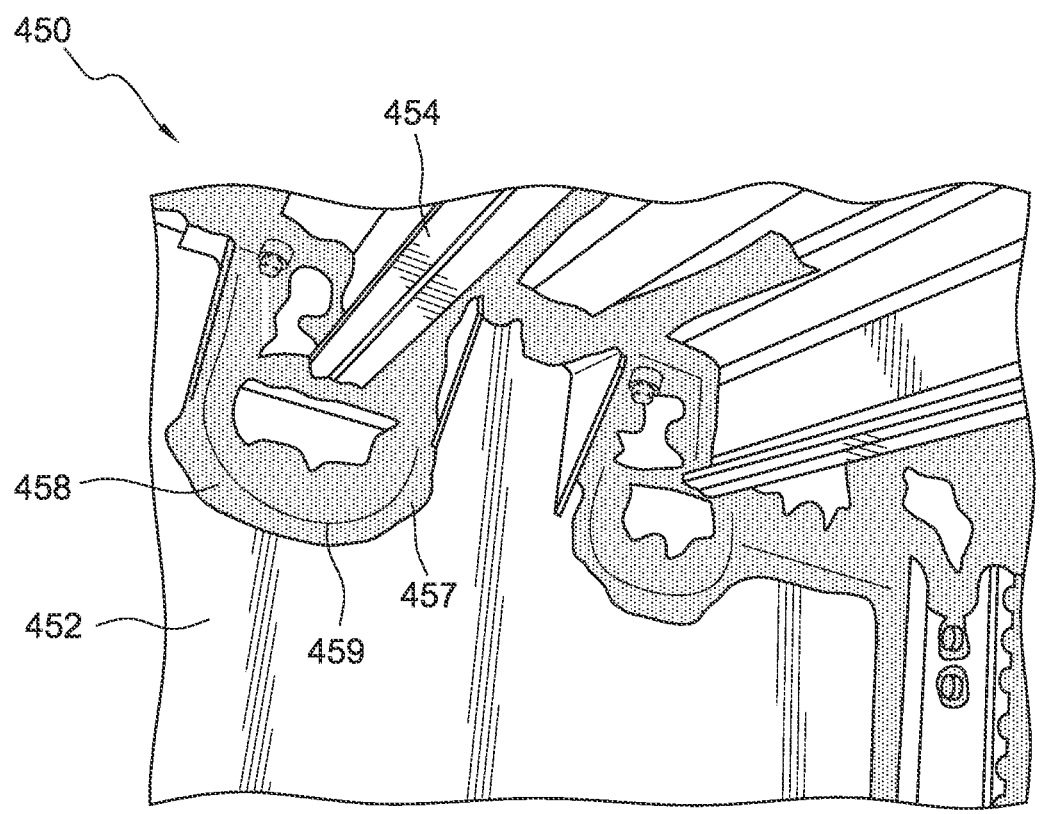
Figure 20A:
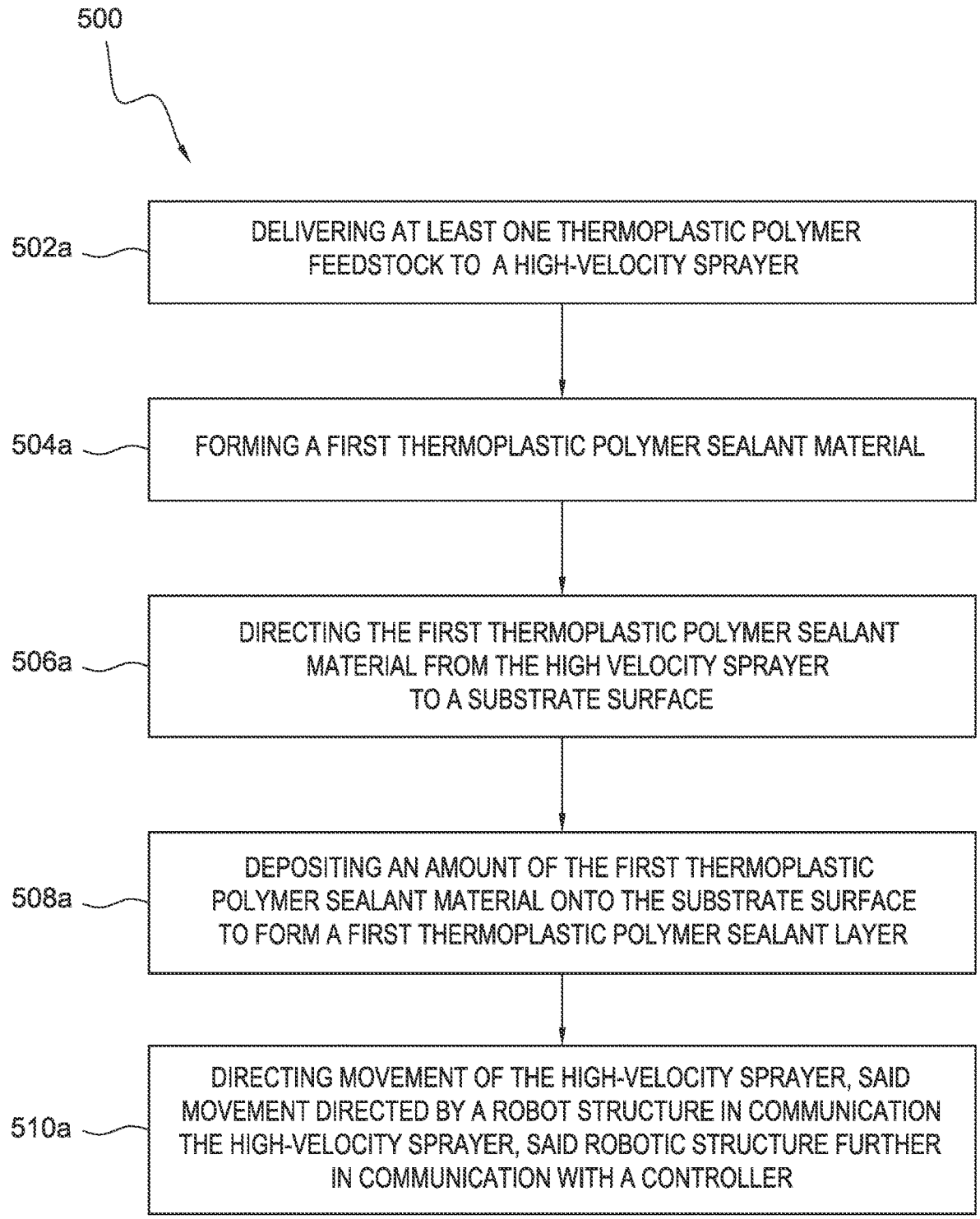
Figure 20B:
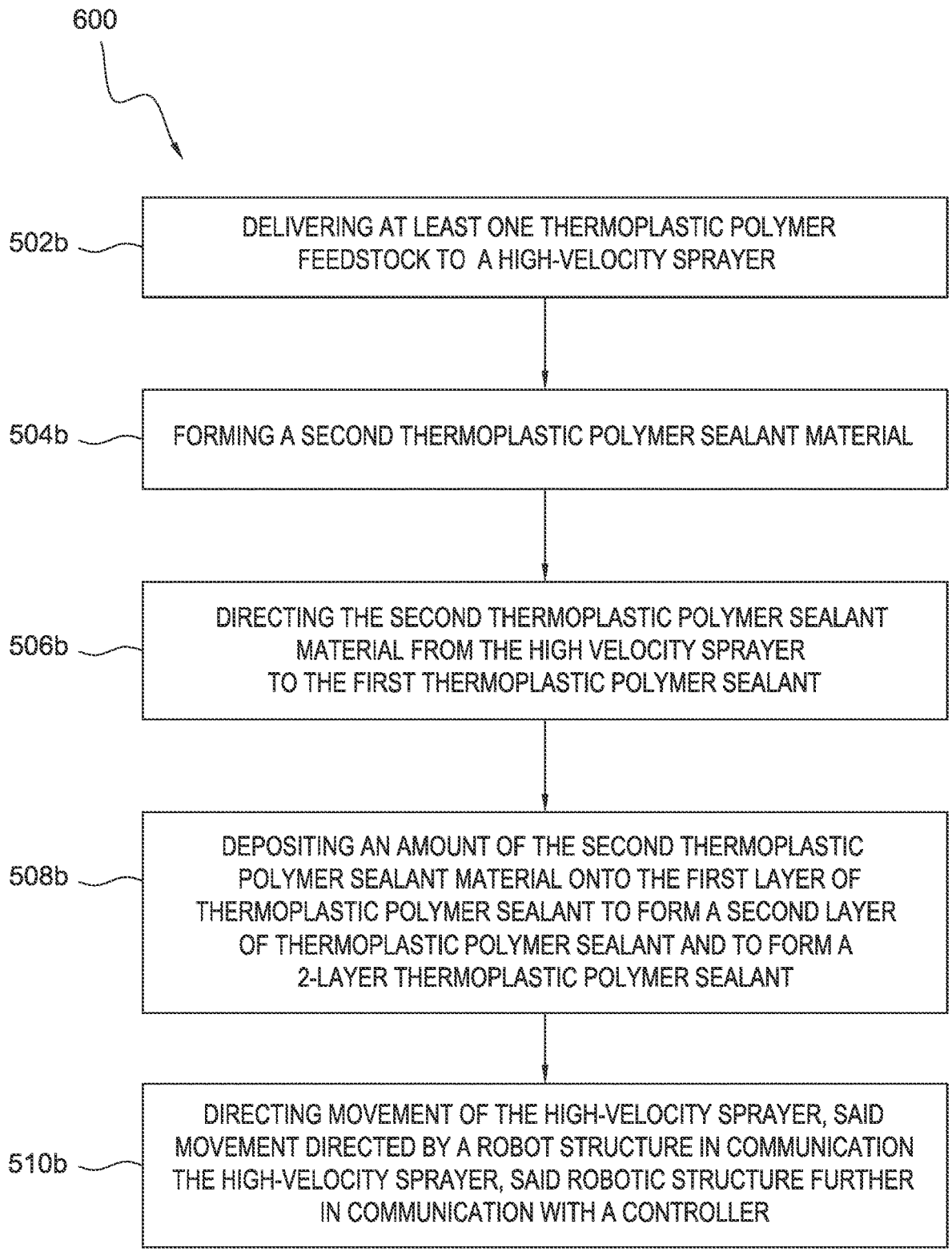
Figure 21A:
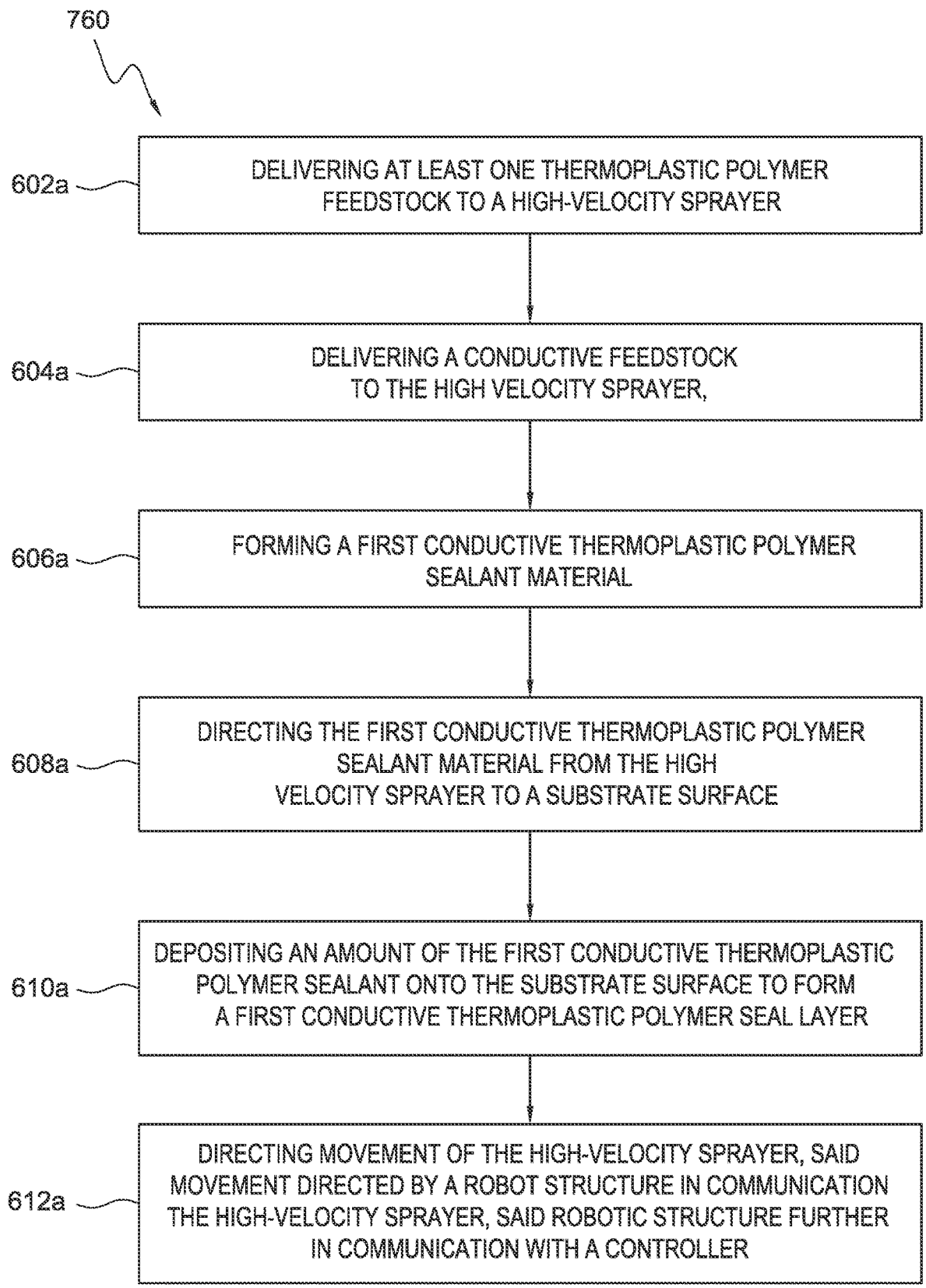
Figure 21B:
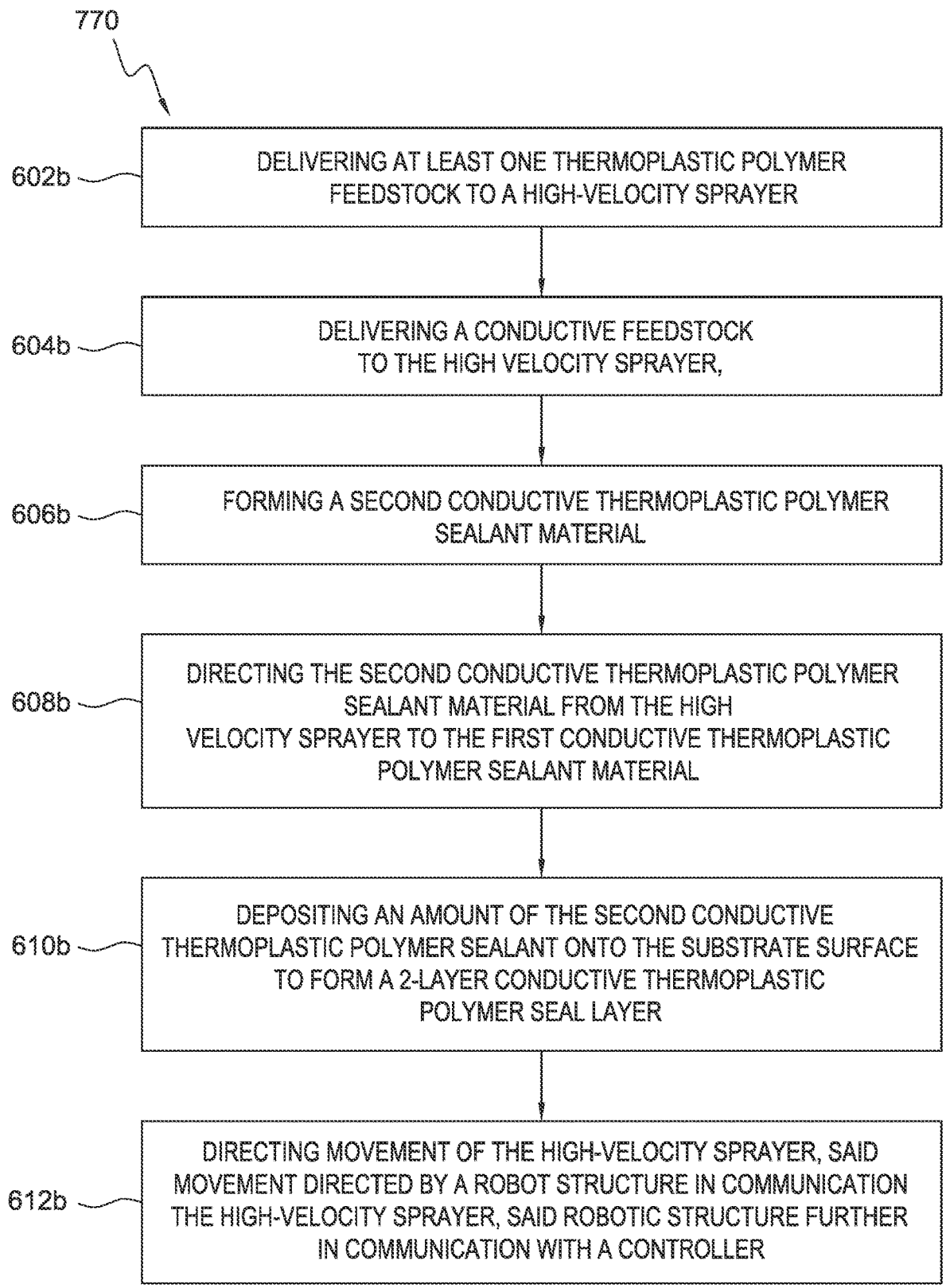
Figure 22:
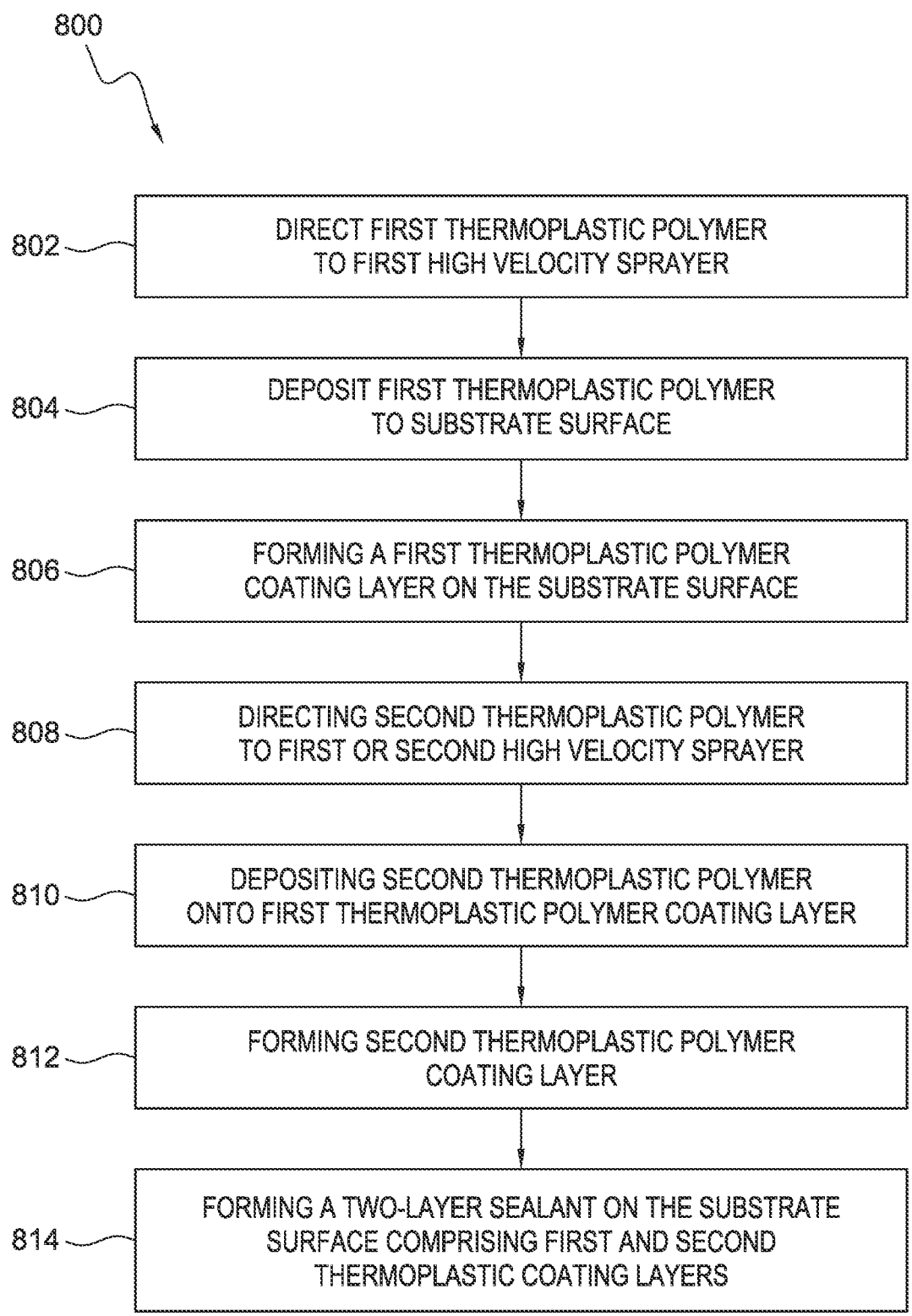
Figure 23:
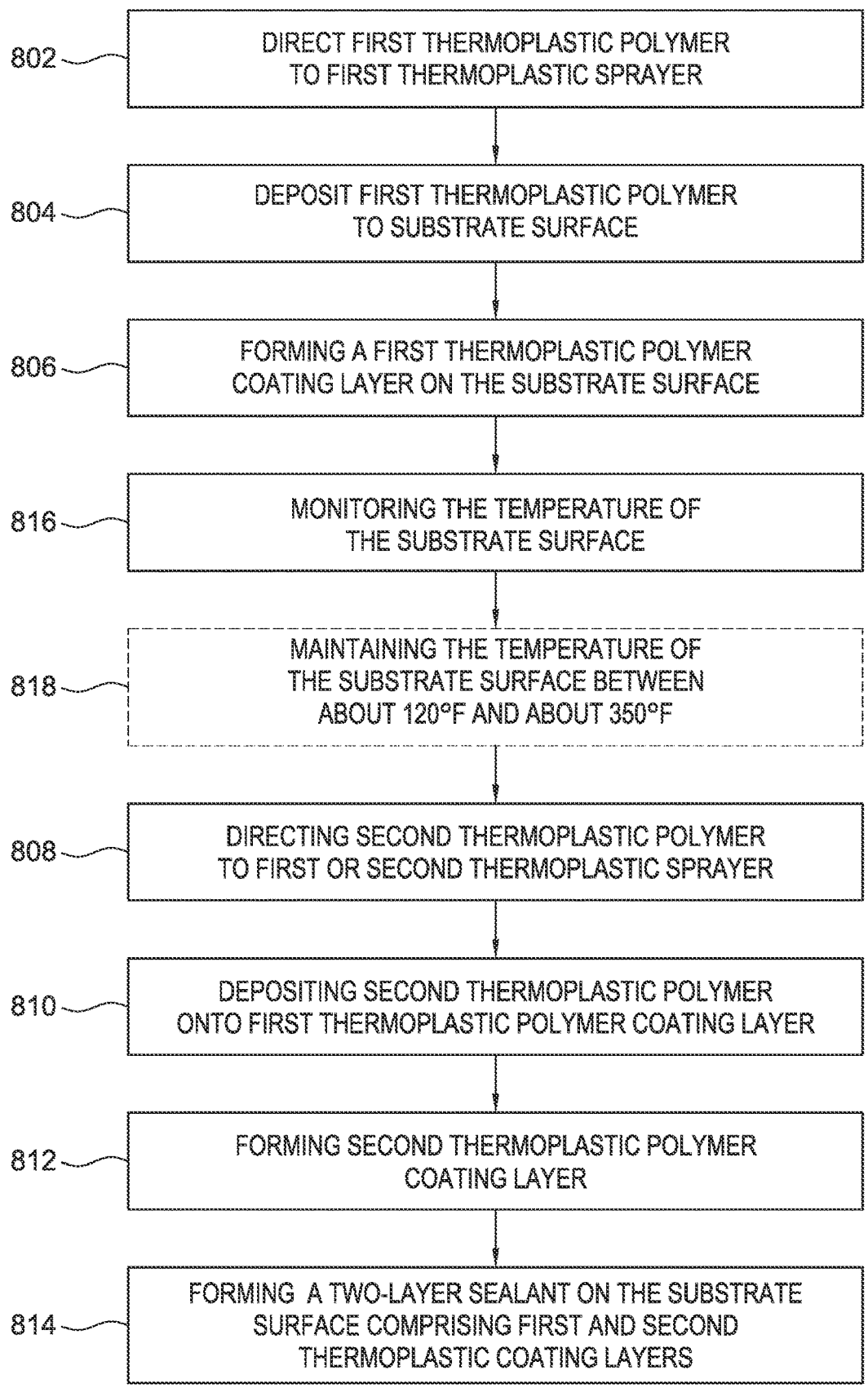

Having thus described variations of the disclosure in general terms, reference will now be made to the accompanying drawings, which are not necessarily drawn to scale, and wherein:

FIG. 1 is an illustration of an aspect of the present disclosure showing a thermoplastic polymer feedstock and a system including the thermoplastic polymer feedstock and a high-velocity sprayer for depositing a thermoplastic polymer coating onto a substrate surface or onto a first thermoplastic polymer coating layer;

FIG. 2A is an illustration of an aspect of the present disclosure showing the mixing of more than one thermoplastic polymer feedstocks to form a thermoplastic polymer feedstock mixture for use as a spray formulation, and a system including the thermoplastic polymer feedstock mixture and a high-velocity sprayer for depositing a tunable thermoplastic polymer coating onto a substrate surface or onto a first thermoplastic polymer coating layer;

FIG. 2B is an illustration of an aspect of the present disclosure showing a plurality of thermoplastic polymer feedstocks delivered via separate feedlines to the sprayer shown in FIG. 2A, and a system for depositing a tunable thermoplastic polymer coating onto a substrate surface or onto a first thermoplastic polymer coating layer;

FIG. 3A is an illustration of an aspect of the present disclosure showing at least one thermoplastic polymer feedstock mixed with at least one conductive feedstock to form a conductive thermoplastic feedstock mixture, and a system including the conductive thermoplastic polymer feedstock mixture and a high-velocity sprayer for depositing a conductive thermoplastic polymer coating onto a substrate surface or onto a first thermoplastic polymer coating layer;

FIG. 3B is an illustration of an aspect of the present disclosure showing at least one thermoplastic polymer feedstock and a conductive feedstock shown in FIG. 3A, and a system including a high-velocity sprayer for depositing a conductive thermoplastic polymer coating onto a substrate surface or onto a first thermoplastic polymer coating layer, with more than one thermoplastic polymer feedstock and the one or more conductive feedstock delivered or directed to the sprayer via separate feed lines;

FIG. 4A is an illustration of an aspect of the present disclosure showing more than one thermoplastic polymer feedstocks mixed with a conductive feedstock to form a conductive thermoplastic polymer feedstock mixture, and a system including the conductive thermoplastic polymer feedstock mixture and a high-velocity sprayer for depositing a conductive thermoplastic polymer coating onto a substrate surface or onto a first thermoplastic polymer coating layer;

FIG. 4B is an illustration of an aspect of the present disclosure showing two different thermoplastic polymer feedstocks and a conductive feedstock shown in FIG. 4A, and a system including the two different thermoplastic polymer feedstocks, the conductive feedstock and a high-velocity sprayer for depositing a conductive thermoplastic polymer coating onto a substrate surface or onto a first thermoplastic polymer coating layer, with the two thermoplastic polymer feedstocks and the conductive feedstock delivered or directed to the sprayer via separate feed lines;

FIG. 5 is an illustration of an aircraft comprising assemblies and subassemblies that further comprise fasteners having coatings according to aspects of the present disclosure, with the fasteners coated using systems and coated via methods according to aspects of the present disclosure;

FIG. 6A is a flowchart outing a method according to aspects of the present disclosure;

FIG. 6B is a flowchart outing a method according to aspects of the present disclosure;

FIG. 7A is a flowchart outing a method according to aspects of the present disclosure;

FIG. 7B is a flowchart outing a method according to aspects of the present disclosure;

FIG. 8A is a flowchart outing a method according to aspects of the present disclosure;

FIG. 8B is a flowchart outing a method according to aspects of the present disclosure;

FIG. 9 is an illustration of a thermal coating process according to a present aspect;

FIG. 10 is an illustration of an aspect of the disclosure showing a high-velocity sprayer coating the underside of a fastener in place in an assembly;

FIG. 11 is an illustration showing fasteners according to aspects of the present disclosure in position in an assembly; and FIG. 12 is a cross-sectional side view of a coated fastener in an assembly according to aspects of the present disclosure;

FIG. 13 is a top view of a coated fastener according to aspects of the present disclosure;

FIG. 14A is a flowchart outlining methods according to aspects of the present disclosure;

FIG. 14B is a flowchart outlining methods according to aspects of the present disclosure;

FIG. 15A is a flowchart outlining methods according to aspects of the present disclosure;

FIG. 15B is a flowchart outlining methods according to aspects of the present disclosure;

FIG. 16A is an illustration of two parts, or substrates fastened together in an assembly and forming fillet seals at their juncture and having fillet seals and edge seals with sealant applied according to aspects of the present disclosure;

FIG. 16B is an enlarged cross-sectional view of the assembly shown in FIG. 16A;

FIG. 17 is an illustration of a fillet seal with a sealant applied according to an aspect of the present disclosure;

FIG. 18 is an illustration of a fillet seal with a sealant applied according to an aspect of the present disclosure;

FIG. 19 is an illustration of a fillet seal with a sealant applied according to an aspect of the present disclosure;

FIG. 20A is a flowchart outlining methods according to aspects of the present disclosure;

FIG. 20B is a flowchart outlining methods according to aspects of the present disclosure;

FIG. 21A is a flowchart outlining methods according to aspects of the present disclosure;

FIG. 21B is a flowchart outlining methods according to aspects of the present disclosure;

FIG. 22 is a flowchart outlining methods according to aspects of the present disclosure; and FIG. 23 is a flowchart outlining methods according to aspects of the present disclosure.

DETAILED DESCRIPTION

Aspects of the present disclosure are directed to multi-layer thermoplastic polymer sealants, including sealants comprising a first thermoplastic polymer layer, selected for having a first set of particular desired characteristics or properties, and that can be applied to a substrate surface via a high-power sprayer that may be a thermal sprayer. The presently disclosed sealants further comprise a second thermoplastic polymer layer applied to the deposited first thermoplastic polymer layer via a high-power sprayer that can be a thermal sprayer. The second thermoplastic polymer is selected for having a second set of particular desired characteristics or properties, with at least one characteristic or property being different from the first deposited thermoplastic polymer layer.

The first and/or second thermoplastic polymer feedstock can be a thermoplastic feedstock formulation that can be tunable, or otherwise have feedstock characteristics changed in real time during polymer material deposition. The feedstock materials can include or be provided with varying amounts of conductive materials, making the resulting deposited thermoplastic polymers conductively tunable by altering amounts introduced to or from the respective feedstocks. The thermoplastic polymer feedstock formulations can further be a powdered thermoplastic polymer feedstock formulation. The resulting first and second thermoplastic polymer layers are selected to be different from each other (and the respective thermoplastic polymer feedstock are selected to be different from one another), with the resulting first and second thermoplastic polymer layers each having predetermined and desired characteristics and properties.

Aspects of disclosed two-layer thermoplastic coating formulations, including formulations that can contain a conductive material and that can be tuned or tailored, including in real time, provide a wide range of desired and predetermined characteristics in the formation of the multi-layer (and preferably two-layer) thermoplastic coatings. The present coatings, that in combination form the at least a two-layer thermoplastic polymer sealant, provide robust protective qualities to the substrates being coated with the presently disclosed two-layer thermoplastic polymer sealants.

When a conductive component is introduced into one or more of the thermoplastic polymer feedstocks that are directed to the high-velocity sprayer, electrically conductive thermoplastic polymer layers are produced that can provide a particular, and wide-ranging amount of predetermined and desired resistivity or conductivity to the substrates being coated with the presently disclosed conductive thermoplastic coatings.

Additionally, aspects of the present disclosure are directed to thermoplastic coating formulations that can be tailored to deliver a thermoplastic coating using high-velocity spraying techniques to metallic and non-metallic substrates and components. When a conductive feedstock material is present in the thermoplastic polymer feedstock, various characteristics of the resulting applied conductive thermoplastic polymer coatings can be predictably tailored, even in substantially real-time, by changing the proportions of feedstock constituents (e.g. the at least one thermoplastic polymer feedstock and the conductive feedstock) that are provided to the high-velocity sprayer.

Without being limiting, when the feedstock is a powdered feedstock, the average particle size of the thermoplastic polymer powders used according to aspects of the present disclosure range from about 20 µm to about 300 µm. In addition, without being limiting, the average particle size of the conductive powders used according to aspects of the present disclosure range from about 5 µm to about 80 µm.

The high-velocity sprayers used in connection with aspects of the present disclosure include sprayers able to disperse a feedstock at velocities ranging from about 20 m/s to about 1200 m/s. Such sprayers include thermal (e.g., flame sprayers, etc.) and cold sprayers.

Aspects of the present disclosure are directed to thermoplastic formulations that can be tunable, or otherwise have their characteristics changed, in real time, during deposition and that can include conductive materials, and that can also be conductively tunable. On or more of the first and/or second thermoplastic polymer feedstock can include at least one conductive material to form a conductive thermoplastic feedstock mixture that can be deposited onto a substrate surface via a high-velocity sprayer to form a tunable conductive thermoplastic first and/or second layer coating on a substrate surface, with the conductive thermoplastic coating having predetermined characteristics. In another aspect, one or more of the first and/or second thermoplastic polymer feedstocks may not contain a conductive material, and the resulting first and/or second thermoplastic polymer layers applied to a substrate may not possess electrically resistive characteristics.

A thermoplastic polymer feedstock used for a second thermoplastic polymer layer will be selected to be different from the first thermoplastic polymer feedstock. According to one present aspect, the second thermoplastic polymer feedstock can include at least one conductive material to form a tunable conductive thermoplastic feedstock mixture that can be deposited via a high-velocity sprayer to form the second thermoplastic polymer layer having desired characteristics (e.g., a desired resistivity, a desired chemical resistance, a desired modulus, a desired robustness, a desired density, etc.). The second thermoplastic polymer layer is deposited onto the first thermoplastic polymer layer that has been first (e.g., previously) deposited onto the substrate surface. In a further aspect, the second thermoplastic polymer feedstock may not contain a conductive material, and the resulting first thermoplastic polymer layer applied to (e.g., deposited onto) a substrate surface may not possess electrically resistive characteristics In further aspects, the first thermoplastic polymer feedstock, and the first thermoplastic polymer layer formed and deposited onto a substrate surface, comprise at least one of: a thermoplastic polyester elastomer or a thermoplastic fluoroelastomer. Contemplated thermoplastic elastomers include those that can be obtained as Hytrel® 5526 (DuPont); Dai-El™, (Daikin®); Hipex®, (Kraiburg), etc. When the feedstock is in powdered form, the first thermoplastic polymer powder feedstock preferably has an average particle size ranging from about 20 µm to about 300 µm.

The second thermoplastic polymer feedstock and the second thermoplastic polymer layer formed, according to present aspects, comprise at least one of: a nylon, a polyetheretherketone (equivalently referred to as PEEK), a polyetherketoneketone (equivalently referred to as PEKK), a polyamide, a polyphenylsulfide, a polyphenylsulfone, a polysulfone, a polyetheramide, and combinations thereof.

Polyether ether ketone (PEEK) is an organic thermoplastic in the polyaryletherketone (PAEK) family, with PEEK having the general formula:

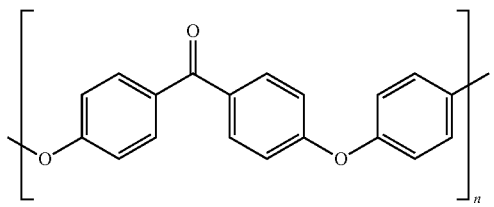

PEEK has a coefficient of thermal expansion value (depending upon grade) ranging from of about 20 to about 80 ppm/° F. (i.e. about 2 to about $8\times10^{-5}$ in./in/° F.), a Young's modulus value of about 3.6 GPa and a tensile strength ranging from about 90 MPa to about 100 MPa. PEEK is highly resistant to thermal degradation as well as attack by both organic and aqueous environments (e.g. environments including, without limitation, those environments coming into contact with fuels and fuel systems, etc.), and has a high resistance to biodegradation.

According to another, and as also presented in the Examples below, ret polymer powder. Polyetherketoneketone (PEKK) is a semi-crystalline thermoplastic in the PAEK family, with PEKK having the general formula:

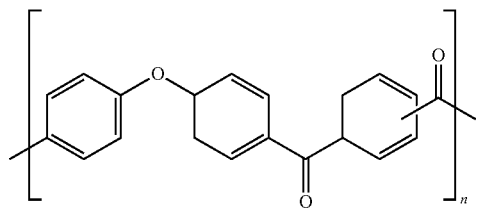

PEKK has a coefficient of thermal expansion value (depending upon grade) of about 10 to about 20 ppm/° F. (i.e. about 1 to about $2\times10^{-5}$ in./in/° F.), a Young's modulus value of about 4.5 GPa and a tensile strength of about 102 MPa. PEKK is also highly resistant to thermal degradation as well as attack by both organic and aqueous environments (e.g. environments including, without limitation, those environments coming into contact with fuels and fuel systems, etc.), and has a high resistance to biodegradation.

Amorphous and semi crystalline polyamides are commercially available under the trade name Trogamid® (Evonik) and include trimethyl hexamethylene diamine terephthalic acid and cycloalkiphatic diamine dodecanediodic acid.

Each layer (e.g., the first and second layer) of the multi-layered sealants disclosed herein can have a different density. Further, each layer of the contemplated thermoplastic polymer sealants can be of any desired thickness, and the multiple layers each can be of the same or different thicknesses. According to one aspect, each layer can be deposited at a thickness ranging from about 10 µm to about 4000 µm, with the each differing contemplated layers that together form the present thermoplastic polymer sealants having a material density ranging from about 1.0 g/cc to about 1.8 g/cc.

According to present aspect, the ability to deposit and form a thermoplastic polymer coating as a multi-layer coating or sealant on a layer-by-layer process, with each layer having such tailorable, predetermined, and potentially differing characteristics and properties (and deposited to such desired and potentially varying layer-by-layer thicknesses at differing properties, e.g., densities, etc.) can realize substantial weight reduction compared with material coatings presently used in, for example, aircraft production where overall weight impacts vehicle range, fuel consumption, available cargo capacity, manufacturing time, etc., all of which can impact total production cost.

If desired, according to further contemplated aspects, the thermoplastic coatings and sealants (and when conductive components are present to form conductive thermoplastic coatings and sealants, such resulting conductive thermoplastic coatings) can be tailored or "tuned", for example, in real time during the coating deposition process, such that the deposited coatings possess various desired and predetermined characteristics, e.g., physical, chemical, thermal, etc. Such tunable characteristics (e.g. also referred to equivalently herein as "tailorable" characteristics) are.in addition to the desired and tailorable conductivity or resistivity values achievable with the presently disclosed conductive thermoplastic coatings. This can be achieved by providing differing thermoplastic polymer feedstock(s), differing amounts (e.g., differing comparative ratios, etc.) of differing thermoplastic polymer feedstock(s), additional numbers of differing thermoplastic polymer feedstock(s), by providing additives to the thermoplastic polymer feedstock(s), etc.

According to other aspects, contemplated conductive feedstock materials include, without limitation, various metallic materials, including, without limitation, metallic powders such as, for example, titanium, nickel alloy, copper, carbon black, graphene powder, or carbon nanotubes. The contemplated conductive feedstock materials, when in powder form, preferably have an average particle size ranging from about 5 µm to about 80 µm.

The thermoplastic polymer feedstock formulations disclosed, according to aspects of the present disclosure, when combined or otherwise mixed with one or more conductive feedstock(s) produce a resulting conductive thermoplastic polymer feedstock mixture that can yield a conductive first thermoplastic polymer coating layer formed directly on a substrate surface and/or yield a conductive second thermoplastic polymer layer deposited on the second thermoplastic polymer layer, with either or both of the resulting conductive first and/or second thermoplastic polymer coating layers each having a desired and predetermined resistivity ranging from about $1 \times 10e^5$ to about $1 \times 10^{11}$ ohm-m, and more preferably from about $1 \times 10e^5$ to about $10e^8$ ohm-m.

To provide a conductive thermoplastic coating on a substrate surface having a resistivity ranging from about $1 \times 10e^5$ to about $1 \times 10^{11}$ ohm-m, the conductive thermoplastic polymer feedstock(s) preferably have a relative percentage by volume of the conductive component (e.g. the conductive powder) ranging from about 1% to about 9% by volume of the total volume of conductive thermoplastic polymer provided to the sprayer.

It is further understood that the thermoplastic polymer feedstock provided as a feedstock to the high-velocity sprayer can be a mixture that is formed prior to the introduction of the multi-component feedstock to the sprayer. For example, in one aspect, when the feedstock comprises more than one type of constituent component (e.g., more than one thermoplastic polymer feedstock; one thermoplastic polymer feedstock and at least one type of conductive feedstock; more than one thermoplastic polymer feedstock and at least one type of conductive powder feedstock, etc.), the multiple component feedstock materials can be mixed together to form a thermoplastic (or conductive thermoplastic) polymer mixture, or "feedstock mixture". The feedstock mixture is then introduced as the feedstock to the high-velocity sprayer. For the purpose of the present disclosure, the term "feedstock" refers to a precursor material that is supplied from a supply of a material to a mixture or is supplied directly to a high-velocity sprayer via a feed line from a supply of a material.

In an alternate aspect, for example, when the feedstock is a powdered feedstock, and the powdered feedstock comprises more than one type of powder component (e.g., more than one thermoplastic polymer powder feedstock; one thermoplastic polymer powder feedstock and at least one conductive powder feedstock; more than one thermoplastic polymer powder feedstock and at least one conductive powder feedstock, etc.), the multiple powdered feedstock components can be directed via separate feed lines to the sprayer, such that no multiple component powdered feedstock mixture is pre-formed as a single feedstock that is then provided to the sprayer. According to this aspect, one or more controllers can be used to monitor and control the rate at which a single powdered feedstock type is released from a supply and directed to the sprayer. In this way, the individual flow rate of a particular powdered feedstock component is controlled, monitored, and maintained to insure that a particular ratio of feedstock components that arrive at (e.g., are delivered to) the sprayer is achieved and, if desired, maintained for the duration of the material (e.g. coating) spray deposition process onto a substrate surface or on to a thermoplastic polymer layer that has already been deposited onto a substrate surface.

For example, to produce a conductive thermoplastic coating layer having a resistivity ranging from about $1 \times 10e^5$ to $10e^8$ ohm/m, the presence of an amount of conductive powder feedstock delivered to the sprayer ranges from about 1% to about 9% by volume of the combined powdered material feedstock delivered to the sprayer (e.g., the combined powdered material volume equaling the volume of thermoplastic polymer powder feedstock combined with the conductive powder feedstock volume, and, for example, controlled, monitored and maintained by regulating the comparative flow rates of the individual component feedstocks fed via one or more feed lines to the sprayer, etc.).

According to some present aspects, a formed conductive thermoplastic polymer powder feedstock mixture becomes the thermal sprayer feedstock material that is converted by the high-velocity sprayer (that can, for example, be a thermal sprayer) into a first and or second conductive thermoplastic polymer coating layer or first or second conductive thermoplastic polymer sealant layer. In the case of the first conductive thermoplastic polymer layer, such first layer is desirably applied (via the thermal sprayer) directly to a metal, non-metal, or metal/non-metal substrate surface. The substrate surface can comprise a substrate surface interface at, for: example, a fastener, or a joint. Further, the substrate surface can comprise a component or assembly edge, including edges that require an edge seal.

The tailorable conductive thermoplastic coatings that are obtained according to aspects of the present disclosure provide conductive flexibility with respect to, for example, dissipating static charges that build up with and along a particular material, or are caused by significant electrical events including, for example, lightning strikes. In addition, the conductive multi-layered thermoplastic coatings and sealants disclosed herein can have significant advantages over single layer conductive thermoplastic coatings and sealants in terms of ease of handling, ease of application, safety due to lower toxicity (e.g., as compared with polysulfides and chromates, etc.), and especially in terms of retention and adhesion characteristics, etc. Further, since the presently disclosed coatings and sealants are thermoplastic in nature, the multi-layered thermoplastic polymer coatings or sealants do not require a separate curing step after application. In other words, the multi-layered thermoplastic polymer coatings/sealants will "set" upon cooling and require no subsequent curing protocol or regimen to "set up".

Characteristics of the multi-layered thermoplastic polymer coatings and the discrete thermoplastic polymer coating layers contemplated according to present aspects can be altered in a predetermined fashion by providing a predetermined combination of materials to form a tailored thermoplastic polymer feedstock material, and by further incorporating additives, including, without limitation, additives such as pigments, dyes, or coloring agents, etc. That is, one or more of the disclosed thermoplastic polymer coating layers, each of which, or both of which, or neither of which may be conductive, can be fabricated to further comprise a particular color to, for example, facilitate inspection with respect to both initial application quality as well as rework and maintenance inspections that will be conducted at various quality control and servicing intervals. Further, if repair or replacement of a thermoplastic polymer coated part or surface (or a conductive thermoplastic polymer coated part or surface) is required, such coated parts or the coatings on such coated parts can be more easily removed using various solvent or mechanical removal as compared to, for example, epoxy- or acrylamide-based coatings and/or sealants that require curing regimens.

With respect to adhesion, the first thermoplastic polymer layer that is formed directly onto the substrate surface can be selected to have superior adhesion characteristics as compared to the second thermoplastic polymer layer that will contact the first thermoplastic polymer layer and will not directly contact the substrate surface. According to one aspect, the first thermoplastic polymer layer displays adhesion values ranging from about 10 lbs/in to about 30 lbs/in wide area on both metals and non-metals when performing adhesion testing set forth in ASTM D6862-11 (2016) Standard Test Method for 90° Peel Resistance, with this protocol for this testing procedure incorporated by reference herein as if made a part of the present specification. The following Example is set for as an illustration of how the 90° Peel Test is accomplished according to ASTM D6862-11 (2016) Standard Test Method for 90° Peel Resistance, although one skilled in the field of material science would readily understand how to perform adhesion testing methods to satisfy ASTM D6862-11 (2016), and such method in its entirety is incorporated by reference herein as if made a part of the present application.

EXAMPLE

Standard Test Method for 90° Peel Resistance According to ASTM D6862-11 (2016)

A test method according to Standard Test Method for 90° Peel Resistance according to ASTM D6862-11 (2016) is conducted to determine the resistance-to-peel strength of an adhesive bond between an aluminum alloy 7075 substrate surface or a carbon fiber reinforced plastic substrate surface, and a thermoplastic polymer layer applied to the substrate surface. Such first thermoplastic polymer layer is equivalent to the first thermoplastic polymer layer according to aspects of the present application and presented herein. A number of samples are produced having the first thermoplastic polymer layer deposited onto the aluminum or carbon fiber reinforced plastic substrate surface via high velocity spraying. Samples included the first thermoplastic polymer layer comprising Hytrel® TPC-ET (DuPont®), Dai-El™ (Daikin®), or Hipex® (Kraiburg). For the Standard Test Method for 90° Peel Resistance According to ASTM D6862-11 (2016), the first thermoplastic polymer layer is deposited onto the substrate surface at a thickness ranging from about 0.6 mm to about 1.6 mm.

The sample comprising the adhered first thermoplastic polymer layer is mounted in place onto a 100 Series Modular Universal Test Machine (Test Resources, Shakopee, MN). A gripper mounted to a moving test load cell is used to clamp an end of the first thermoplastic polymer coating in the gripper. The load cell is programmed to move at a constant speed ranging from Bout 0.1 mm/sec. to about 10 mm/sec. to move in a upward direction away from the substrate surface such that the first thermoplastic polymer coating is pulled at a maintained angle of 90° relative to the substrate surface. The load cell recorded and sends load readings to a readout during the peel testing. Average adhesion values of the samples of about 10 lbs/inch wide to about 30 lbs/inch wide are reported.

The thermoplastic coating and sealant systems disclosed herein combine the benefits of thermoplastic material characteristics with high-velocity spray techniques and systems (e.g., thermal flame spraying and cold spraying), and the deposited thermoplastic coating and sealant characteristics are further tailorable to a desired end use as coatings and/or sealants on a substrate surface. When a conductive powder feedstock component is added to the thermoplastic powder feedstock, the conductive coatings deposited to a substrate surface have electrical characteristics (e.g., conductivity, resistivity, etc.) that can also be tailored as required for their intended use as conductive coatings, particularly as coatings and/or sealants on homogeneous or hybrid surfaces comprising metallic and/or non-metallic components.

According to a further aspect, the presently known thermal and cold spray equipment and systems can be retrofitted to deposit coatings made from the presently disclosed thermoplastic formulations that can also include conductive materials to form conductive thermoplastic coatings. Particularly preferred thermal sprayers include flame sprayers.

Thermal spraying techniques are coating processes where melted or heated materials are sprayed onto (e.g., deposited onto) a surface. Feedstock material is supplied to the sprayer as a coating precursor. The feedstock is heated by electrical (e.g., plasma or arc) or chemical means (e.g., combustion flame). Thermal spraying can achieve coatings having a coating thickness ranging from about 20 µm to about 5.0 mm over a large area and at a high deposition rate as compared to other known coating processes, with the presently contemplated deposition rate ranging, for example, from about 20 µm on 1 ft$^2$ in 10 seconds, or greater, etc., or coatings deposited at a rate ranging from about 1 to about 50 grams/second, (g/s), etc.

Flame spray coating refers to a type of thermal spraying where melted or heated feedstock materials are sprayed onto a substrate surface. The feedstock (e.g., the coating precursor material) is heated by electrical (e.g., plasma or arc) or chemical means (e.g., combustion flame). During coating processes the substrate preferably undergoes no distortion, as the substrate temperature remains below about 250° F. during the spray operation. When the substrate is metallic, the substrate is not metallurgically altered. According to present aspects, coating layer thicknesses ranging from about 2 µm to 5.0 mm can be achieved, with deposition (e.g., coating application) rates for such thicknesses ranging from at least about 20 µm on 1 ft$^2$ in 10 seconds, or greater; or coatings deposited at a deposition rate ranging from about 1 to about 50 grams/second (g/s), etc.

Without limitation, thermal (e.g., flame, etc.) sprayers and high-velocity sprayers useful according to present aspects include, for example, TAFA Models 5220 HP/HVOF®, 8200 HP/HVOF®, 825 JPid HP/HVOF® (ID), 7780 (UPCC), JP-8000 HP/HVOF®, JP-5000® HP/HVOF® (Praxair, Inc., Danbury, CT); Powderjet® 86, Powderjet®85 (Metallizing Equipment Co. Pvt. LTD. (Jodhpur, India) Plasma Technology Inc., Torrence, CA); and systems available from Plasma Technology Inc. (Torrence CA), etc. Universal Flame Spray System PG-550 (Alamo Supply Co., Ltd., (Houston, TX), etc. Various controllers can be used in conjunction with the TAFA systems described including, for example, TAFA Model 7700GF HVOF System (Praxair, Inc., Danbury, CT).

Cold spray processes refer to the thermal spray processes and collectively refers to processes known as cold gas dynamic spraying, kinetic spraying, high velocity particle consolidation (HPVC), high velocity powder deposition, supersonic particle/powder deposition (SPD), and the like. In cold spraying, a high velocity gas jet, for example, a deLaval converging/diverging nozzle can be used to accelerate powder particles generally having an average particle size ranging from about 1 µm to about 50 µm. The particles are accelerated by the gas jet at a temperature that is below the melting point of the feedstock material particles. The particles are then sprayed onto a substrate that can be located about 25 mm from the nozzle. The particles impact the substrate and form a coating. Without being bound by a particular theory, it is believed that the kinetic energy of the particles, rather than an elevated temperature causes the particles to plastically deform on impact with the substrate surface to form "splats" that bond together to produce the coating. The coatings formed from the cold sprayed particles are formed in the solid state, and not via the melting followed by solidification as occurs in thermal spray processes (e.g., flame spraying, etc.) using elevated temperature. Such a cold spray process avoids deleterious effects that can be caused by high temperature deposition, including, for example, high-temperature oxidation, evaporation, melting, crystallization, residual stress, gas release, etc. As a result, according to present aspects, cold spraying can be advantageously used for temperature sensitive (e.g., heat sensitive) substrates. The resulting coatings, according to present aspects, possess characteristics including high strength, low porosity and minimal residual stress.

In contrast with the flame sprayer systems mentioned above, in "cold spray" systems powder particles (e.g., feedstock particles) typically having an average particle size ranging from about 10 μm to about 40 μm, and are accelerated to very high velocities ("high" velocities defined herein velocities ranging from about 200 m/s to 1200 m/s) by a supersonic compressed gas jet at temperatures below their melting point. Upon impact with the substrate, the particles experience extreme and rapid plastic deformation that disrupts the thin surface oxide films that typically are present on metals and alloys. This allows intimate conformal contact between the exposed substrate surfaces under high local pressure, permitting bonding to occur with the layers of deposited material. The layers of deposited material can be built up rapidly, with very high deposition efficiency (e.g., above 90% in some cases). Using cold spray systems, materials can be deposited without high thermal loads, producing coatings with low porosity and oxygen content. Without limitation, cold sprayers useful according to present aspects include, for example, Impact Spray System 5/8; Impact Spray System 5/11 (Impact Innovations Waldkraiburg, Germany), etc.

The sprayers used in the systems and methods disclosed herein can be operated manually, and can also be automated by incorporating or otherwise attaching the sprayer to a robot, or robotic arm that includes or is in communication with sensors, controllers, software and hardware, etc. for the purpose of controlling the operation and movement of the sprayer and the operation of the sprayer during, for example, a material deposition (e.g., coating, etc.) cycle. The robot and equipment associated with the robot and sprayer can be operated and powered directly, and further can be operated remotely in response to, for example, wireless signals, etc.

Where required coating characteristics included robustness in terms of adhesion and/or resistance to environmental factors such as those encountered, for example, in vehicle fuel tanks, etc., coating materials have been classified with various toxicities, making their handling and application hazardous to personnel. In addition, various application sites have been difficult to access. In addition, maintaining and/or replacing the coatings presently in use has resulted in significant repair and replacement time, as the removal of cured coatings. The coatings made possible according to aspects of the present disclosure, being thermoplastic materials, have significantly reduced toxicity during application, and can be more easily removed and replaced (e.g., at scheduled routine inspection and/or replacement).

In addition, at least the presently disclosed first thermoplastic polymer layer made from the disclosed first thermoplastic polymer formulations maintains adhesion characteristics over a required service period that is at least equivalent to or exceeds that, which is achievable using the previously available coatings and sealants (e.g., epoxy- and acrylamide-based options, etc.). The adhesion of the first thermoplastic polymer layer made from the disclosed first thermoplastic polymer formulations have an adhesion ranging from about 10 lbs./in to about 30 lbs./in wide area when performing adhesion testing set forth in ASTM D6862-11 (2016) Standard Test Method for 90° Peel Resistance.

Coatings and sealants typically applied to spatially restrictive and other difficult-to-access areas in various assemblies and sub-assemblies (e.g., fuel tanks, etc.) found, for example, in vehicles including aircraft have required coatings and sealants (e.g., epoxies and acrylamides, etc.) that require significant curing times in excess of many days. Further, long curing times delay manufacturing and increase manufacturing cost. In contrast to epoxy-based and other materials requiring curing time of several days or longer, the presently disclosed multi-layered thermoplastic polymer coatings and sealants applied according to the presently disclosed methods do not require curing, and only require the time necessary for the thermoplastic material to cool and "set" (e.g. thermoplastic material "set" times understood to range from about less than a few mins. to about several mins., or the amount of time a thermoplastic material takes to cool from an applied temperature to about room (ambient) temperature, assuming coating thicknesses ranging, for example, up to from about 2.5 mm to about 5.0 mm). According to present aspects, such "set" times for the deposited thermoplastic polymer coatings and sealants disclosed herein (including the deposited conductive thermoplastic polymer coatings and sealants) are in strong contrast to the curing times of several hours or even several days that are required to cure sealants and coatings previously used for the purposes intended herein on the substrates and substrate surfaces intended and disclosed herein.

While many of the characteristics of thermoplastic polymers may have been desirable for use in coatings and sealants in hard to access locations in assemblies and sub-assemblies, use of such thermoplastic polymeric coatings had been particularly hampered where the coatings or sealants required conductivity (or needed to have certain resistivities), or where it had not been previously possible to deposit a thermoplastic coating having variable or tailored characteristics. According to aspects of the present disclosure, the fabrication and use of electrically conductive coatings and sealants that have multiple physical and chemical characteristics in various discrete layers of a multi-layered thermoplastic polymer sealant material and that can tailored "on demand", and that are made from presently disclosed thermoplastic polymer formulations, has now been achieved.

FIG. 1 shows a block diagram outlining an aspect showing a thermoplastic polymer feedstock (that can be a powdered feedstock) and a system 10 including directing the thermoplastic polymer feedstock to a high-velocity sprayer for depositing a thermoplastic polymer coating onto a substrate surface. As shown in FIG. 1, a thermoplastic polymer feedstock 12 is directed from a thermoplastic polymer feedstock supply via a thermoplastic polymer powder feedstock feedline 11 in communication with the thermoplastic polymer feedstock 12 and also in communication with a high-velocity sprayer 14. Predetermined amounts of the thermoplastic polymer feedstock 12 can be directed by any desirable means that will direct the thermoplastic polymer feedstock 12 to the high-velocity sprayer 14, including automated means regulated by a controller (not shown) and subject to, for example, software and hardware known to control, for example, feedstock flow rates, etc. The high-velocity sprayer can be a thermal sprayer or a cold sprayer. As shown in FIG. 1, the thermoplastic polymer feedstock 12 is converted by the high-velocity sprayer 14 into a thermoplastic polymer coating 16a onto substrate 16. While the high-velocity sprayer 14 can be operated manually, FIG. 1 shows an optional robotic arm 13 (or "robot") that can be in communication with a controller 15. Controller 15 can further optionally be in communication with remote or integrated software or hardware, as desired, to control robotic arm movement as well as control flow rates and amounts of material deposited as a thermoplastic coating 16a onto a substrate 16. Optionally, additional controllers (not shown) can be integrated into system 10 to control one or more aspects of system 10. While the thermoplastic coating 16a is shown as a single layer, it is presently contemplated that the thermoplastic coating 16a is a first thermoplastic polymer layer applied to the substrate 16, and that the process can be repeated to deposit a second thermoplastic polymer layer onto the first thermoplastic polymer layer. The terms "thermoplastic polymer layer" and "thermoplastic polymer coating layer" as used herein are equivalent and interchangeable terms. Further, the terms "thermoplastic coating" and "thermoplastic polymer coating" as used herein are equivalent and interchangeable terms.

FIG. 2A shows a block diagram outlining an aspect showing a thermoplastic polymer feedstock mixture (that can be a powdered feedstock mixture) and system 20 including mixing multiple thermoplastic polymer feedstocks to form a thermoplastic polymer mixture, and then directing an amount of the thermoplastic polymer mixture to a high-velocity sprayer and depositing a thermoplastic polymer coating onto a substrate surface. As shown in FIG. 2A, in system 20, predetermined amounts of a first thermoplastic polymer feedstock 22a, and a second thermoplastic polymer feedstock 22b are directed to a mixing vessel (not shown). The predetermined amounts of the first and second thermoplastic polymer feedstocks 22a, 22b are delivered via first and second thermoplastic polymer feedstock feedlines 21a and 21b, respectively, and mixed together to form a thermoplastic polymer feedstock mixture 27. The thermoplastic polymer feedstock mixture 27 is directed via feedstock mixture feedline 28 to high-velocity sprayer 24. Feedstock mixture feedline 28, as shown in FIG. 2A, is in communication with thermoplastic polymer feedstock mixture 27 and the high-velocity sprayer 24. Predetermined amounts of the first thermoplastic feedstock 22a and the second thermoplastic polymer feedstock 22b can be directed from respective feedstock supplies (not shown) by any desirable means, including automated means regulated by a controller (not shown) and subject to, for example, software and hardware known to control, for example, feedstock flow rates from a supply to a sprayer, etc. The high-velocity sprayer 24 can be a thermal sprayer or a cold sprayer. As shown in FIG. 2A, the thermoplastic polymer feedstock mixture 27 is converted by the high-velocity sprayer 24 into a thermoplastic polymer coating 26a deposited onto substrate 26. While the high-velocity sprayer 24 can be operated manually, FIG. 2A shows an optional robotic arm 23 (or "robot") that can be in communication with a controller 25. Controller 25 can further optionally be in communication with remote or integrated software or hardware, as desired, to control robotic arm movement as well as control flow rates and amounts of material deposited as a thermoplastic polymer coating 26a onto a substrate 26. Optionally, additional controllers (not shown) can be integrated into system 20 to control one or more aspects of system 20. According to present aspects, while the thermoplastic polymer coating 26a is shown as a single layer, it is presently contemplated that the thermoplastic polymer coating 26a is a first thermoplastic polymer layer applied to the substrate 26, and that the process can be repeated to deposit a second thermoplastic polymer layer onto the first thermoplastic polymer layer to form a multi-layered thermoplastic polymer coating.

FIG. 2B shows a block diagram outlining an aspect showing two thermoplastic polymer feedstocks (where one, more than one of the feedstocks can be in powdered form) and system 30 similar to system 20 shown in FIG. 2A, except that, as shown in FIG. 2B, system 30 comprises first and second thermoplastic polymer feedstock feedlines 31a and 31b in communication with the high-velocity sprayer 24 and the first and second thermoplastic polymer feedstocks 22a and 22b, respectively. That is, as shown in FIG. 2B, amounts of the first and second thermoplastic polymer feedstocks 22a, 22b are not mixed together to form a feedstock mixture. Instead, according to the aspect shown in FIG. 2B as system 30, a predetermined amount of the first thermoplastic polymer feedstock 22a is directed to high-velocity sprayer 24 via first thermoplastic polymer feedstock feedline 31a. Similarly, a predetermined amount of the second thermoplastic polymer feedstock 22b is directed to the high-velocity sprayer 24 via second thermoplastic polymer feedstock feedline 31b. While the high-velocity sprayer 24 can be operated manually, FIG. 2B shows an optional robotic arm 23 (or "robot") that can be in communication with a controller 25. Controller 25 can further optionally be in communication with remote or integrated software or hardware, as desired, to control robotic arm movement as well as control flow rates and amounts of material deposited as a thermoplastic polymer coating 26a onto a substrate 26. Optionally, additional controllers (not shown) can be integrated into system 30 to control one or more aspects of system 30. While the thermoplastic coating 26a is shown in FIGS. 2A and 2B as a single layer, it is presently contemplated that the thermoplastic coating 26a is a first thermoplastic polymer layer applied to the substrate 26, and that the process can be repeated to deposit a second thermoplastic polymer layer onto the first thermoplastic polymer layer to form a multi-layered coating FIG. 3A shows a block diagram outlining an aspect showing a thermoplastic polymer feedstock and a conductive feedstock (where either or both of the feedstocks can be in powdered form) and a system 40. As shown in FIG. 3A, in system 40, a thermoplastic polymer feedstock 42a, and a conductive feedstock 42b are directed to a mixing vessel (not shown). The predetermined amounts of the first and second thermoplastic polymer feedstocks 42a, 42b are delivered via first and second thermoplastic polymer feedstock feedlines 41a and 41b, respectively, and mixed together to form a conductive thermoplastic polymer feedstock mixture 47. An amount of the conductive thermoplastic polymer feedstock mixture 47 is directed via conductive thermoplastic polymer feedstock mixture feedline 48 to high-velocity sprayer 44. Feedline 48 as shown in FIG. 3A is in communication with conductive thermoplastic feedstock mixture 47 and the high-velocity sprayer 44. Predetermined amounts of conductive thermoplastic polymer feedstock mixture 47 can be directed to the high-velocity sprayer 44 by any desirable means, including automated means regulated by a controller (not shown) and subject to, for example, software and hardware known to control, for example, feedstock flow rates from a supply to a sprayer, etc. The high-velocity sprayer 44 can be a thermal sprayer or a cold sprayer. As shown in FIG. 3A, the conductive thermoplastic polymer feedstock is converted by the high-velocity sprayer 44 into a conductive thermoplastic polymer coating 46a deposited onto substrate 46. While the high-velocity sprayer 44 can be operated manually, FIG. 3A shows an optional robotic arm 43 (or "robot") that can be in communication with a controller 45. Controller 45 can further optionally be in communication with remote or integrated software or hardware, as desired, to control movement of the robotic arm 43 as well as control flow rates and amounts of deposited conductive thermoplastic polymer coating 46a onto a substrate 46. Optionally, additional controllers (not shown) can be integrated into system 40 to control one or more aspects of system 40.

FIG. 3B shows a block diagram outlining an aspect showing a conductive thermoplastic polymer (that can be in powdered form) and a system 50 similar to system 40 shown in FIG. 3A, except that as shown in FIG. 3B, system 50 comprises a thermoplastic polymer feedstock feedline 51a in communication with a thermoplastic polymer feedstock 42a and a high-velocity sprayer 44. Conductive feedstock feedline 51b is shown in communication with the conductive feedstock 42b and the high-velocity sprayer 44. That is, as shown in FIG. 3B, an amount of the thermoplastic polymer feedstock 42a is not mixed with an amount of the conductive feedstock 42b to form a conductive thermoplastic polymer feedstock mixture. Instead, according to an aspect shown in FIG. 3B as system 50, a predetermined amount of the thermoplastic polymer feedstock 42a is directed to high-velocity sprayer 44 via thermoplastic polymer feedstock feedline 51a. Similarly, a predetermined amount of the conductive feedstock 42b is directed to the high-velocity sprayer 24 via conductive feedstock feedline 51b. While the high-velocity sprayer 44 can be operated manually, FIG. 3B shows an optional robotic arm 43 (or "robot") that can be in communication with a controller 45. Controller 45 can further optionally be in communication with remote or integrated software or hardware, as desired, to control movement of the robotic arm 43 as well as control flow rates and amounts of deposited conductive thermoplastic polymer coating 46a onto a substrate 46. Optionally, additional controllers (not shown) can be integrated into system 50 to control one or more aspects of system 50. According to present aspects, while the thermoplastic polymer coating 46a is shown as a single layer, it is presently contemplated that the thermoplastic polymer coating 46a is a first thermoplastic polymer layer applied to the substrate 46, and that the process can be repeated to deposit a second thermoplastic polymer layer onto the first thermoplastic polymer layer to form a multi-layered thermoplastic polymer coating.

FIG. 4A shows a block diagram outlining an aspect showing a conductive thermoplastic polymer feedstock (that can be a powdered feedstock) and a system 60 including mixing first and second thermoplastic polymer feedstocks with a conductive feedstock to form a conductive thermoplastic feedstock mixture, and then directing an amount of the conductive thermoplastic feedstock mixture to a high-velocity sprayer and depositing a conductive thermoplastic polymer coating onto a substrate surface. Any or all of the feedstocks can be in powdered form. As shown in FIG. 4A, in system 60, an amount of a first thermoplastic polymer feedstock 62a, an amount of a second thermoplastic polymer feedstock 62b, and an amount of a conductive feedstock 62c are directed to a mixing vessel (not shown) and are mixed together to form a conductive thermoplastic polymer feedstock mixture 67. A desired amount of the conductive thermoplastic polymer feedstock mixture 67 is directed via feedstock mixture feedline 68 to high-velocity sprayer 64. Feedstock mixture feedline 68, as shown in FIG. 4A, is in communication with conductive thermoplastic polymer feedstock mixture 67 and the high-velocity sprayer 64. Predetermined amounts of: 1) the first thermoplastic polymer feedstock 62a; 2) the second thermoplastic polymer feedstock 62b; and 3) the conductive feedstock 62c are directed to the conductive thermoplastic polymer feedstock mixture 67 via first thermoplastic polymer feedstock feedline 61a, second thermoplastic polymer feedstock feedline 61b and conductive polymer feedstock feedline 61c, respectively, by any desirable means. Predetermined amounts of conductive thermoplastic polymer feedstock mixture 67 are directed to the high-velocity sprayer 64 by any desirable means, including, for example, an automated means regulated by a controller (not shown) and subject to, for example, software and hardware known to control, for example, feedstock flow rates to a sprayer, etc. The high-velocity sprayer 64 can be a thermal sprayer or a cold sprayer. As shown in FIG. 4A, the conductive thermoplastic polymer feedstock mixture 67 is converted by the high-velocity sprayer 44 into a conductive thermoplastic polymer coating 66a deposited onto substrate 46. While the high-velocity sprayer 64 can be operated manually, FIG. 4A shows an optional robotic arm 63 (or "robot") that can be in communication with a controller 65. Controller 65 can further optionally be in communication with remote or integrated software or hardware, as desired, to control movement of the robotic arm 63 as well as control flow rates and amounts of deposited conductive thermoplastic polymer coating 66a onto a substrate 66. Optionally, additional controllers (not shown) can be integrated into system 60 to control one or more aspects of system 60.

FIG. 4B shows a block diagram outlining an aspect showing a conductive thermoplastic polymer and a system 70 similar to system 60 shown in FIG. 4A, except that as shown in FIG. 4B, system 70 comprises: 1) a first thermoplastic polymer feedstock feedline 71a in communication with the first thermoplastic polymer feedstock 62a and the high-velocity sprayer 64; 2) a second thermoplastic polymer feedstock feedline 71b in communication with the first thermoplastic polymer feedstock 62b and the high-velocity sprayer 64; and 3) a conductive feedstock feedline 71c in communication with the conductive feedstock 62c and the high-velocity sprayer 64. That is, as shown in FIG. 4B, an amount of the first thermoplastic polymer feedstock 62a, and an amount of the second thermoplastic polymer feedstock 62b are not mixed with an amount of the conductive feedstock to form a conductive thermoplastic polymer feedstock mixture. Instead, according to system 70 shown in FIG. 4B, a predetermined amount of the first thermoplastic polymer feedstock 62a is directed to high-velocity sprayer 64 via first thermoplastic polymer feedstock feedline 71a. Similarly, a predetermined amount of the second thermoplastic polymer feedstock 62b is directed to high-velocity sprayer 64 via second thermoplastic polymer feedstock feedline 71b. Further, a predetermined amount of the conductive feedstock 62c is directed to the high-velocity sprayer 64 via conductive feedstock feedline 71c. Any of the feedstocks can be in powdered form. While the high-velocity sprayer 64 can be operated manually, FIG. 4B shows an optional robotic arm 63 that can be in communication with a controller 65. Controller 65 can further optionally be in communication with remote or integrated software or hardware, as desired, to control movement of a robotic arm 63 (or "robot") as well as control flow rates and amounts of deposited conductive thermoplastic polymer coating 66*a* onto a substrate 66. Optionally, additional controllers (not shown) can be integrated into system 70 to control one or more aspects of system 70. While the thermoplastic coating 66*a* is shown as a single layer, it is presently contemplated that the thermoplastic coating 66*a* is a first thermoplastic polymer layer applied to the substrate 66, and that the process can be repeated to deposit a second thermoplastic polymer layer onto the first thermoplastic polymer layer to form a multi-layered coating.

The robotic arm disclosed above is equivalently referred to herein as a "robot", such that any feature of the robot (in addition to the "arm") can control the relative movement of the high-velocity sprayer, and/or the robot can control the direction of spray emitted from the high-velocity sprayer (e.g., the robot controls the direction and change the direction of spray from the high-velocity sprayer while the sprayer itself remains in a substantially stationary position, etc.).

FIG. 5 is an illustration of a vehicle in the form of an aircraft 80, with the aircraft 80 comprising assemblies and sub-assemblies and components that further comprise fasteners, with the fasteners having coatings according to aspects of the present disclosure, with the fasteners coated using systems and coated via methods according to aspects of the present disclosure. It is further understood that, the coatings described herein can be advantageously coated onto substrates occurring on components, including substrate interfaces and edges requiring the application of sealant material to achieve various types of seals (e.g., filet seals, edge seals, etc.) in assemblies and sub-assemblies incorporated in further types of manned and unmanned aircraft, terrestrial vehicles, sub-surface and surface marine (e.g., water borne) vehicles, manned and unmanned satellites, etc.

FIGS. 6A, 6B, 7A, 7B, 8A, and 8B are flowcharts outlining aspects of the present disclosure. FIG. 6A outlines a method 100*a* comprising directing 102*a* at least one thermoplastic polymer (e.g. a thermoplastic polymer feedstock that can be in powdered form) to a high-velocity sprayer, followed by forming 104*a* a first thermoplastic polymer spray formulation at or near the high-velocity sprayer. The method outlined in FIG. 6A further comprises directing 106*a* the first thermoplastic spray formulation from the high-velocity sprayer to a substrate having a substrate surface, and forming 108*a* a first thermoplastic polymer coating layer on the substrate surface. The method outlined in FIG. 6A is understood to at least relate to the systems shown in FIGS. 1, 2A, and 2B.

FIG. 6B outlines a method 100*b* comprising directing 102*b* at least one thermoplastic polymer (e.g. a thermoplastic polymer feedstock that can be in a powdered form) to a high-velocity sprayer, followed by forming 104*b* a second thermoplastic polymer spray formulation at or near the high-velocity sprayer. The method outlined in FIG. 6B further comprises directing 106*b* the second thermoplastic spray formulation from the high-velocity sprayer to a substrate having a substrate surface and forming 108*b* a second thermoplastic polymer coating on the first thermoplastic polymer coating layer. The method outlined in FIG. 6B is understood to at least relate to the systems shown in FIGS. 1, 2A, and 2B.

FIG. 7A outlines a method 110 comprising directing 102*a* an amount of at least one first thermoplastic polymer (e.g. a thermoplastic polymer feedstock in a powdered form) to a high-velocity sprayer, followed by directing 103*a* an amount of conductive material to the high-velocity sprayer concurrently with the thermoplastic polymer and forming 104*c* a conductive first thermoplastic polymer spray formulation at or near the high velocity sprayer. The method further comprises directing 106*c* the conductive first thermoplastic polymer spray formulation from the sprayer to a substrate surface, and forming 108*c* a conductive first thermoplastic coating on the substrate surface. The method outlined in FIG. 7A is understood to at least relate to the systems shown in FIGS. 3A, 3B, 4A, and 4B.

FIG. 7B outlines a method 112 comprising directing 102*b* an amount of at least one first thermoplastic polymer (e.g. a thermoplastic polymer feedstock in a powdered form) to a high-velocity sprayer, followed by directing 103*b* an amount of conductive material to the high-velocity sprayer concurrently with the thermoplastic polymer and forming 104*d* a conductive second thermoplastic polymer spray formulation at or near the high velocity sprayer. The method further comprises directing 106*d* the conductive second thermoplastic polymer spray formulation from the sprayer to the conductive first thermoplastic polymer coating layer, and forming 108*d* a conductive second thermoplastic coating layer on the conductive first thermoplastic polymer coating layer. The method outlined in FIG. 7B is understood to at least relate to the systems shown in FIGS. 3A, 3B, 4A, and 4B.

FIG. 8A outlines a method 120 comprising directing 102*c* an combined amount of a first thermoplastic polymer and an amount of a second thermoplastic polymer in a mixture to a high-velocity sprayer (e.g. a combined first and second thermoplastic polymer feedstock that can be in a powdered form), followed by directing 103*c* an amount of conductive material to the high-velocity sprayer concurrently with the combined thermoplastic polymer mixture and forming 104*c* a conductive first thermoplastic polymer spray formulation. The method further comprises directing 106*c* the conductive first thermoplastic polymer formulation from the sprayer to a substrate surface and forming 108*c* a conductive first thermoplastic coating on the substrate surface. The method outlined in FIG. 8A is understood to at least relate to the systems shown in FIGS. 4A, and 4B.

FIG. 8B outlines a method 125 comprising directing 102*d* an combined amount of a first thermoplastic polymer and an amount of a second thermoplastic polymer in a mixture to a high-velocity sprayer (e.g. a combined first and second thermoplastic polymer feedstock that can be in a powdered form), followed by directing 103*d* an amount of conductive material to the high-velocity sprayer concurrently with the combined thermoplastic polymer mixture and forming 104*d* a conductive second thermoplastic polymer spray formulation. The method further comprises directing 106*d* the conductive second thermoplastic polymer formulation from the sprayer to the conductive first thermoplastic polymer coating layer, and forming 108*d* a conductive second thermoplastic polymer coating layer on the conductive first thermoplastic polymer coating layer. The method outlined in FIG. 8A is understood to at least relate to the systems shown in FIGS. 4A, and 4B.

FIG. 9 shows a representative illustration of a thermal spray deposition system 130 according to aspects of the present disclosure. As shown in FIG. 9, a feedstock 132 comprising individual feedstock particles 133 are heated, such as by directing the feedstock particles 133 to a flame 134 in a thermal sprayer (e.g., a flame sprayer, not shown in FIG. 9) at a particular velocity and in a direction as indicated by horizontal arrows. The feedstock particles 133 deform as they melt to a semi-solid or liquid state. The deformed particles 135 then impact a substrate surface 136. The deformed particles continue to impact the substrate surface 136. As the illustrated thermal spray deposition process continues, a deposited layer 138 forms on the substrate surface 136.

FIG. 10 is an illustration of a high velocity spray process 140 that can include the use of a high-velocity flame sprayer or a high-velocity cold sprayer (collectively and equivalently referred to as the "sprayer" or the "high-velocity sprayer"). As shown in FIG. 10, and according to aspects of the present disclosure, a sprayer 142 is operated to emit and direct a thermoplastic polymer particulate spray 143 formed by processing thermoplastic polymer feedstock (that can be a powdered feedstock) that is directed to the sprayer. The feedstock can be tailored and can be made into a conductive feedstock (that can also be tailored) by adding varying amounts of conductive feedstock (that can be in a powdered form) to the thermoplastic polymer feedstock (that can also be in powdered form). The thermoplastic polymer particulate spray 143 is directed from the sprayer 142 to a fastener 144 installed into a substrate 146. At least one thermoplastic polymer feedstock acts as a feedstock supply (not shown) that is supplied to the sprayer 142.

According to further aspects, the feedstock can also be a conductive thermoplastic polymer powder feedstock mixture, with the feedstock mixture comprising a conductive powder feedstock. According to further aspects, when the feedstock comprises multiple components, each component can alternatively be supplied individually and also substantially concurrently to the sprayer via discrete feedstock feedlines (not shown). If desired, the predetermined amounts of multiple feedstock components can be delivered to the sprayer via one or more feedstock feedlines by a sequencer and/or controller driven by automatically or manually in conjunction with attendant software and hardware, including the use of a robot. In this way the fastener 144 is coated to a predetermined thickness as particles in the particulate spray impact the fastener 144, the substrate 146, and the fastener/substrate interface 147. As shown in FIG. 10, the fastener 144 can be made from a metal or non-metal and the substrate 146 can also be made from a metal or a non-metal.

According to aspects of the present disclosure, when at least one of a fastener and the substrate are made from a metal having a different electrical resistivity (or electrical conductivity), a thermoplastic polymer feedstock can be "doped" with a predetermined amount of conductive feedstock to form a conductive thermoplastic polymer feedstock. The feedstock can be in a powdered form. As the conductive thermoplastic feedstock proceeds into and through the high-velocity sprayer, the conductive thermoplastic polymer feedstock comprising conductive feedstock particles and thermoplastic polymer feedstock particles is subjected at the sprayer to heat and/or high velocity via gas jets to at least soften and deform the particles in the conductive thermoplastic polymer feedstock. The combined feedstock particles leave the sprayer as a conductive thermoplastic polymer particulate spray at a predetermined velocity and impact a desired target such as, for example, the fastener 144, substrate 146 and the fastener/substrate interface 147 as shown in FIG. 10.

Upon impact on the selected target(s), the particulate spray forms a first thermoplastic polymer coating on the target(s) (e.g., substrate surface(s), etc.) with, if desired, the first thermoplastic polymer coating having a desired, predetermined, and tailorable resistivity value. Further, the resistivity value of the first thermoplastic polymer coating formed on the substrate surface can be tailored or "tuned" to a particular resistivity value. According to present aspects described above, the coating process is substantially repeated to deposit a second thermoplastic polymer coating layer, then can also be conductive, onto the first thermoplastic polymer layer, with the two deposited layers comprising a composition different from one another.

If the coated materials are subjected to an electromagnetic effect (EME), such as, for example, from the electrical discharge of static electricity, or a from a lightning strike, the conductivity of the multi-layer thermoplastic coating will at least ameliorate deleterious effects from the EME that would otherwise be encountered at or near the fastener or at or near the fastener/substrate interface (e.g., adjoined structures) due to dissimilar resistivity values of such adjoined and/or proximately positioned structures. The multi-layer thermoplastic coatings made possible according to aspects of the present disclosure further obviate the need to stock and employ expensive alternatives including, for example, physically applied fastener caps that are expensive and time-consuming to install, maintain, and replace.

FIG. 11 is an illustration of an assembly comprising two structures adjoined via fastening with fasteners. As shown in FIG. 11, an assembly 150 comprises a first substrate 152 having a first substrate surface adjoined to a second substrate 153 having a second substrate surface. Fasteners 154 are shown fitted, for example, through aligned holes (not shown) in substrates 152, 153, such that, the fasteners, when secured, exert pressure sufficient to hold substrates 152, 153 together in an adjoined orientation. As further shown in FIG. 11, fasteners 154 have a fastener first end 154*a* contacting a surface (the "upper" surface) of substrate 152, and a fastener second end 154*b* contacting a surface (the "lower" surface) of substrate 153.

FIG. 12 is a cross-sectional side-view of a coated fastener in position fastening together two substrates. As shown in FIG. 12, a fastener assembly 160 comprises first and second substrates, 162 and 163 respectively, fastened together by fastener 164. As shown in FIG. 12, the fastener 164, along with portions of substrates 162, 163 including fastener/substrate interfaces 166*a*, 166*b*, 166*c* and 166*d*, are coated by a sealant 168 that is formed by the deposition of two thermoplastic polymer layers; namely first thermoplastic polymer coating layer: 168*a*, and second thermoplastic polymer coating layer 168*b*. First thermoplastic polymer coating layer 168*a* is shown contacting fastener 164 and at least a portion of first substrate 162 and at least a portion of second substrate 163. First thermoplastic polymer coating layer 168*a* is shown covered by a second thermoplastic polymer coating layer 168*b*. Though shown in FIG. 12 as individual points, the fastener/substrate interface is understood to represent a "perimeter", or an "area", such as, for example (and as shown in FIG. 12), a substantially circular perimeter located at the fastener/substrate interface. The terms "thermoplastic polymer layer" and "thermoplastic polymer coating layer" as used herein are equivalent and interchangeable terms.

First and second thermoplastic polymer coating layers 168*a*, 168*b* (and the feedstocks used to form the two thermoplastic polymer coating layers) are selected to deliver predetermined characteristics to the two-layer coating sealant. For example, in the two-layer sealant of the present application, the first thermoplastic polymer that forms the first thermoplastic polymer coating layer, and that is deposited directly onto a substrate, can be selected for its superior adhesion characteristics, while the second thermoplastic polymer material that forms the second thermoplastic polymer coating layer, and that is deposited onto the first thermoplastic polymer coating layer need not have adhesion characteristics that are equivalent to the first coating layer, since the second coating layer will not be adhering to the substrate.

A further aspect discloses an assembly comprising a first substrate and a second substrate, with the first and second substrates located proximate to one another, and a two-layer thermoplastic polymer sealant located on at least one of the first and second substrates. The sealant can comprise a first thermoplastic polymer layer with adhesion properties ranging from about 10 lbs/in to about 30 lbs/in wide area from a 90° peel test when performing adhesion testing set forth in ASTM D6862-11 (2016) Standard Test Method for 90° Peel Resistance.

For example, and according to another present aspect, the first thermoplastic polymer coating layer that is deposited onto the substrate surface can be made from a first thermoplastic polymer material that has superior adhesion characteristics, modulus characteristics etc. According to present aspects, the first thermoplastic polymer coating layer can comprise a modulus value of less than 1000 MPa having an elongation at break greater than 100%, while, for example, the second thermoplastic polymer layer can be selected because such second thermoplastic polymer material, from which the second coating layer is made, has modulus of less than about 4 MPa with an elongation at break of greater than about 20%.

In addition, the two-layer sealant that is deposited on, for example, an assembly, component, etc., may need to encounter or otherwise exist in a harsh environment (e.g., exposure to volatiles or other chemicals, such as, for example, fuel in a fuel tank, etc.). In this aspect, the second thermoplastic polymer material that forms the second thermoplastic polymer coating layer of the two-layer sealant (and that is exposed to the environment as the outermost coating layer of the two-layer sealant) can be selected to take advantage of chemical resistance characteristics that the first layer of the two-layer sealant does not possess.

For example, and according to a present aspect, the second thermoplastic polymer coating layer that is deposited onto the first thermoplastic polymer coating layer can be made from a second thermoplastic polymer material that has superior chemical resistance characteristics, modulus characteristics etc. According to present aspects, if, for example, the two-layer sealant is deposited onto a component or assembly such as, for example, an aircraft fuel tank interior component or assembly, etc., the second thermoplastic polymer coating layer can be made from a second thermoplastic polymer material that has a chemical resistance to long or short term exposure to, for example, jet fuel, hydraulic liquids, other volatile materials, etc. with the chemical resistance/exposure measured in terms of the second thermoplastic polymer material (and second thermoplastic polymer coating layer) incurring less than 10% weight gain, and/or less than a 10% reduction in a desired mechanical property, etc.

According to aspects of the present disclosure, at least the first or second thermoplastic polymer coating layer can be conductive, with one or both of the first and/or second thermoplastic polymer coating layers having a desired and/or predetermined and tailorable (e.g., "tunable") resistivity. It is understood that the EME effects that are dissipated by conductive thermoplastic polymer coating layers would be dissipated by the second thermoplastic polymer coating layer that is oriented "uppermost" or otherwise serves as the outer coating layer of the two-layer sealant. According to further aspects, the substrates 162, 163 can be made from a metal or non-metal material. Fastener 164 can be made from metal or non-metal material. Each of substrates 162, 163 and/or fastener 164 can be made from the same or different metals or the same or different non-metals. If the resistivity value of substrates 162, 163 differ from each other and/or differ from the resistivity value of the fastener 164, the fastening assembly area or region can be susceptible to deleterious effects when confronted with an EME event (e.g., such as from static discharge or a lightning strike, etc.).

According to present aspects, the resistivity value of the first and/or second thermoplastic polymer coating layers (168a, 168b respectively) formed to cover the fastener 164 can be tailored or "tuned" to any resistivity value as desired, and preferably ranging from about $1\times10^5$ to about $1\times10^{11}$ ohm-m, and more preferably ranging from about $1\times10^5$ to about $1\times10^8$ ohm-m. If the coating materials and/or the underlying substrate material are subjected to an electromagnetic effect (EME), such as, for example, from the electrical discharge of static electricity, or a from a lightning strike, the conductivity of the thermoplastic coating layers comprising the two-layer thermoplastic polymer sealant disclosed herein will at least ameliorate deleterious effects from the EME that would otherwise be encountered at or near the fastener or at or near the fastener/substrate interface (e.g., adjoined structures) due to dissimilar resistivity values of such adjoined and/or proximately positioned structures.

FIG. 13 is an overhead perspective view, or "top" view of a coated fastener according to aspects of the present disclosure. As shown in FIG. 13, an area of an assembly 170 comprises a fastener 172 installed in a substrate 174. A two-layer thermoplastic polymer coating sealant 176 is shown coating a portion of substrate 174 and fastener 172 to form a two-layer thermoplastic polymer coated fastener 178, also referred to equivalently herein as a "thermoplastic polymer sealed fastener". As with the fastener 164 shown in FIG. 12, at least one layer of the two-layer thermoplastic polymer sealant (equivalently referred to as a "two-layer thermoplastic polymer coating sealant" or a multi-layer thermoplastic polymer coating sealant") can comprise a conductive material to form a two-layer conductive thermoplastic polymer coating on the fastener and at least a portion of the substrate.

According to present aspects, the resistivity value of the conductive thermoplastic polymer coating layer formed to cover the fastener (e.g., the first thermoplastic polymer coating layer) or the second thermoplastic polymer coating layer that covers the first thermoplastic coating layer can be tailored or "tuned" to a predetermined resistivity value such that, if the coated materials are subjected to an electromagnetic effect (EME), such as, for example, from the electrical discharge of static electricity, or a from a lightning strike, the conductivity of the thermoplastic coating will at least ameliorate deleterious effects from the EME that would otherwise be encountered at or near the fastener or at or near the fastener/substrate interface (e.g., adjoined structures) due to dissimilar resistivity values of such adjoined and/or proximately positioned structures.

FIG. 14A is a flowchart outlining methods according to aspects of the present disclosure. As shown in FIG. 14A, according to presently disclosed aspects, the first steps of a method 200 for coating an installed fastener includes delivering 202a a first thermoplastic polymer feedstock, that can be a powdered feedstock, to a high-velocity sprayer. The high-velocity sprayer is preferably a high-velocity sprayer that can be a thermal sprayer (e.g. flame sprayer) or a cold sprayer. Further contemplated steps of method 200, include forming 204a a first thermoplastic polymer coating material followed by directing 206a the first thermoplastic polymer coating material from the high-velocity sprayer to a fastener and fastener/substrate interface on substrate surface, and depositing 208a an amount of the first thermoplastic polymer coating material on the fastener to form a first thermoplastic polymer coating layer on the fastener and at the fastener/substrate interface, and coating 210a the fastener with the first thermoplastic polymer coating layer. The methods outlined in FIG. 14A can be used to accomplish the coating methods to prepare the coated fasteners, fastener/substrate interfaces and substrates shown and/or described in one or more of FIG. 1 through FIG. 13.

FIG. 14B is a flowchart outlining methods according to aspects of the present disclosure. As shown in FIG. 14B, according to presently disclosed aspects, further steps (e.g., steps subsequent to the steps presented as method 200 in FIG. 14A) are shown as method 201 delivering a second thermoplastic polymer coating layer onto the first thermoplastic polymer coating layer. As shown in FIG. 14B, method 200 further includes delivering 202b a second thermoplastic polymer feedstock, that can be a powdered feedstock, to a high-velocity sprayer. The high-velocity sprayer is preferably a high-velocity sprayer that can be a thermal sprayer (e.g. flame sprayer) or a cold sprayer. Further contemplated steps of method 200, include forming 204b a second thermoplastic polymer coating material followed by directing 206b the second thermoplastic polymer coating material from the high-velocity sprayer to a fastener and fastener/substrate interface on substrate surface, and depositing 208b an amount of the second thermoplastic polymer coating material onto the first thermoplastic polymer coating layer previously deposited onto the fastener and fastener/substrate interface, to form a second thermoplastic polymer coating layer on the first thermoplastic polymer coating layer, and coating 210b the first thermoplastic polymer coating layer with the second thermoplastic polymer coating layer. The methods outlined in FIG. 14B can be used to accomplish the coating methods to prepare the coated fasteners, fastener/substrate interfaces and substrates shown and/or described in one or more of FIG. 1 through FIG. 13.

When a fastener, including a metal fastener, is installed into an assembly that, for example, includes fastened first and second parts or substrates, and at least one substrate is made from a metal, according to the present disclosure, the thermoplastic coating material is conductive, and in certain aspects the conductive coating has a resistivity ranging from about 105 to 181 ohm-m. FIG. 15A is a flowchart outlining methods according to aspects of the present disclosure. As shown in FIG. 15A, according to presently disclosed aspects, a method 300 for coating an installed fastener includes delivering 302a a conductive first thermoplastic polymer that can be in a powdered form, to a high-velocity sprayer. The high-velocity sprayer is preferably a high-velocity sprayer that can be a thermal sprayer (e.g. flame sprayer) or a cold sprayer. Further contemplated steps of method 300, include forming 304a a conductive first thermoplastic polymer coating material followed by directing 306a the conductive first thermoplastic polymer coating material from the sprayer to a fastener and fastener/substrate: interface on substrate surface, and depositing 308a an amount of the conductive first thermoplastic polymer coating material on the fastener to form a conductive first thermoplastic polymer coating layer on the fastener and at the fastener/substrate interface, and coating 310a the fastener with the conductive first thermoplastic polymer coating layer. The methods outlined in FIG. 15A can be used to accomplish the coating methods to prepare the coated fasteners, fastener/substrate interfaces and substrates shown and/or described in one or more of FIG. 1 through FIG. 14B.

FIG. 15B is a flowchart outlining methods according to aspects of the present disclosure. As shown in FIG. 15B, according to presently disclosed aspects, further steps (e.g., steps subsequent to the steps presented as method 300 in FIG. 15A) are shown as method 300 comprising delivering a second thermoplastic polymer coating layer onto the first thermoplastic polymer coating layer. As shown in FIG. 15B, according to presently further disclosed aspects, the method 300 for coating an installed fastener further includes delivering 302b a conductive second thermoplastic polymer that can be in a powdered form, to a high-velocity sprayer. The high-velocity sprayer is preferably a high-velocity sprayer that can be a thermal sprayer (e.g. flame sprayer) or a cold sprayer. Further contemplated steps of method 300 include forming 304b a conductive second thermoplastic polymer coating material followed by directing 306b the conductive second thermoplastic polymer coating material from the sprayer to the fastener and fastener/substrate interface on substrate surface, and depositing 308b an amount of the conductive second thermoplastic polymer coating material on the conductive first thermoplastic polymer coating layer to form a conductive second thermoplastic polymer coating layer on the fastener and at the fastener/substrate interface, and coating 310b the conductive first thermoplastic polymer coating layer with the conductive first thermoplastic polymer coating layer. The methods outlined in FIG. 15B can be used to accomplish the coating methods to prepare the coated fasteners, fastener/substrate interfaces and substrates shown and/or described in one or more of FIG. 1 through FIG. 15A. As stated previously herein. If desired, the methods outlined in the present FiGs. can be modified such that one or more of the first and/or second thermoplastic polymer coating layers are conductive and can have their degree of conductivity "tuned" to a desired degree by appropriately doping the thermoplastic polymer feedstock with varying and predetermined amounts of conductive material.

The characteristics of the presently disclosed two-layer thermoplastic polymer coatings are particularly desirable for use as two-layer coatings and two-layer sealants (in coating and sealing processes) for substrates, components, assemblies, etc. in hard to access locations in assemblies and sub-assemblies. Such substrates include substrates requiring or otherwise benefitting from the use of thermoplastic polymer coatings and sealants having a predetermined and tailorable conductivity (or resistivity, etc.), or assembly locations where it had not been previously possible to deposit a coating or sealant having variable or tailored conductive or other characteristics. According to aspects of the present disclosure, the fabrication and use of electrically variable conductive coatings and sealants that can also have multiple physical and chemical characteristics tailored, and that are made from presently disclosed thermoplastic polymer formulations, and applied according to presently disclosed methods, has now been achieved.

According to present aspects, the two-layer coating approach allows for improved and tailorable or tunable overall characteristics of the overall coating (e.g., the two or multiple layer coating). In other words, if a particular adhesion level or other characteristic is difficult to incorporate into a coating where certain other characteristics are desirable (e.g. a particular outer modulus, outer conductivity or resistivity, etc.) the inner portion of the coating requiring a heightened adhesion, for example can now be achieved by, for example, allowing the inner portion of the overall coating (e.g., the first thermoplastic polymer coating layer) to be responsible for adhering the overall coating to a particular substrate. In this way, the second thermoplastic polymer coating layer can then be prepared for the purpose of providing other characteristics to the overall coating other than, for example, superior adhesion characteristics to a substrate, since the second thermoplastic polymer coating layer does not contact the substrate, and only need adhere to the first thermoplastic polymer coating layer.

FIG. 16A is an illustration of an assembly comprising a first substrate and a second substrate, (equivalently referred to herein as first and second components or first and second parts) that are fastened together and, when sealed, a fillet seal is formed at the interface of the first substrate and second substrate (interface referred to equivalently herein as "juncture") of the assembly. Fillet seals are understood to occur two interfacing substrates (e.g., at the interface at or between to proximately located substrate surfaces, panels, etc.) The sealant applied to the area of the fillet seal effectively seals any gap or space at the interface.

Further, when the first and second substrates include exposed edges, edge seals may be required to ameliorate an undesirable phenomenon known as "edge glow". Edge glow can occur when substrate material at edges of the substrate are exposed. Fiber-based materials (e.g., composite based materials that incorporate carbon fibers, boron fibers, aramid fibers, etc.), can be particularly susceptible to "edge glow", as the exposed fiber ends at a component edge can behave as a cathode that emits electrons to a degree that can approximate the electrical energy of a weak spark.

As shown in FIG. 16A and according to present aspects, the edges of such materials are sealed by the presently disclosed two-layer sealants to form protective edge seals at the edges of the first and second substrates. Additionally, filled seals are shown applied to the interface of two substrates or components. As shown in FIG. 16A, an assembly 430 comprises a first substrate 432 and a second substrate 434 that are joined (e.g., fastened together via fasteners 436). As shown in FIG. 16A, the first 432 and second 434 substrates are joined in an overlapping orientation to form a lap joint. A two-layer thermoplastic polymer sealant 437 that can also comprise, if desired, an amount of conductive material (e.g., in either or both of the two layers present in the two-layer thermoplastic sealant) for the purpose of delivering a predetermined resistivity to the thermoplastic polymer coating. The two-layer thermoplastic sealant 437 is applied to the first 432 and second 434 substrates, such that a fillet seal 438 is formed at the first substrate 432 and second substrate 434 interface 439. As further shown in FIG. 16A, first substrate edge 432a, and a portion of second substrate edge 434a are also coated with the two-layer thermoplastic polymer coating 437 (that can also comprise a predetermined amount of conductive material for the purpose of delivering a predetermined and tailored resistivity value to the thermoplastic polymer coating) to form a first substrate edge seal 432b and a second substrate edge seal 434b.

FIG. 16B is an enlarged cross-sectional view of the assembly 430 shown in FIG. 16A, and in particular taken across line 16B. As shown in FIG. 16B, the two-layer thermoplastic sealant 437 comprises first thermoplastic polymer coating layer 437a applied to the first substrate 432 and the second substrate 434, and a second thermoplastic polymer coating layer 437b applied onto the first thermoplastic polymer coating layer 437a. The cross-sectional view shown in FIG. 16B is for illustrative purposes only. According to present aspects, when the second thermoplastic polymer coating layer 437b is applied to the first thermoplastic polymer coating layer 437b, depending on the temperature at which the deposition occurs, a defined boundary between the first and second thermoplastic polymer coating layers may not be discernable as illustrated due to first and second thermoplastic polymers comingling and bonding that can occur at the interface of the first and second thermoplastic polymer layers.

FIGS. 17, 18, and 19 are illustrations of a portion of a fuel tank interior 440, that can be an aircraft fuel tank interior, and showing representative fuel tank components that can be, for example, a first substrate 442 oriented proximate to a second substrate 444. As shown in FIGS. 17 and 18, the first substrate 442 is fastened to the second substrate 444 via fasteners 446. A two-layer thermoplastic polymer sealant 447 (that can also comprise a predetermined amount of conductive material for the purpose of delivering a predetermined and tailored resistivity value to the thermoplastic polymer coating) is applied to the first 442 and second 444 substrates, such that a fillet seal 448 is formed at the substrate interface 449 located at the juncture of the first substrate 442 and second substrate 444. Though not shown in FIGS. 17 and 18, it is understood that, depending on the composition of the first and second substrates (442, 444), the two-layer thermoplastic polymer sealant 447 could obtain an edge seal at the exposed edge of the first and/or second substrates 442, 444. That is, if either of the first and/or second substrates 442, 444 comprise a fiber-based or other material that could be susceptible to "edge glow" in the presence of a charge (e.g., an electrical charge caused by or resulting from an EME, etc.), the two-layer thermoplastic polymer sealant 447 can be applied to achieve the required edge seals at the edges of first and or second substrates 442, 444.

FIG. 19 is an illustration of a fuel tank interior 450, that can be an aircraft fuel tank interior comprising fuel tank components and fuel tank assemblies, showing a first substrate 452 oriented proximate to a second substrate 454. As shown in FIG. 19, the first substrate 452 is fastened to the second substrate 454 via fasteners 456. A two-layer thermoplastic polymer sealant 457 (at least one layer of which can also comprise a predetermined amount of conductive material for the purpose of delivering a predetermined and tailored resistivity value to the thermoplastic polymer coating) is applied to the first 452 and second 454 substrates, such that a fillet seal 458 is formed at the substrate interface 459 located at the juncture of the first substrate 452 and second substrate 454. Though not specifically shown in FIG. 19, it is understood that, depending on the composition of the first and second substrates (452, 454 respectively), the two-layer thermoplastic polymer sealant 457 could obtain an edge seal at the exposed edge of the first and/or second substrates 452, 454. That is, if either of the first and/or second substrates 452, 454 comprise a fiber-based or other material that could be susceptible to "edge glow" in the presence of a charge (e.g., an electrical charge caused by or resulting from an EME, etc.), the two-layer thermoplastic polymer sealant 457 can be applied to achieve the required edge seals at the edges of first and or second substrates 452, 454.

According to aspects of the present disclosure, and as shown in FIGS. 16A, 16B, 17, 18, and 19, when first substrate materials are made from a material having a resistivity value that differs from the resistivity value of the second substrate, and where the two substrates are joined together, or are otherwise in close proximal contact, the variance in resistivities can result in damage at such junctures when EMEs occur (e.g., resulting from static discharge and/or lightning strikes), or at the substrate edges. The conductive thermoplastic polymer sealant materials (e.g. equivalently referred to herein as the "sealants") and seals placed as fillet seals between such first and second structures and/or as end seals on such structures, as well as seals placed as edge seals at first and/or second substrate edges ameliorate or eliminate deleterious effects and damage otherwise caused by EMEs.

Further, the multi-layered thermoplastic seals and multi-layered thermoplastic sealants disclosed herein afford many advantages over non-thermoplastic sealants presently used in the manufacture of sub-assemblies and assemblies that house, contain, store, or otherwise become exposed to harsh environmental factors and the presence of chemicals, solvents, fuels, etc. (e.g., fuel tank, etc.). In other words, even when substrate materials have similar resistivities to one another and can allow static or other electrical charges to pass freely and without incident from structure to structure, the multi-layered thermoplastic seals and thermoplastic sealant materials disclosed herein that do not have a conductive component allow for improved sealing processes and improved seals and sealants as compared to known sealants and sealant materials used, for example, in the manufacture of enclosed environments, including, without limitation, assemblies such as fuel tanks, and aircraft fuel tanks., etc.

According to aspects of the present disclosure, when at least one of a first and second substrate to be joined together (or that are oriented relative to one another to form a seal requirement at the juncture of the substrates, or a seal requirement at the edges or one or more substrates) are made from materials having differing electrical resistivities (or electrical conductivities), a thermoplastic polymer feedstock (that can be in a powdered form) is "doped" with a predetermined amount of conductive material to form a conductive thermoplastic polymer feedstock. As the conductive thermoplastic polymer feedstock proceeds into and through the sprayer, the feedstock comprising particles is subjected to heat and/or high velocity via gas jets to at least soften and deform the particles in the conductive thermoplastic polymer feedstock. The particles leave the sprayer as a particulate spray at a predetermined velocity and impact a desired target such as, for example, the areas where fillet seals and edge seals on a substrate or substrates are required. Upon impact on the selected target(s) (e.g., substrate surfaces, etc.), the particulate spray forms a thermoplastic polymer coating, or thermoplastic polymer sealant, on the substrates and forms a thermoplastic polymer seal.

The resistivity value of the thermoplastic polymer seals formed by the presently disclosed multi-layered thermoplastic sealants formed can be tailored or "tuned" to a desired resistivity value. In this way, if the coated substrate materials are subjected to an electromagnetic effect (EME), such as, for example, from the electrical discharge of static electricity, or from a lightning strike, etc., the conductivity of the thermoplastic polymer sealant and seals will at least ameliorate deleterious effects from the EME that would otherwise be encountered at or near the fillet seals occurring at or near the substrate interfaces (e.g., adjoined structures), and at substrate material edge seals.

According to further present aspects, FIGS. 20A and 20B are flowcharts outlining methods for forming a two-layer sealant material, with the sealant material comprising differing first and second thermoplastic polymer layers, and with the first and second thermoplastic polymer layers selected to have varying characteristics from one another. More specifically, FIG. 20A is a flowchart outlining a method for forming and depositing a first thermoplastic polymer sealant layer onto a substrate surface, with the method 500 including, delivering 502*a* at least one thermoplastic polymer feedstock to a high-velocity sprayer. The at least one thermoplastic polymer feedstock can be in a powdered form. The first thermoplastic polymer feedstock can include at least one of copolymers including Hytrel® TPC-ET (DuPont®), thermoplastic elastomers, and thermoplastic fluoroelastomers including DAI-EL® T-530 (Daikin®). The disclosed method as shown in FIG. 20A further includes forming 504*a* a first thermoplastic polymer sealant material and directing 506*a* the first thermoplastic polymer sealant material from the high-velocity sprayer to a substrate surface, and depositing 508*a* an amount of the first thermoplastic polymer sealant material onto the substrate to form a first thermoplastic polymer sealant layer. The high-velocity sprayer used to deposit the first thermoplastic polymer material onto the substrate can be controlled manually. In addition, according to further aspects, the high-velocity sprayer can be automatically controlled by a robot structure in communication with the high velocity sprayer. According to this optional aspect, shown as step 510*a* in FIG. 20A, movement of the high-velocity sprayer can be directed by a robot structure in communication with the high-velocity sprayer, with the robot structure further in communication with a controller. The controller is understood to be in communication with required software and hardware typically used in the field of robotics.

FIG. 20B is a flowchart outlining a method according to aspects of the present disclosure, for forming and depositing a second thermoplastic polymer sealant layer onto the first thermoplastic polymer sealant material, with the method 600 including, delivering 502*b* at least one thermoplastic polymer feedstock (that can be in a powdered form) for the second thermoplastic polymer sealant material layer to a high-velocity sprayer. The second thermoplastic polymer feedstock can include at least one of polyetheretherketone, polyetherketoneketone, polyamide, polyphenylsulfide, polyphenylsulfone, polysulfone, and polyetheramide. The disclosed method as shown in FIG. 20BA further includes forming 504*b* a second thermoplastic polymer sealant material and directing 506*b* the second thermoplastic polymer sealant material from the high-velocity sprayer to the first thermoplastic polymer sealant material, and depositing 508*b* an amount of the second thermoplastic polymer sealant material onto the first thermoplastic polymer sealant material to coat the first thermoplastic polymer sealant material and form a two-layer thermoplastic polymer sealant material. Similar to the method described and outlined in FIG. 20A, the high-velocity sprayer used to deposit the second thermoplastic polymer material onto the first thermoplastic polymer layer can be controlled manually. In addition, according to further aspects, the high-velocity sprayer can be automatically controlled by a robot structure in communication with the high velocity sprayer. According to this optional aspect, shown as step 510*b* in FIG. 20B, movement of the high-velocity sprayer can be directed by a robot structure in communication with the high-velocity sprayer, with the robot structure further in communication with a controller. The controller is understood to be in communication with required software and hardware typically used in the field of robotics. The method outlined in FIGS. 20A and 20B can be used to form the second thermoplastic polymer material sealant and the resulting seals formed therefrom as shown in any one or more of FIG. 1 through FIG. 19.

According to further present aspects, FIGS. 21A and 21B are flowcharts outlining methods for forming a conductive two-layer thermoplastic polymer seal made from a conductive two-layer thermoplastic polymer sealant material, with the conductive two-layer thermoplastic polymer seal comprising differing first and second thermoplastic polymer layers, and with the first and second thermoplastic polymer layers of the seal selected to have varying characteristics from one another. More specifically, FIG. 21A is a flowchart outlining a method according to aspects of the present disclosure, with the method 760 including, delivering 602*a* at least one thermoplastic polymer feedstock for a first thermoplastic polymer sealant (that can be in a powdered form) to a high-velocity sprayer. The thermoplastic polymer feedstock can include at least one of copolymers including Hytrel® TPC-ET (DuPont®), thermoplastic elastomers, and thermoplastic fluoroelastomers including DAI-EL® T-530 (Daikin®). The disclosed method further includes delivering 604*a* a conductive feedstock material to the high-velocity sprayer, forming 606*a* a conductive first thermoplastic polymer sealant material and directing 608*a* the conductive first thermoplastic polymer sealant material from the high-velocity sprayer to a substrate surface, and depositing 610*a* an amount of the conductive first thermoplastic polymer sealant onto the substrate to form a first thermoplastic polymer sealant layer. According to a further aspect shown as optional step 612*a* in FIG. 21A, movement of the high-velocity sprayer can be directed by a robot structure in communication with the high-velocity sprayer, with the robot structure further in communication with a controller. The controller is understood to be in communication with required software and hardware typically used in the field of robotics.

FIG. 21B is a flowchart outlining a method according to aspects of the present disclosure, with the method 770 including, delivering 602*b* at least one thermoplastic polymer feedstock for a first thermoplastic polymer sealant (that can be in a powdered form) to a high-velocity sprayer. The second thermoplastic polymer feedstock includes at least one of polyetheretherketone, polyetherketoneketone, polyamide, polyphenylsulfide, polyphenylsulfone, polysulfone, and polyetheramide. The disclosed method further includes delivering 604*b* a conductive feedstock material to the high-velocity sprayer, forming 606*b* a conductive first thermoplastic polymer sealant material and directing 608*b* the conductive first thermoplastic polymer sealant material from the high-velocity sprayer to a substrate surface, and depositing 610*b* an amount of the conductive first thermoplastic polymer sealant onto the substrate to form a first thermoplastic polymer sealant layer. According to a further aspect shown as optional step 612*b* in FIG. 21B, movement of the high-velocity sprayer can be directed by a robot structure in communication with the high-velocity sprayer, with the robot structure further in communication with a controller. The controller is understood to be in communication with required software and hardware typically used in the field of robotics. The methods outlined in FIGS. 21A and 21B can be used to form the thermoplastic polymer material and sealants and the seals formed therefrom as shown in any one or more of FIG. 1 through FIG. 20B.

Further present aspects contemplate using a single high-velocity sprayer, into which is first directed the first thermoplastic polymer feedstock that will become the deposited first thermoplastic polymer sealant layer that is deposited onto a substrate surface. According to this aspect, the second thermoplastic polymer feedstock is directed to the same high-velocity sprayer and the second thermoplastic polymer material exits the high velocity sprayer and is directed to coat the first thermoplastic polymer sealant layer and become the second thermoplastic polymer sealant layer and complete the formation of the two-layer thermoplastic polymer sealant.

In addition, present aspects contemplate the use of more than one high-velocity sprayer, with a first high-velocity sprayer dedicated to the deposition of the first thermoplastic polymer sealant material onto a substrate surface; and a second high-velocity sprayer is then dedicated to the deposition of the second thermoplastic polymer sealant material to form the second thermoplastic polymer sealant material layer that is deposited onto the first thermoplastic polymer sealant layer. This aspect is illustrated in the method 800 outlined in FIG. 22 comprising directing 802 the first thermoplastic polymer (feedstock) to a first high-velocity sprayer, depositing 804 the first thermoplastic polymer to a substrate surface, and forming 806 a first thermoplastic polymer coating layer on the substrate surface. This process is followed by directing 808 the second thermoplastic polymer (feedstock) to a first or second high-velocity sprayer, depositing 810 the second thermoplastic polymer onto the first thermoplastic polymer coating layer, forming 812 a second thermoplastic polymer coating layer on the first thermoplastic polymer coating layer, and forming 814 a two-layer sealant on the substrate surface, such sealant comprising first and second thermoplastic coating layers.

Though not shown in FIG. 22, the movement of the first and second high-velocity sprayers can be controlled and operated manually, or can be automated, such as via robot arms or robotic structures in communication with the high-velocity sprayers, as disclosed herein. The methods outlined in FIG. 22 can be used to form the two-layer thermoplastic polymer material, coatings, sealants, and seals formed therefrom as shown in any one or more of FIG. 1 through FIG. 21B.

According to another present aspect, the discrete layers of the presently disclosed multi-layered coatings and sealants are deposited according to controlled regimens in view of the differing characteristics of the thermoplastic polymers that constitute each of the layers, and that are different from one another. For example, when the high-velocity sprayed used to deposit the thermoplastic layers are thermal sprayers, deposition temperatures imposed on the thermoplastic polymers by the sprayer(s) are controlled and otherwise are operated within a temperature range to preserve the desired characteristics of the resulting thermoplastic polymer layers in the resulting coatings and sealants.

In addition, present aspects contemplate methods for detecting and controlling substrate temperatures during the disclosed coating processes. FIG. 23 outlines such aspects for the method 800 shown in FIG. 22, with additional steps for monitoring and maintaining a substrate temperature in a temperature range to, for example, insure that the deposited first and/or second thermoplastic polymer layers are not exposed to a deleterious temperature that could otherwise adversely impact the performance of such deposited thermoplastic layers. An illustrative method 800 is outlined in FIG. 23 comprising directing 802 the first thermoplastic polymer (feedstock) to a first high-velocity sprayer, depositing 804 the first thermoplastic polymer to a substrate surface, and forming 806 a first thermoplastic polymer coating layer on the substrate surface. The method 800 outlined in FIG. 23 further comprises monitoring 816 the temperature of the substrate surface and optionally maintaining 818 the temperature of the substrate surface at a temperature ranging from about 120° F. to about 350° F., and more preferably from about 120° F. to below about 250° F. The temperature of the substrate surface can continued to be monitored throughout the remainder of the outlined process that comprises directing 808 the second thermoplastic polymer (feedstock) to a first or second high-velocity sprayer, depositing 810 the second thermoplastic polymer onto the first thermoplastic polymer coating layer, forming 812 a second thermoplastic polymer coating layer on the first thermoplastic polymer coating layer, and forming 814 a two-layer sealant on the substrate surface, such sealant comprising first and second thermoplastic coating layers.

While present aspects describe and illustrate two-layer thermoplastic polymer coating systems, resulting sealants, sealant materials, and seals, further aspects contemplate multi-layer thermoplastic polymer coating systems, resulting sealants, sealant materials, and seals having two or more layers, with at least the first thermoplastic polymer layer that contacts a substrate surface and the final thermoplastic polymer layer that can be exposed to the environment comprising different thermoplastic polymers, and with at least the first and final thermoplastic polymer layers comprising differing predetermined properties and characteristics.

Further aspects of the present disclosure contemplate thermoplastic polymer fastener coatings and conductive thermoplastic polymer fastener coatings (and methods of their delivery to substrates and substrate surfaces comprising fasteners) and other components including components, assemblies, etc. for in structures and objects, including, for example, vehicles. Components for use in such assemblies and sub-assemblies comprising the presently disclosed coatings find particular utility in the manufacture of vehicles, including aircraft, as well as structural components used in the manufacture of fuel tanks on such vehicles.

Such contemplated components, assemblies etc. include, without limitation, fasteners for installing, securing, etc. components, assemblies, etc. associated with aircraft (e.g. spars, ribs, stringers, etc.), with such components finding particular usefulness in connection with vehicle fuel tanks and fuel tank systems. Such vehicles include, without limitation, a manned aircraft, an unmanned aircraft, a manned spacecraft, an unmanned spacecraft, a manned rotorcraft, an unmanned rotorcraft, a satellite, a rocket, a manned terrestrial vehicle, an unmanned terrestrial vehicle, a manned surface water borne vehicle, an unmanned surface water borne vehicle, a manned sub-surface water borne vehicle, an unmanned sub-surface water borne vehicle, and combinations thereof.

Present aspects may, of course, be carried out in other ways than those specifically set forth herein without departing from essential characteristics disclosed herein. The present aspects are to be considered in all respects as illustrative and not restrictive, and all changes coming within the meaning and equivalency range of the appended claims are intended to be embraced therein.

What is claimed is:

1. A seal for a substrate, said seal comprising a multi-layer sealant, said multi-layer sealant comprising:
    a first thermoplastic polymer layer applied to a substrate, said first thermoplastic polymer layer comprising a first thermoplastic polymer, said first thermoplastic polymer comprising at least one of: a thermoplastic co-polyester, a co-polymer of vinylidene fluoride and hexafluoropropylene, a thermoplastic polyurethane, a thermoplastic vulcanizate, a thermoplastic polyolefin elastomer, a styrene block co-polymer, a fluoroelastomer, and combinations thereof;
    a second thermoplastic polymer layer deposited onto said first thermoplastic polymer layer, said second thermoplastic polymer layer comprising a second thermoplastic polymer, said second thermoplastic polymer comprising at least one of: a polyether ether ketone, a polyether ketone ketone, a polyamide, a polysulfone, a polyphenylsulfone, a polyetheramide, and combinations thereof;
    wherein the first thermoplastic polymer is different than the second thermoplastic polymer; and
    wherein the first thermoplastic polymer layer comprises an adhesion value ranging from about 10 lbs/in to about 30 lbs/in wide area in 90° peel test according to ASTM D6862-11 (2016).

2. The seal of claim 1, wherein the first thermoplastic polymer layer applied to the substrate comprises a modulus less than 1000 MPa, and wherein the second thermoplastic polymer layer deposited onto said first thermoplastic polymer layer comprises a modulus of less than 4 MP.

3. The seal of claim 1, wherein the seal is at least one of a fillet seal and an edge seal.

4. The seal of claim 1, wherein the second thermoplastic polymer layer comprises a resistivity ranging from about $1 \times 10e^5$ to about $1 \times 10e^8$ ohm-m.

5. The seal of claim 1, wherein the first thermoplastic polymer layer is configured to be applied to the substrate via a high velocity sprayer.

6. The seal of claim 1, wherein the second thermoplastic polymer layer is configured to be deposited onto the first thermoplastic polymer layer via a high velocity sprayer.

7. The seal of claim 1, wherein at least one of the first thermoplastic polymer layer and the second thermoplastic polymer layer comprises a resistivity ranging from about $1 \times 10e^5$ to about $1 \times 10e^8$ ohm-m.

8. The seal of claim 1, wherein the seal is a fillet seal.

9. The seal of claim 1, wherein the substrate comprises at least one of aluminum, a fiber-reinforced composite material, and combinations thereof.

10. An object comprising the seal of claim 1.

11. The object of claim 10, wherein the object is a fuel tank component.

12. A vehicle comprising the object of claim 10.

13. The vehicle of claim 12, said vehicle comprising at least one of
    a manned spacecraft, an unmanned spacecraft, a manned aircraft, an unmanned aircraft, a manned hovercraft, an unmanned hovercraft, a manned rotorcraft, an unmanned rotorcraft, a manned terrestrial vehicle, an unmanned terrestrial vehicle, a manned surface watercraft, an unmanned surface watercraft, a sub-surface watercraft, an unmanned sub-surface watercraft, a manned satellite, and an unmanned satellite.

14. A method for forming a seal on a substrate, the method comprising:
    directing a first thermoplastic polymer from a first thermoplastic polymer feedstock to a first high velocity sprayer, said first thermoplastic polymer feedstock comprising at least one of: thermoplastic co-polyester, a co-polymer of vinylidene fluoride and hexafluoropropylene, a thermoplastic polyurethane, a thermoplastic vulcanizate, a thermoplastic polyolefin elastomer, a styrene block co-polymer, a fluoroelastomer, and combinations thereof;
    depositing the first thermoplastic polymer from the high velocity sprayer onto a substrate surface;
    forming a first thermoplastic polymer layer on the substrate surface;

directing a second thermoplastic polymer from a second thermoplastic polymer feedstock to the first high velocity sprayer or a second high velocity sprayer, said second thermoplastic polymer feedstock comprising at least one of: a polyether ether ketone, a polyether ketone ketone, a polyamide, a polysulfone, a polyphenylsulfone, a polyetheramide, and combinations thereof;

depositing the second thermoplastic polymer from the high velocity sprayer onto the first thermoplastic polymer layer;

forming a second thermoplastic polymer layer on the first thermoplastic polymer layer;

wherein the first thermoplastic polymer is different than the second thermoplastic polymer; and wherein the first thermoplastic polymer layer comprises an adhesion value ranging from about 10 lbs/in to about 30 lbs/in wide area in 90° peel test according to ASTM D6862-11 (2016).

15. The method of claim 14, after the step of forming a first thermoplastic polymer layer on the substrate surface, further comprising;

monitoring temperature of the substrate surface; and maintaining the temperature of the substrate surface at a temperature ranging from about 120° F. to about 350° F.

16. The method of claim 14, wherein the second thermoplastic polymer layer comprises an adhesion value ranging from about 10 lbs/in to about 30 lbs/in wide area in 90° peel test according to ASTM D6862-11 (2016).

17. The method of claim 14, wherein the seal is at least one of a fillet seal and an edge seal.

18. The method of claim 14, wherein the first thermoplastic polymer layer comprises a modulus less than 1000 MPa, and wherein the second thermoplastic polymer layer comprises a modulus of less than 4 MPa.

19. The method of claim 14, wherein the substrate comprises at least one of aluminum, a fiber-reinforced composite material, and combinations thereof.

20. The method of claim 15, wherein the seal is at least one of a fillet seal and an edge seal.

* * * * *